United States Patent
Hoshiya et al.

[11] Patent Number: 6,009,768
[45] Date of Patent: Jan. 4, 2000

[54] SKIP DOWNSHIFT CONTROL APPARATUS FOR AUTOMATIC TRANSMISSION

[75] Inventors: Kazumi Hoshiya, Gotenba; Hidehiro Oba, Numazu; Hiroatsu Endo, Susono, all of Japan

[73] Assignee: Toyota Jidosha Kabushiki Kaisha, Toyota, Japan

[21] Appl. No.: 09/228,193

[22] Filed: Jan. 11, 1999

[30] Foreign Application Priority Data

Jan. 13, 1998 [JP] Japan .................................. 10-005157

[51] Int. Cl.$^7$ ................................................ F16H 61/08
[52] U.S. Cl. .................... 74/336 R; 477/80; 477/124; 477/55
[58] Field of Search ................. 74/336 R, 329; 477/55, 57, 79, 80, 124

[56] References Cited

U.S. PATENT DOCUMENTS

| | | | |
|---|---|---|---|
| 4,495,837 | 1/1985 | Morscheck | 477/124 |
| 4,497,222 | 2/1985 | Nagaoka et al. | 477/79 X |
| 4,653,351 | 3/1987 | Downs et al. | 477/148 |
| 4,989,477 | 2/1991 | Hunter et al. | 74/336 R X |
| 5,711,409 | 1/1998 | Murata | 74/336 R X |

FOREIGN PATENT DOCUMENTS

| | | | |
|---|---|---|---|
| 3-121362 | 5/1991 | Japan . | |
| 6-8665 | 2/1994 | Japan | 477/148 |

*Primary Examiner*—Sherry L. Estremsky
*Attorney, Agent, or Firm*—Oblon, Spivak, McClelland, Maier & Neustadt, P.C.

[57] ABSTRACT

A control apparatus for an automatic transmission of twin clutch type, in which a skip downshift is executed with a light gearshift shock and in a short gearshifting time period. As illustrated in FIG. 1, after the release of a clutch C2, a command for switching over a synchro mechanism is issued at a time t3. When the r.p.m. NT of a turbine has reached the synchronous r.p.m. NT3 of the intermediate stage of the skip downshift, the oil pressure of a clutch C1 is raised in order that the rising rate of the turbine r.p.m. (speed) NT may become a predetermined value d/dt(NT1) or d/dt(NT2). Thereafter, the oil pressure of the clutch C1 is controlled in order that the turbine r.p.m. NT may maintain a value NT2 (synchronous r.p.m. of the lower speed stage of the skip downshift)+ΔNT4. After the completion of the switchover of the synchro mechanism, the oil pressure of the clutch C2 is gradually raised, and that of the clutch C1 is gradually lowered. Thus, the skip downshift in a power-ON state is executed.

3 Claims, 35 Drawing Sheets

FIG.3A

| GEAR STAGE | C1 | C2 | S1 | | | S2 | | | S3 | |
|---|---|---|---|---|---|---|---|---|---|---|
| | | | 1 | N | 3 | 2 | N | 4 | N | R |
| 1ST SPEED STAGE | O | | O | | | ▽ | O | | O | |
| 2ND SPEED STAGE | | O | △ | O | ▽ | O | | | O | |
| 3RD SPEED STAGE | O | | | | O | △ | O | ▽ | O | |
| 4TH SPEED STAGE | | O | O | O | △ | | | O | O | |
| REVERSE STAGE | | O | | | | | O | | | O |

FIG.3B

| NO. | JUDGED GEARSHIFT STAGE | OUTPUT SHAFT R.P.M. | SYNCHRO POSITIONS |
|---|---|---|---|
| 1 | 1ST SPEED | <No1 | 1-N |
| 2 | | ≧No1 | 1-2 |
| 3 | 2ND SPEED | <No2 | 1-2 |
| 4 | | ≧No2 | 2-3 |
| 5 | 3RD SPEED | <No3 | 2-3 |
| 6 | | ≧No3 | 3-4 |
| 7 | 4TH SPEED | — | 3-4 |

SKIP DOWNSHIFT CONTROL APPARATUS FOR AUTOMATIC TRANSMISSION

BACKGROUND OF THE INVENTION

1. Field of the Invention

The present invention relates to a control apparatus which is well suited for application in case of executing a skip downshift in an automatic transmission of so-called "twin clutch type".

2. Description of the Prior Art

A power-ON skip downshift is usually executed when the driver of a motor vehicle has pressed the accelerator pedal thereof rapidly and deeply. On the other hand, a power-OFF skip downshift is usually executed when the driver manipulates the shift lever of the motor vehicle in want of engine braking.

The official gazette of Japanese Patent Application Laid-open No. 121362/1991 discloses a control technique wherein, in executing the power-ON skip downshift of, for example, the fourth speed stage (higher speed stage) →second speed stage (lower speed stage) of an automatic transmission, the gearshift control is performed via the intermediate stage (third speed stage) of the automatic transmission, and a command for the intermediate stage is canceled before this intermediate stage is completely achieved.

In executing the skip downshift, when the intermediate stage is involved to successively perform the first gearshift from the higher speed stage to the intermediate stage and the second gearshift from the intermediate stage to the lower speed stage, the r.p.m. or rotational speed of each rotary member can be smoothly changed correspondingly, and a gearshift shock can be alleviated.

Moreover, on that occasion, the whole gearshifting period of time required till the completion of the skip downshift can be shortened by applying the technique as disclosed in the above official gazette of Japanese Patent Application Laid-open No. 121362/1991.

Meanwhile, there has heretofore been well known an automatic transmission of so-called "twin clutch type" including two clutches which are arranged in parallel with a transmission input shaft, and a plurality of gear trains which are arranged on the respective output shafts of the two clutches and which are selectively connected with a transmission output shaft by synchro mechanism. With the automatic transmission of this type, a predetermined gearshift is executed by the combination of the selective connection of the gear trains and the clutch-to-clutch changeover of the two clutches.

In order to attain the alleviation of the gearshift shock and the shortening of the gearshifting time period, the automatic transmission of such twin clutch type is usually so controlled that the gear train corresponding to the next gearshift stage anticipated is connected on standby beforehand, whereupon the actual gearshift can be implemented by only the changeover between the two clutches. The changeover between the two clutches is the so-called "clutch-to-clutch changeover".

The control technique concerning the power-ON skip downshift as disclosed in the above official gazette of Japanese Patent Application Laid-open No. 121362/1991 is so constructed that a one-way clutch is used for achieving the intermediate stage. Accordingly, the prior-art technique has the problem that it cannot be simply applied to an automatic transmission of the type in which the intermediate stage is also achieved by the clutch-to-clutch operation. Moreover, in a case where the automatic transmission is one of the so-called twin clutch type, circumstances are further complicated. Therefore, the prior-art technique has the problem that it cannot be applied at all.

More specifically, the twin clutch type automatic transmission is under the circumstances that the first gearshift from the higher speed stage to the intermediate stage is the clutch-to-clutch gearshift from one of the clutches to the other, while the second gearshift from the intermediate stage to the lower speed stage is the clutch-to-clutch gearshift from the other clutch to the "original" clutch (one clutch). Further, it is under the circumstances that the synchro mechanism needs to be switched over midway of the above operation of the clutch-to-clutch gearshifts. Therefore, the technique as disclosed in the official gazette of Japanese Patent Application Laid-open No. 121362/1991 has heretofore been hardly applicable to the automatic transmission of the twin clutch type.

It might be suggested to control the automatic transmission of this type so that, when a request for the skip downshift has been made, the entire gearshift may be executed by only the switchover of the synchro mechanism without. the aid of the intermediate stage, in other words, without the operations of the two clutches. Such a control, however, cannot be adopted for the reason that the switchover of the synchro mechanism is actually impossible.

Accordingly, the automatic transmission of this type has heretofore been controlled in compliance with the request for the skip downshift by performing merely in succession the three operations, that is, implementing the first gearshift of the higher speed stage→the intermediate stage, thereafter switching over the synchro mechanism, and subsequently implementing the second gearshift of the intermediate stage→the lower speed stage.

The control method of the mere succession of the first gearshift~the switchover of the synchro mechanism~the second gearshift, however, has the problem that the time period required till the end of the entire gearshift becomes very long notwithstanding the skip downshift is usually executed when the gearshift is to be completed as soon as possible.

SUMMARY OF THE INVENTION

The present invention has been made in view of the problems of the prior art as stated above, and has an object to provide, in an automatic transmission of so-called "twin clutch type", a skip downshift control apparatus in which a skip downshift can be smoothly executed in a short gear-shifting time period and with a light gearshift shock.

The structure of the present invention as defined in claim 1 concerns a skip downshift control apparatus for an automatic transmission having two clutches which are arranged in parallel with a transmission input shaft, and a plurality of gear trains which are arranged on respective output shafts of the two clutches and which are selectively connected with a transmission output shaft by a synchro mechanism, wherein a skip downshift, in which a first gearshift from a higher speed stage to an intermediate stage and a second gearshift from the intermediate stage to a lower speed stage are successively implemented, is executed in a power-ON state by a combination of the selective connection of the gear trains and clutch-to-clutch changeover of the two clutches. Herein, the structure comprises the following means in order to accomplish the above object. That is, detection means detects that a gearshift judgement for the execution of the skip downshift has been made. After the detection of the gearshift judgement, clutch release means releases one of the two clutches on the higher-speed-stage side of the first gearshift. After the release of the higher-speed-stage side clutch, command issue means issues a command for switching over the synchro mechanism from the higher-speed-stage side of the first gearshift to the lower-speed-stage side of the second gearshift. Further detection means detects that the r.p.m. (revolutions per minute:speed) of the transmission input shaft has arrived at the synchronous r.p.m. of the intermediate stage of the first gearshift owing to the release of the higher-speed-stage side clutch. After the detection of the arrival of the r.p.m. of the transmission input shaft at the synchronous r.p.m. of the intermediate stage, pressure raising means raises the oil pressure of the clutch on the intermediate-stage side of the second gearshift until the r.p.m. of the transmission input shaft arrives at a value which is obtained by adding a predetermined magnitude to the synchronous r.p.m. of the lower speed stage of the second gearshift, in order that the rising rate of the r.p.m. of the transmission input shaft may become a predetermined value. After the arrival of the r.p.m. of the transmission input shaft at the value which is obtained by adding the predetermined magnitude to the synchronous r.p.m. of the lower speed stage of the second gearshift, pressure control means controls the oil pressure of the intermediate-stage side clutch of the second gearshift so as to maintain the r.p.m. value arrived at. Confirmation means confirms that the r.p.m. of the transmission input shaft is equal to or greater than the synchronous r.p.m. of the lower speed stage of the second gearshift, and that the switchover of the synchro mechanism has been completed. After the confirmation, further pressure control means gradually raises the oil pressure of the clutch on the lower-speed-stage side of the second gearshift and gradually lowers the oil pressure of the intermediate-stage side clutch of the second gearshift.

In the structure defined in claim 1, the structure of the present invention as defined in claim 2 further comprises means for judging whether or not the switchover of the synchro mechanism has been completed within a predetermined time period since the issue of the command for the switchover. Herein, subject to the judgement that the switchover of the synchro mechanism has not been completed within the predetermined time period since the issue of the command for the switchover, the second gearshift is canceled at the time of the judgement, thereby to alter the skip downshift to a downshift which includes only the first gearshift. Thus, even if the synchro mechanism has undergone any trouble in performing the structure of the present invention as defined in claim 1, the clutches can be effectively prevented from spoiling their durabilities due to the trouble.

The structure of the present invention as defined in claim 3 concerns a skip downshift control apparatus for an automatic transmission having two clutches which are arranged in parallel with a transmission input shaft, and a plurality of gear trains which are arranged on respective output shafts of the two clutches and which are selectively connected with a transmission output shaft by a synchro mechanism, wherein a skip downshift, in which a first gearshift from a higher speed stage to an intermediate stage and a second gearshift from the intermediate stage to a lower speed stage are successively implemented, is executed in a power-OFF state by a combination of the selective connection of the gear trains and clutch-to-clutch changeover of the two clutches. Herein, the structure comprises the following means in order to similarly accomplish the above object. That is, detection means detects that a gearshift judgement for the execution of the skip downshift has been made. After the detection of the gearshift judgement, clutch release means releases one of the two clutches on the higher-speed-stage side of the first gearshift. After the release of the higher-speed-stage side clutch, command issue means issues a command for switching over the synchro mechanism from the higher-speed-stage side of the first gearshift to the lower-speed-stage side of the second gearshift. After the issue of the switchover command, pressure raising means raises the oil pressure of the clutch on the intermediate-stage side of the second gearshift until the r.p.m. of the transmission input shaft arrives at a value which is lower than synchronous r.p.m. of the intermediate stage of the first gearshift by a predetermined magnitude, in order that the rising rate of the r.p.m. of the transmission input shaft may become a predetermined value. After the arrival of the r.p.m. of the transmission input shaft at the value which is lower than the synchronous r.p.m. of the intermediate stage of the first gearshift by the predetermined magnitude, pressure control means controls the oil pressure of the intermediate-stage side clutch so as to maintain the r.p.m. value arrived at. Confirmation means confirms that the switchover of the synchro mechanism has been completed. After the confirmation, further pressure control means gradually raises the oil pressure of the clutch on the lower-speed-stage side of the second gearshift and gradually lowers the oil pressure of the intermediate-stage side clutch of the second gearshift, in order that the rising rate of the r.p.m. of the transmission input shaft may become a predetermined value.

Here in this specification, the expressions "a clutch on a higher-speed-stage side", "a clutch on an intermediate-stage side" and "a clutch on a lower-speed-stage side" shall indicate clutches which are respectively involved in maintaining a higher speed stage, an intermediate stage and a lower speed stage (clutches which are respectively engaged to establish the corresponding gearshift stages). Regarding an automatic transmission of twin clutch type, two clutches repeat engagements and releases alternately. In case of a skip gearshift including one intermediate stage, therefore, the "clutch on the higher-speed-stage side" and the "clutch on the lower-speed-stage side" actually become the identical clutch.

More specifically, in the first gearshift of the higher speed stage→the intermediate stage, there are performed the operations of releasing one clutch held in engagement till then (the clutch on the higher-speed-stage side of the first gearshift) and engaging the other clutch held released till then (the clutch on the intermediate-stage side of the first gearshift). Besides, in the second gearshift of the intermediate stage→the lower speed stage, one clutch mentioned above, once actuated toward the release (the clutch on the lower-speed-stage side of the second gearshift) is engaged again, and the other clutch mentioned above, once actuated toward the engagement (the clutch on the higher-speed-stage side of the second gearshift) is released again.

Needless to say, unless the clutches are appropriately changed over, the automatic transmission comes near into a neutral state to incur the blowing-up of engine r.p.m. or to prolong a gearshifting time period. Otherwise, the automatic transmission comes near into a locking state to spoil the durability of a power transmission system or to give rise to a heavy gearshift shock. In the present invention, such drawbacks are reasonably eliminated.

The structure of the present invention as defined in claim 1 relates to a skip downshift in a power-ON state (the state in which an accelerator pedal is pressed). Here in the structure, the intermediate stage is involved in the power-ON skip downshift from the higher speed stage to the lower speed stage. In actuality, however, the intermediate stage is not completely established, but the midway semi-established state of this intermediate stage is utilized.

More specifically, when the clutch on the higher-speed-stage side (of the first gearshift) is released (the engine r.p.m. is about to rise because of the power-ON state), the r.p.m. of the input shaft of the automatic transmission (hereinbelow, termed the "input shaft r.p.m.") begins to rise. The release of the higher-speed-stage side clutch permits the synchro mechanism to be switched over. On this occasion, therefore, a command for switching over the synchro mechanism from the higher-speed-stage side of the first gearshift to the lower-speed-stage side of the second gearshift is issued to initiate the switchover. When the input shaft r.p.m. has arrived at the synchronous r.p.m. of the intermediate stage in due course, the oil pressure of the clutch on the intermediate-stage side is raised.

The intermediate-stage side clutch is not fully or completely engaged, but it is maintained in a slip state. Unless it is fully engaged, the input shaft r.p.m. can exceed the synchronous r.p.m. of the intermediate stage and can further exceed the synchronous r.p.m. of the lower speed stage. In this course, when the oil pressure of the intermediate-stage side clutch is heightened to diminish the slip thereof (to intensify the engaging force thereof), the rising rate of the input shaft r.p.m. decreases. In contrast, when the oil pressure of the intermediate-stage side clutch is lowered to augment the slip thereof (to weaken the engaging force thereof), the rising rate of the input shaft r.p.m. increases. Therefore, the slip state of the intermediate-stage side clutch can be utilized as means for smoothly raising the input shaft r.p.m. at a predetermined rate.

With the structure of the present invention as defined in claim 1, when the input shaft r.p.m. has exceeded the synchronous r.p.m. of the lower speed stage in this way, the oil pressure of the intermediate-stage side clutch is adjusted so as to maintain r.p.m. which is somewhat higher than the synchronous r.p.m. of the lower speed stage (a value which is higher by a predetermined magnitude), and the completion of the switchover of the synchro mechanism is waited. The reason why the input shaft r.p.m. is maintained at the value being higher than the synchronous r.p.m. of the lower speed stage by the predetermined magnitude, during the switchover of the synchro mechanism is waited, is to smoothen the changeover between the intermediate-stage side clutch and the lower-speed-stage side clutch in the second gearshift. More specifically, during the switchover of the synchro mechanism is waited, the intermediate-stage side clutch has a transmission torque capacity, so that the input shaft r.p.m. is maintained near the synchronous r.p.m. of the lower speed stage. It is the final situation, however, that the lower-speed-stage side clutch has the full capacity with the intermediate-stage side clutch released completely. Therefore, both the clutches must be favorably changed over on this occasion. It might be intended that the input shaft r.p.m. is maintained at the very synchronous r.p.m. of the lower speed stage by the intermediate-stage side clutch.

In this case, however, when the input shaft r.p.m. is actually held lower than the synchronous r.p.m. of the lower speed stage on account of the manufactual discrepancies of the constituents of the automatic transmission, this operating situation interferes with the engagement of the lower-speed-stage side clutch functioning to make the input shaft r.p.m. higher from the above lowered r.p.m. (to the synchronous r.p.m. of the lower speed stage), and so-called "(semi-) locking" takes place. In this regard, when the input shaft r.p.m. is maintained higher than the synchronous r.p.m. of the lower speed stage in spite of the manufactural discrepancies, the lower-speed-stage side clutch can be smoothly shifted into the complete engagement, and the locking does not occur.

When the completion of the switchover of the synchro mechanism has been confirmed in due course, the oil pressure of the lower-speed-stage side clutch is raised, and the intermediate-stage side clutch is released at a proper timing (at which the lower-speed-stage side clutch begins to be engaged, in conformity with the known simple clutch-to-clutch control). Thus, the power-ON skip downshift from the higher speed stage to the lower speed stage is completed.

With the structure of the present invention as defined in claim 1, although the skip downshift in the power-ON state is executed by utilizing the clutch-to-clutch operation for the intermediate-stage side clutch in this manner, but in actuality, the semi-established intermediate stage is involved, so that the gearshift of short gearshifting time period and light gearshift shock can be realized.

Incidentally, the expression in claim 1 reading "raising an oil pressure of the clutch on an intermediate-stage side" shall signify "pressure rise for substantially endowing the intermediate-stage side clutch with a transmission torque capacity". It is accordingly allowed to initiate at any time the preliminary operation of previously holding the intermediate-stage side clutch on standby with the very limit pressure value with which this clutch has any or no transmission torque capacity, in order to close the clutch pack of this clutch as in an embodiment to be described later by way of example.

Especially, the oil pressure of the intermediate-stage side clutch can be subjected to a "feedback control" so as to maintain the input shaft r.p.m. of the automatic transmission at (the synchronous r.p.m. of the lower speed stage+a predetermined magnitude). In this case, when the lower-speed-stage side clutch has gained a transmission torque capacity to lower the input shaft r.p.m. down to the synchronous r.p.m. of the lower speed stage, the oil pressure of the intermediate-stage side clutch which is feedback-controlled so as to maintain the above value higher than this synchronous r.p.m. is "automatically" shifted toward the release side (inevitably). It is therefore permitted to change over the intermediate-stage and lower-speed-stage side clutches very smoothly.

The structure of the present invention as defined in claim 3 relates to a skip downshift in a power-OFF state (the state in which the accelerator pedal is loosened). Also here, although the intermediate stage is involved in the skip downshift from the higher speed stage to the lower speed stage, in actuality, however, the intermediate stage is not completely established, and in the course of establishing the intermediate stage, a synchro mechanism is switched over conjointly, thereby to alleviate a gearshift shock and to shorten a gearshifting time period.

More specifically, when the clutch on the higher-speed-stage side (of the first gearshift) is released (the engine r.p.m. is about to lower because of the power-OFF state), the input shaft r.p.m. of the automatic transmission begins to lower. The release of the higher-speed-stage side clutch permits the synchro mechanism to be switched over. On this occasion, therefore, a command is issued for switching over the synchro mechanism from the higher-speed-stage side of the first gearshift to the lower-speed-stage side of the second gearshift. On the other hand, the oil pressure of the clutch on the intermediate-stage side is raised, thereby to raise the input shaft r.p.m. at a specific rate (a predetermined speed) near to the synchronous r.p.m. of the intermediate stage. Since the engine r.p.m. is about to lower in the case of power-OFF, when the oil pressure of the intermediate-stage side clutch is heightened to diminish the slip thereof (to intensify the engaging force thereof), the rising rate of the input shaft r.p.m. tends to increase. In contrast, when the oil pressure of the intermediate-stage side clutch is lowered to augment the slip thereof (to weaken the engaging force thereof), the rising rate of the input shaft r.p.m. tends to decrease. Therefore, the slip state of the intermediate-stage side clutch can be utilized as means for smoothly raising the input shaft r.p.m.

In the case of the power-OFF, the input shaft r.p.m. cannot be made higher than the synchronous r.p.m. of the intermediate stage by the engagement of the intermediate-stage side clutch. Therefore, when the input shaft r.p.m. has come near to the synchronous r.p.m. of the intermediate stage in this way, the oil pressure of the intermediate-stage side clutch is adjusted so as to maintain r.p.m. which is somewhat lower than the synchronous r.p.m. of the intermediate stage (a value which is lower by a predetermined magnitude including "0"), and the completion of the switchover of the synchro mechanism is waited. When the value being lower than the synchronous r.p.m. of the intermediate stage by the predetermined magnitude is maintained, it is possible to alleviate both a shock which arises on the occasion of the complete engagement of the intermediate-stage side clutch, and a shock which arises on the occasion of the beginning of the release of the intermediate-stage side clutch from the complete engagement thereof.

After the completion of the switchover of the synchro mechanism has been confirmed, the oil pressure of the lower-speed-stage side clutch (of the second gearshift) is raised so as to heighten the input shaft r.p.m. at a predetermined rate, and the intermediate-stage side clutch is released at a proper timing (at which the lower-speed-stage side clutch begins to be released, in conformity with the known simple clutch-to-clutch gearshift). Thus, the power-OFF skip downshift from the higher speed stage to the lower speed stage is completed.

Incidentally, also in claim 3, the expression "raising an oil pressure of the clutch on an intermediate-stage side" shall signify "pressure rise for substantially endowing the intermediate-stage side clutch with a transmission torque capacity". It is accordingly allowed to initiate at any time the preliminary operation of previously holding the intermediate-stage side clutch on standby with the very limit pressure value with which this clutch has any or no transmission torque capacity, in order to close the clutch pack of this clutch as in an embodiment to be described later by way of example.

In the case of the power-OFF, the input shaft r.p.m. of the automatic transmission tends to lower due to the drain of the oil pressure of the higher-speed-stage side clutch of the first gearshift. Therefore, the above preliminary operation should desirably be performed earlier.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIGS. 3A and 3B are tables showing the engagement states of the frictional engagement devices of the automatic transmission and the switchover states of the synchro mechanisms thereof;

DETAILED DESCRIPTION OF THE PREFERRED EMBODIMENTS

Now, the embodiments of the present invention will be described in detail with reference to the drawings.

Figure 2:
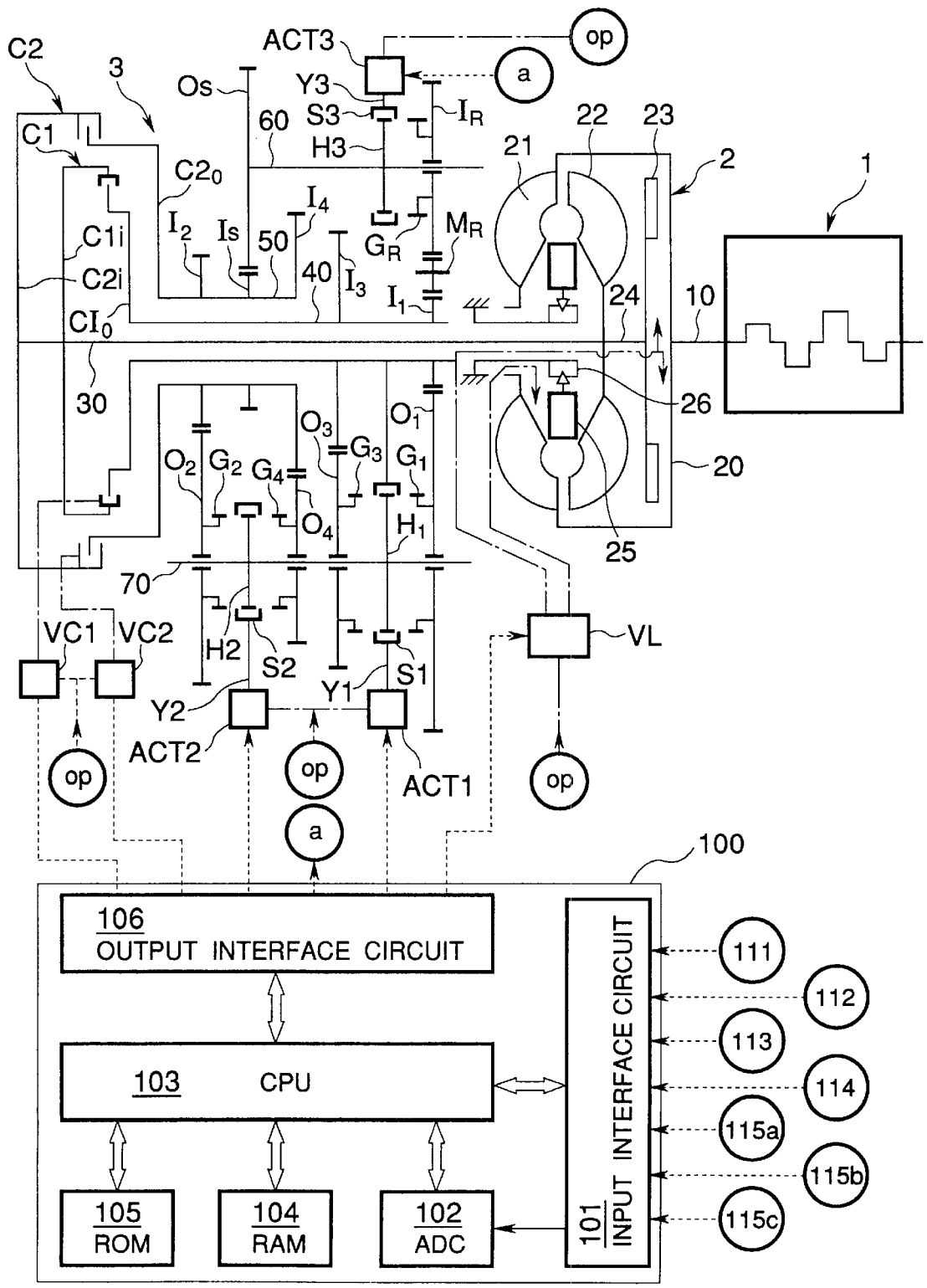
FIG. 2 is a block diagram schematically showing an automatic transmission for a motor vehicle, to which the present invention is applied.

FIG. 2 is a diagram showing, in model-like fashion, the whole structure of a four-stage automatic transmission of twin clutch type furnished with a torque converter, to which the present invention is applied.

Referring to FIG. 2, numeral 1 designates the engine of a motor vehicle, numeral 2 the torque converter equipped with a lockup mechanism, and numeral 3 the twin clutch type automatic transmission.

The output shaft 10 of the engine 1 is connected to the front cover 20 of the torque converter 2. The front cover 20 is connected to the output shaft 24 of the torque converter 2 through a lockup clutch 23 only, or through a pump impeller 21 and a turbine 22 which are connected to each other through a fluid stream. The output shaft 24 of the torque converter 2 is connected to the input shaft (transmission input shaft) 30 of the twin clutch type automatic transmission 3 so as to be unitarily rotatable. Incidentally, numeral 25 indicates a stator, and numeral 26 a one-way clutch.

Connected to the input shaft 30 are the first-clutch input disc C1i of a first clutch C1 and the second-clutch input disc C2i of a second clutch C2.

The first-clutch output disc C1o of the first clutch C1 and the second-clutch output disc C2o of the second clutch C2 have a first-clutch output shaft 40 and a second-clutch output shaft 50 connected thereto, respectively. The output shafts 40 and 50 are coaxially arranged outside the input shaft 30.

A countershaft 60 and an output shaft (transmission output shaft) 70 are disposed in parallel with the input shaft 30 and output shafts 40 and 50.

A second-speed drive gear I2, a countershaft drive gear Is, and a fourth-speed drive gear I4 are fixedly connected to the second-clutch output shaft 50.

Also, a third-speed drive gear I3 is fixedly connected to the first-clutch output shaft 40 so as to adjoin the fourth-speed drive gear I4. Further, a first-speed drive gear I1 is fixedly connected to the side of the first-clutch output shaft 40 near to the torque converter 2.

Rotatably mounted on the output shaft 70 are a second-speed driven gear O2 which is always in mesh with the second-speed drive gear I2, a fourth-speed driven gear O4 which is always in mesh with the fourth-speed drive gear I4, a third-speed driven gear O3 which is always in mesh with the third-speed drive gear I3, and a first-speed driven gear O1 which is always in mesh with the first-speed drive gear I1.

A first synchro (synchro mechanism) D1 is configured of a first hub H1 which is fixedly connected to the output shaft 70, and a first sleeve S1 which is mounted on the outer peripheral edge of the first hub H1 so as to be slidable in the axial direction of the automatic transmission structure. The first sleeve S1 is moved through a first shift fork Y1 by a first-sleeve actuator ACT1 so as to come into engagement with a first-speed clutch gear G1 which is fixedly coupled to the first-speed driven gear O1, or with a third-speed clutch gear G3 which is fixedly coupled to the third-speed driven gear O3. Thus, the first-speed driven gear O1 and the third-speed driven gear O3 are selectively connected to the output shaft 70.

Likewise, a second synchro (synchro mechanism) D2 is configured of a second hub H2 which is fixedly connected to the output shaft 70, and a second sleeve S2 which is mounted on the outer peripheral edge of the second hub H2 so as to be axially slidable. The second sleeve S2 is moved through a second shift fork Y2 by a second-sleeve actuator ACT2 so as to come into engagement with a fourth-speed clutch gear G4 which is fixedly coupled to the fourth-speed driven gear O4, or with a second-speed clutch gear G2 which is fixedly coupled to the second-speed driven gear O2. Thus, the fourth-speed driven gear O4 and the second-speed driven gear O2 are selectively connected to the output shaft 70.

Disposed on the countershaft 60 are a countershaft driven gear Os which is always in mesh with the countershaft drive gear Is, and a reverse drive gear IR which is always in mesh with the first-speed drive gear I1 through an idler gear MR. The countershaft driven gear Os is fixedly connected to the countershaft 60, and is always rotated unitarily with the countershaft 60. In contrast, the reverse drive gear IR is rotatably mounted around the countershaft 60, and it is selectively connected to the countershaft 60 by a third synchro (synchro mechanism) D3 which is disposed midway between both the gears Os and IR.

The third synchro D3 is configured of a third hub H3 which is fixedly connected to the countershaft 60, and a third sleeve S3 which is mounted on the outer peripheral edge of the third hub H3 so as to be axially slidable. The third sleeve S3 is moved through a third shift fork Y3 by a third-sleeve actuator ACT3 so as to come into engagement with a reverse clutch gear GR which is fixedly coupled to the reverse drive gear IR. Thus, the reverse drive gear IR is selectively rotated unitarily with the countershaft 60.

FIGS. 3A and 3B illustrate the states of the engagements of the first clutch C1, second clutch C2, first sleeve S1, second sleeve S2 and third sleeve S3 at the respective speed stages.

Mark ○ indicates the engagement for transmitting power at the pertinent gearshift stage. Marks Δ and ∇ indicate the engagements which are respectively added for the preliminary selections for a downshift and for an upshift. The engagement added for the preliminary selection does not contribute to the transmission of the power at the pertinent gearshift stage.

Concretely, at the first speed stage, the first clutch C1 is held in engagement, the first-clutch output shaft 40 coupled to the first-clutch output disc C1o is rotated along with the first-speed drive gear I1 as well as the third-speed drive gear I3, and the first-speed driven gear O1 being always in mesh with the first-speed drive gear I1 is rotated. Besides, the first sleeve S1 is located on its side of the first-speed clutch gear G1. Thus, the output shaft 70 is rotated along with the first hub H1 as well as the second hub H2, and the power is transmitted.

At the second speed stage, the second clutch C2 is held in engagement, the second-clutch output shaft 50 coupled to the second-clutch output disc C2o is rotated along with the second-speed drive gear I2, fourth-speed drive gear I4 and countershaft drive gear Is, and the second-speed driven gear O2 being always in mesh with the second-speed drive gear I2 is rotated. Besides, the second sleeve S2 is located on its side of the second-speed clutch gear G2. Thus, the output shaft 70 is rotated along with the first hub H1 as well as the second hub H2, and the power is transmitted.

At the third speed stage, the first clutch C1 is held in engagement, the first-clutch output shaft 40 coupled to the first-clutch output disc C1o is rotated along with the first-speed drive gear I1 as well as the third-speed drive gear I3, and the third-speed driven gear O3 being always in mesh with the third-speed drive gear I3 is rotated. Besides, the first sleeve SI is located on its side of the third-speed clutch gear G3 as stated before. Thus, the output shaft 70 is rotated along with the first hub H1 as well as the second hub H2, and the power is transmitted.

At the fourth speed stage, the second clutch C2 is held in engagement, the second-clutch output shaft 50 coupled to the second-clutch output disc C2o is rotated along with the second-speed drive gear I2, fourth-speed drive gear I4 and countershaft drive gear Is, and the fourth-speed driven gear O4 being always in mesh with the fourth-speed drive gear I4 is rotated. Besides, the second sleeve S2 is located on its side of the fourth-speed clutch gear G4. Thus, the output shaft 70 is rotated along with the first hub H1 as well as the second hub H2, and the power is transmitted.

At the reverse stage, the second clutch C2 is held in engagement, the second-clutch output shaft 50 coupled to the second-clutch output disc C2o is rotated along with the second-speed drive gear I2, fourth-speed drive gear I4 and countershaft drive gear Is, and the countershaft 60 is rotated through the countershaft driven gear Os being always in mesh with the counter shaft drive gear Is. Further, the third sleeve S3 is located on its side of the reverse clutch gear GR, so that the reverse drive gear IR is rotated, resulting in the rotation of the first-speed driven gear O1 through the reserve idler gear MR. Besides, the first sleeve S1 is located on its side of the first-speed clutch gear GI. Thus, the output shaft 70 is rotated along with the first hub H1 as well as the second hub H2, and the power is transmitted.

Herein, the gearshift between the respective gearshift stages is executed in such a way that the sleeve necessary for completing the transmission path of the gearshift stage to be established after the gearshift is moved till its engagement, that while one clutch used before the gearshift is being released, the other clutch to be used after the gearshift is gradually engaged, and that the sleeve completing the transmission path of the gearshift stage established before the gearshift is moved till its release.

By way of example, the gearshift from the second speed stage to the third speed stage is so executed that the first sleeve S1 is moved so as to be engaged with the third-speed clutch gear G3, that while the second clutch C2 is being released, the first clutch C1 is brought into engagement, and that the second sleeve S2 is moved so as to be disengaged from the second-speed clutch gear G2.

By the way, in this embodiment, as indicated in FIG. 3B, the next gearshift stage is anticipated from the drive environment (for example, vehicle speed) of the motor vehicle at the current time, and the synchro mechanism corresponding to the anticipated gearshift stage is brought into engagement beforehand. Thus, the changeover control of the clutches can be started as soon as the gearshift has been judged (as will be described later).

The controls of engaging and releasing the first clutch C1 and the second clutch C2 (the clutch-to-clutch changeover control) are performed in such a way that a first-clutch clutch plate (not shown) and a second-clutch clutch plate (not shown) connected to the first-clutch input disc C1i and second-clutch input disc C2i are respectively brought into frictional engagements with another first-clutch clutch plate (not shown) and another second-clutch clutch plate (not shown) connected to the first-clutch output disc C1o and second-clutch output disc C2o, by a first-clutch piston (not shown) and a second-clutch piston (not shown) which are hydraulically driven.

The pistons are driven in such a way that the working oil of an oil-pressure supply source OP shown in FIG. 2 is fed into and drained out of corresponding piston oil chambers. More specifically, the working oil is fed and drained by finely controlling a first-clutch supply-oil-pressure control valve VC1 and a second-clutch supply-oil-pressure control valve VC2 by means of an electronic control unit (hereinbelow, abbreviated to "ECU") 100.

As stated before, the first sleeve S1, second sleeve S2 and third sleeve S3 are respectively moved by the first-sleeve actuator ACT1, second-sleeve actuator ACT2 and third-sleeve actuator ACT3.

Although the structure of each of the sleeve actuators ACT1~ACT3 shall be omitted from detailed description, a piston to which the corresponding shift fork is connected is moved in a desired direction by feeding and draining the working oil of the oil-pressure supply source OP into and out of piston oil chambers which are formed on both the sides of the piston. For such an operation, a valve for controlling the feed of the working oil into the corresponding piston oil chamber, and a valve for controlling the drain thereof out of the same are provided, and the opening and closure of these valves are controlled by the ECU 100.

In the present invention, it is necessary to check if the sleeves S1~S3 have moved as predetermined. Therefore, the first-sleeve actuator ACT1, second-sleeve actuator ACT2 and third-sleeve actuator ACT3 include first, second and third sleeve position sensors 115a, 115b and 115c which detect the positions of the corresponding sleeves from the movements of the pistons, respectively. The signals of these sensors are sent to the input interface circuit 101 of the ECU 100.

The ECU 100 is constructed of a digital computer including the input interface circuit 101, an ADC (analog-to-digital converter) 102, a CPU (microprocessor) 103, a RAM (random access memory) 104, a ROM (read-only memory) 105 and an output interface circuit 106 which are interconnected.

The CPU 103 is supplied through the input interface circuit 101 or further through the ADC 102 with the output signals of various sensors such as a gear stage sensor 111 for detecting a gear stage position, a vehicle speed sensor 112 for detecting the vehicle speed (r.p.m. of the output shaft 70 of the transmission 3), a throttle opening sensor 113 for outputting the degree of opening of a throttle valve, an input-shaft r.p.m. sensor 114 for detecting the r.p.m. of the input shaft 30, and the sleeve position sensors 115a, 115b and 115c which are disposed in the respective sleeve actuators for detecting the sleeve positions as stated before.

In order to perform the control of the present invention as will be explained below, the CPU 103 generates signals on the basis of the output values of the various sensors and data stored in the ROM 105 beforehand. The signals include ones for controlling the sleeve actuators ACT1~ACT3 which move the respectively corresponding sleeves S1~S3, ones for controlling the first-clutch supply-oil-pressure control valve VC1 and second-clutch supply-oil-pressure control valve VC2 which control the respectively corresponding clutches C1 and C2 of the twin-clutch type automatic transmission 3, and one for controlling a lockup oil-pressure control valve VL which controls the lockup clutch 23. The generated signals are delivered to the respectively corresponding constituents through the output interface circuit 106.

Now, the contents of the control will be detailed.

First, there will be described an embodiment which concerns a skip downshift in a power-ON state.

The present embodiment can cope with all skip and ordinary (single-stage) power-ON downshifts in accordance with flow charts to be explained later. Here, however, a power-ON skip downshift from the fourth speed stage to the second speed stage as is typical of the power-ON downshifts will be described with reference to FIG. 1 in order to facilitate understanding.

As seen from FIG. 3A, in this case, the second clutch C2 establishing the fourth speed stage corresponds to a higher-speed-stage clutch, the first clutch C1 establishing the third speed stage corresponds to an intermediate-stage clutch, and the second clutch C2 establishing the second speed stage corresponds to a lower-speed-stage clutch. As already referred to, the clutch on the higher-speed-stage side and the clutch on the lower-speed-stage side are actually the (identical) second clutch C2.

Figure 1:
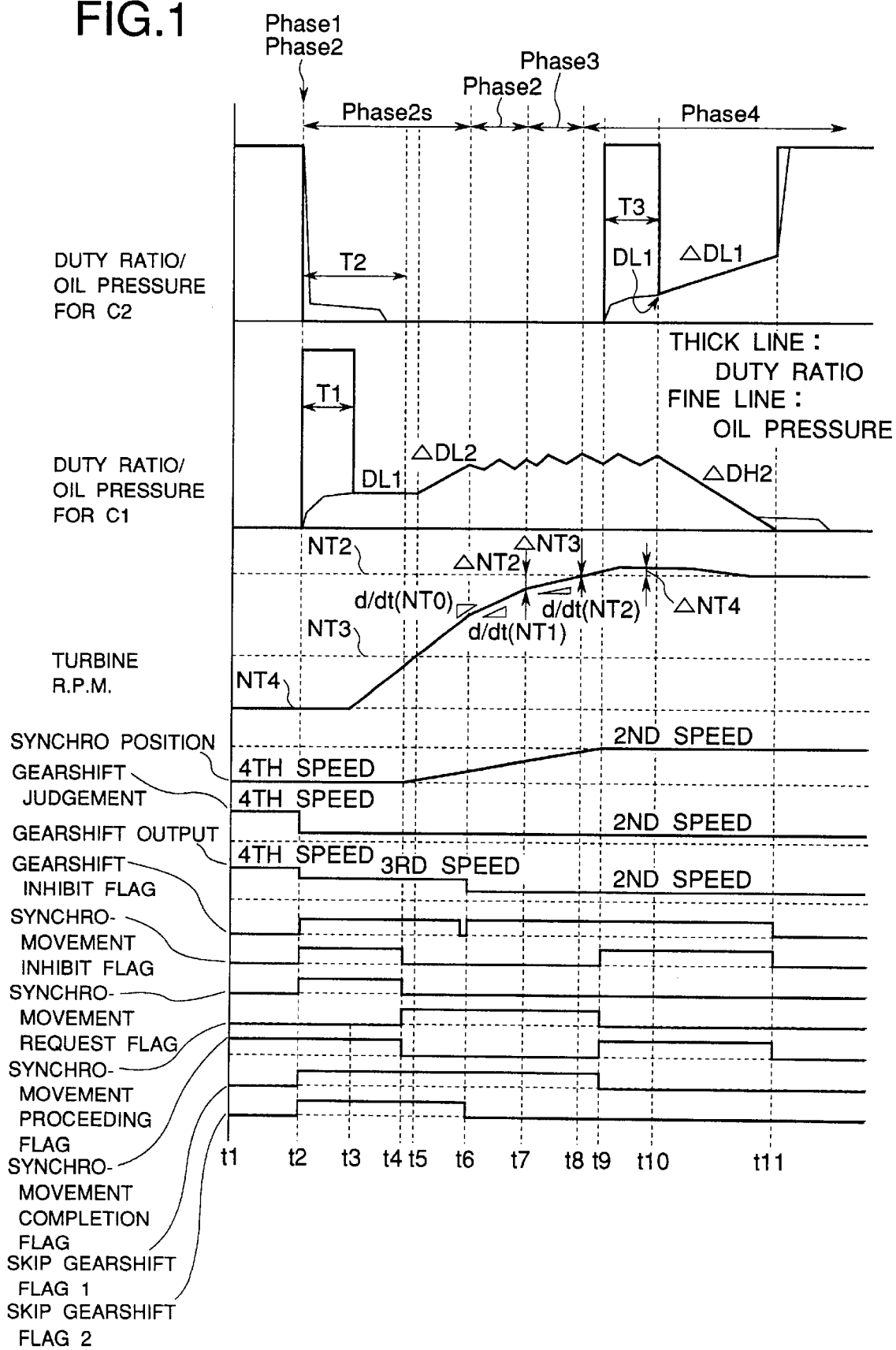
FIG. 1 is a time chart showing control characteristics in the case where the present invention is applied to a power-ON skip downshift of twin clutch type.

FIG. 1 is a time chart showing the contents of the control operation of the power-ON 4→2 downshift. The time chart illustrates the correlations among a duty ratio for the second clutch C2 which serves for both the fourth speed stage (higher speed stage) and the second speed stage (lower speed stage), a duty ratio for the first clutch C1 which serves for the third speed stage (intermediate stage), turbine r.p.m. (=r.p.m. of the transmission input shaft 30) NT, the switchover state of the second synchro D2, a gearshift judgement, a gearshift output, and the statuses of flags. In the figure, a thick line indicates the duty ratio, while a fine line indicates an oil pressure. Herein, a line pressure of 100% is fed to the corresponding clutch for the duty ratio of 100%, whereas the oil pressure of the corresponding clutch is completely drained for the duty ratio of 0%.

A part indicated by a time t1 at the left end of FIG. 1 illustrates the state before the gearshift operation in which the second clutch C2 is fully or completely engaged, and in which the first clutch C1 is fully released (the state in which the fourth speed stage is established).

Upon the judgement of the gearshift of the power-ON skip downshift from the illustrated state of the fourth speed stage to the second speed stage, the duty ratio of the second clutch C2 is brought down to 0% at a time t2 so as to release the second clutch C2. Simultaneously, the duty ratio of 100% is outputted for a term T1 in order to engage the first clutch C1 (as the operation of so-called "first quick fill"). Thereafter, the duty ratio is lowered down to a level DL1, and the first clutch C1 is held on standby in this state. The duty ratio DL1 is the very limit value with which the first clutch C1 has no transmission torque capacity.

Owing to the release of the second clutch C2, the turbine r.p.m. NT begins to rise at a time t3 (because of the power-ON state).

On the other hand, when it is detected at a time t4 that the time period of a drain timer T2 started counting at the time t2 has lapsed (assuming that the second clutch C2 has been fully released), a command for switching over the second synchro D2 from the fourth speed position to the second speed position is issued. The reasons why the switchover command for the second synchro D2 is issued upon the time-out of the drain timer T2, are that, when the second clutch C2 has a transmission torque capacity even if slightly, the switchover of the second synchro D2 might be hindered, and that the switchover should preferably be initiated as early as possible without hindrance.

In due course, when it is judged at a time t5 that the turbine r.p.m. NT has arrived at the synchronous r.p.m. NT3 of the third speed stage (intermediate stage), the duty ratio of the first clutch C1 is gradually increased at a rate ΔDL2 since the time t5. The rate ΔDL2 corresponds to a value which raises the turbine r.p.m. NT at a predetermined rising rate d/dt(NT0).

When the duty ratio of the first clutch C1 is raised at the predetermined rate ΔDL2, the first clutch C1 begins to have a considerable amount of transmission torque capacity, and the rising rate of the turbine r.p.m. NT lowers to a predetermined value or less (a time t6). During a time interval from the time t6 to a time t7 at which the turbine r.p.m. NT becomes a value being smaller than the synchronous r.p.m. NT2 of the second speed stage (lower speed stage) by ΔNT2, the duty ratio of the first clutch C1 is feedback-controlled in order that the turbine r.p.m. NT may increase at a predetermined rising rate d/dt(NT1).

Further, during a time interval from the time t7 to a time t8 at which the turbine r.p.m. NT reaches a value being smaller than the synchronous r.p.m. NT2 of the second speed stage by ΔNT3 (a predetermined magnitude close to zero), the duty ratio of the first clutch C1 is feedback-controlled in order that the rising rate of the turbine r.p.m. NT may become d/dt(NT2).

After the turbine r.p.m. NT has become the value being smaller than the synchronous r.p.m. NT2 of the second speed stage by ΔNT3 (the predetermined magnitude close to zero) at the time t8, the duty ratio of the first clutch C1 is feedback-controlled in order that the turbine r.p.m. NT may maintain a value which is greater than the synchronous r.p.m. NT2 of the second speed stage by a predetermined magnitude ΔNT4. In this state, the completion of the switchover of the second synchro D2 is waited.

When it is confirmed at a time t9 that the switchover of the second synchro D2 has been completed, the duty ratio of 100% is outputted here (as the "first quick fill") for a predetermined time period T3 in order to engage again the second clutch C2 which serves as the clutch on the side of the lower speed stage (of the second gearshift). Thereafter, the duty ratio is increased at a rate ΔDL1 since a time t10 (from a value DL1) so as to gradually engage the second clutch C2.

Meantime, the first clutch C1 is kept operating so as to feedback-control the duty ratio in order that the turbine r.p.m. NT may maintain the value which is greater than the synchronous r.p.m. NT2 of the second speed stage by the predetermined magnitude ΔNT4. However, when the second clutch C2 begins to have a transmission torque capacity, the turbine r.p.m. NT begins to converge toward the synchronous r.p.m. NT2 of the second speed stage. Therefore, that duty ratio of the first clutch C1, which is feedback-controlled so as to maintain the turbine r.p.m. value higher than the synchronous r.p.m. NT2, automatically changes toward 0%

(at a rate about ΔDH2) until it converges completely to 0% at a time t11. It is accordingly judged that the changeover between the first and second clutches C1, C2 has been substantially completed at this stage, and the duty ratio of the second clutch C2 is fixed to 100%. Then, the skip downshift is ended.

Next, flow charts for actually performing the gearshift control illustrated in FIG. 1 are shown in FIGS. 4~13. The flow charts can cope with, not only the skip downshift from the fourth speed stage to the second speed stage as thus far described, but also an ordinary (single-stage) downshift and the skip downshift of the third speed stage→the first speed stage, or the fourth speed stage→the first speed stage. Herein, however, the execution of the skip downshift of the fourth speed stage→the second speed stage shall be assumed on occasion and will be described concretely in order to facilitate understanding.

Since the principal substantial contents of the control to be performed in accordance with the flow charts have already been described by reference to FIG. 1, the steps of the processes of the control shall be schematically explained along the flow charts here.

Figure 4:
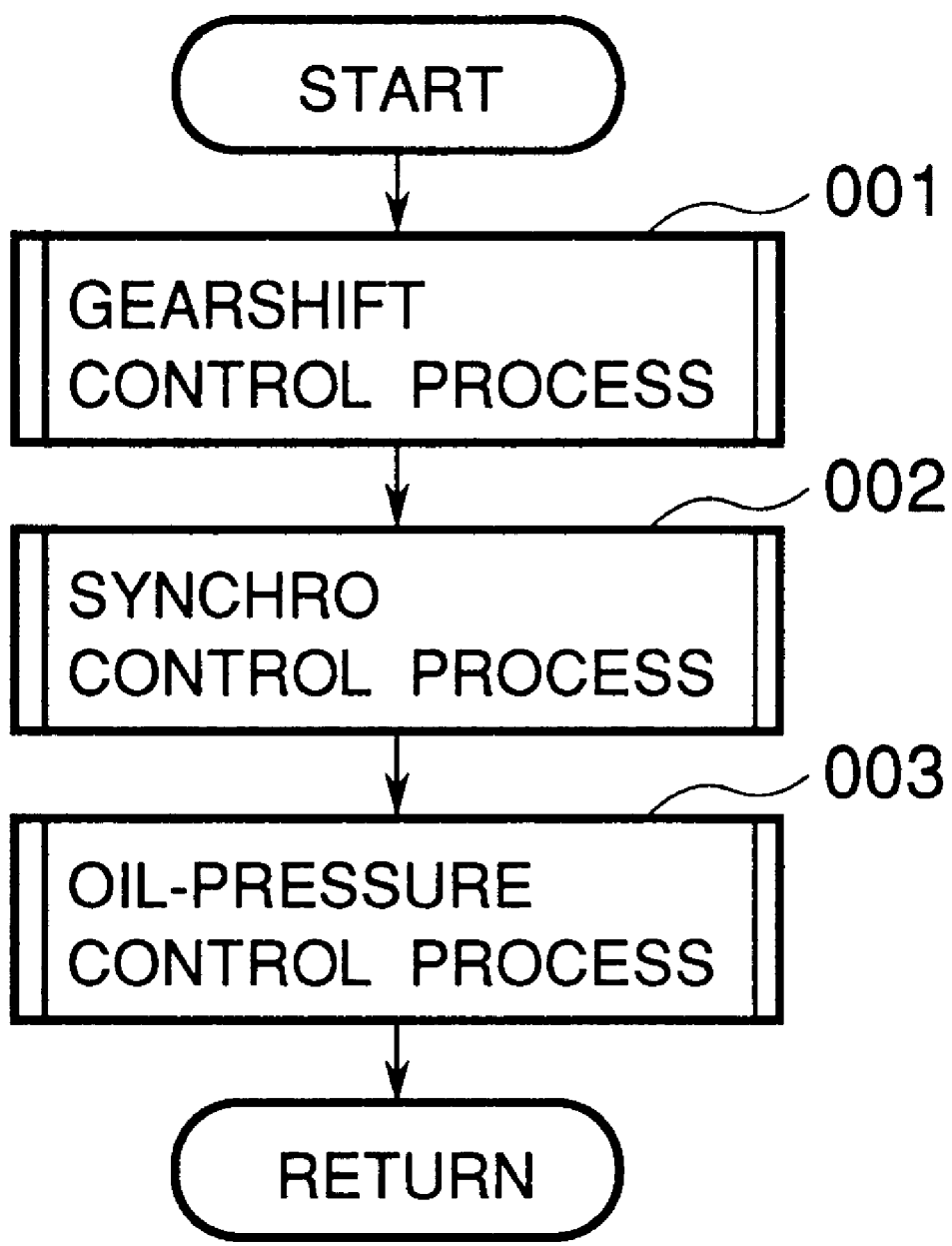
FIG. 4 is a flow chart showing a control (a first embodiment) which is processed by a computer in order to execute a power-ON skip downshift in the automatic transmission.
Figure 5:
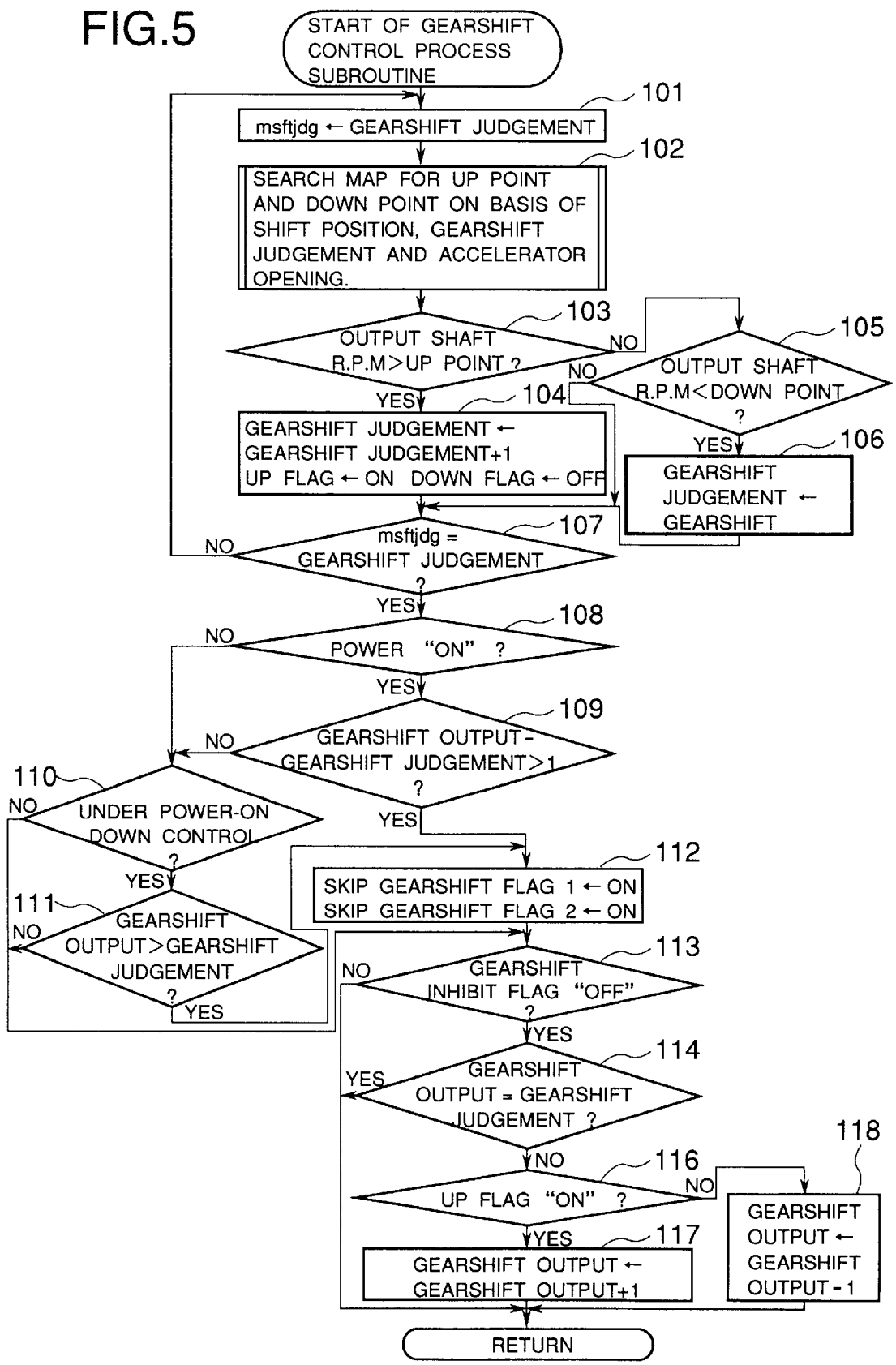
FIG. 5 is a flow chart showing a gearshift control process subroutine in FIG. 4.

As illustrated in FIG. 4, the series of control flows are chiefly composed of a gearshift control process routine (step 001), a synchro control process routine (step 002) and an oil-pressure control process routine (step 003). Of these routines, the gearshift control process routine (step 001) will be first explained with reference to FIG. 5.

At a step 101, the current gearshift judgement stage is stored in the area "msftjdg" of the RAM (104 shown in FIG. 2). At a step 102, a map is searched for an upshift point (up gearshift point) and a downshift point (down gearshift point) on the basis of a shift position, the gearshift judgement stage and an accelerator opening degree. Here, the expression "gearshift judgement stage" indicates a gearshift stage which is a result obtained by judging the speed stage where the motor vehicle ought to lie, from the current drive conditions or drive state thereof. The expression "shift position" signifies the position of the shift lever, such as a drive range, a second range or a reverse range. The expressions "upshift point" and "downshift point" signify those gearshifting threshold values of the r.p.m. of the output shaft (70 in FIG. 2) which are respectively determined on an up side and a down side at each point of time by the map beforehand.

A step 103 serves to judge whether or not the output shaft r.p.m. is higher than the upshift point. When the output shaft r.p.m. is higher, then an upshift is decided at a step 104 so that the amount of 1 (one) is added to the gearshift judgement stage, and an up flag is turned ON and a down flag is turned OFF. In contrast, when a relation (Output shaft r.p.m.≦Upshift point) holds at the step 103, a downshift is similarly decided at steps 105 and 106.

Whether or not the gearshift judgement stage has been altered, is judged at a step 107. In a case where it has been altered, the control flow returns to the step 101, and the processing stated above is executed on the basis of a new gearshift judgement stage. At steps 108~111, a skip gearshift is judged from an equality (Gearshift output stage−Gearshift judgement stage)>1 (steps 108, 109), or from the fact that a new downshift has been decided during the power-ON downshift control (steps 110, 111). Subject to the judgement of the skip gearshift, skip gearshift flags 1 and 2 are turned ON at a step 112. Steps 113~118 serve to control the reflection of the gearshift judgement stage into the gearshift output when a gearshift inhibit flag is OFF (step 113). Owing to the control flow, even when the downshift from the fourth speed stage to the second speed stage has been judged, the steps of procedure are actualized for successively generating the gearshift output of the fourth speed stage→the third speed stage at the time t2, and that of the third speed stage—the second speed stage at the time t6, respectively.

Figure 6:
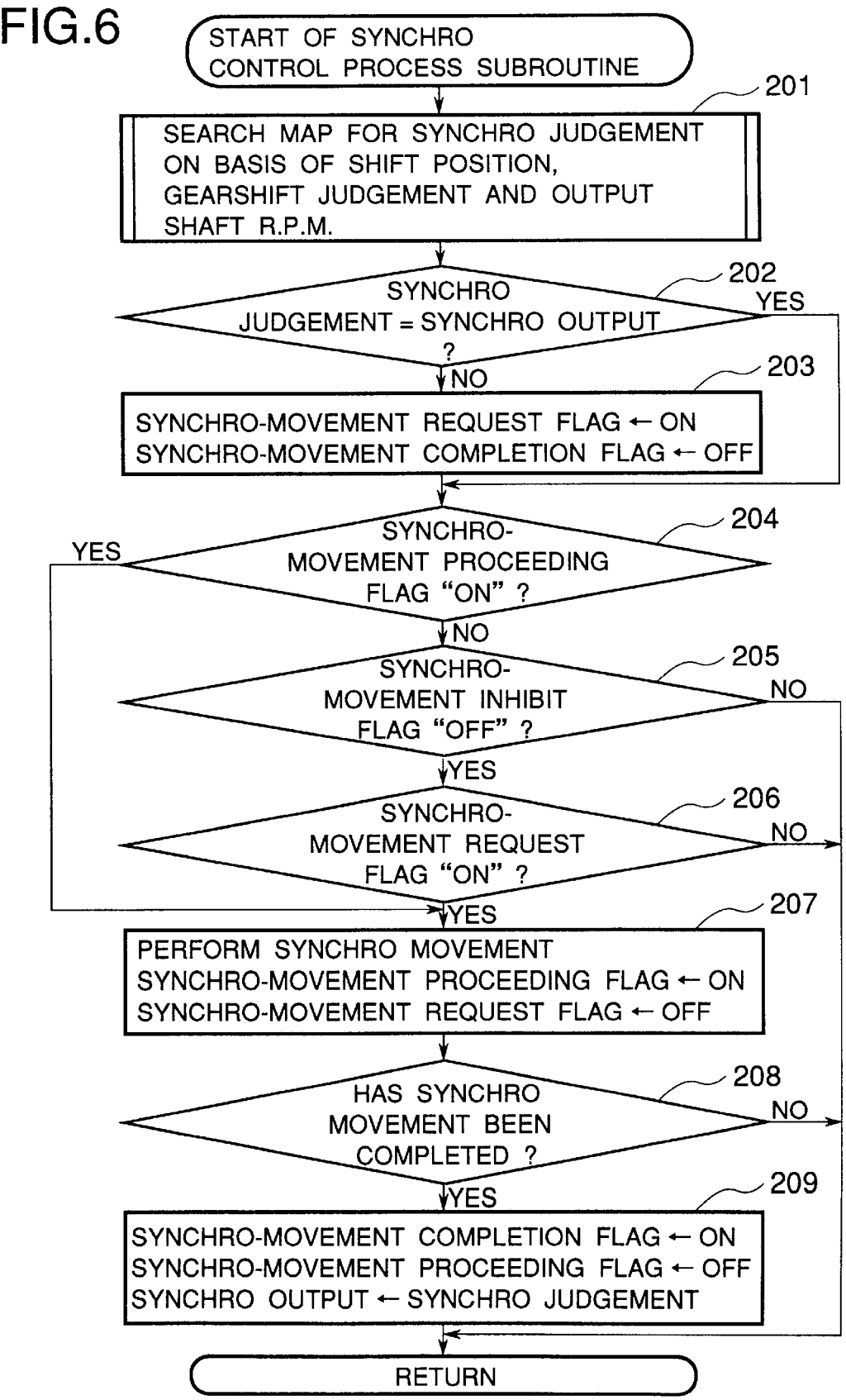
FIG. 6 is a flow chart showing a synchro control process subroutine in FIG. 4.

Next, FIG. 6 illustrates the subroutine of the synchro control process which is executed at the major step 002 (FIG. 4).

At a step 201, a map is searched for a synchro position judgement (a position where the synchro mechanism ought to finally lie) on the basis of the shift position, the gearshift judgement stage and the output shaft r.p.m. A step 202 serves to decide whether or not the resulting synchro position judgement differs from the actual synchro position output. In a case where the judgement differs, a step 203 functions to turn ON a synchro-movement request flag and to turn OFF a synchro-movement completion flag.

FIG. 3B exemplifies the synchro position judgement map in the D (drive) range. For example, a case where the gearshift judgement stage is the first speed stage, is divided into an occasion where the output shaft r.p.m. at that time is less than a value No1 and an occasion where it is equal to or greater than the value No1. When the output shaft r.p.m. is less than the value No1, the first-speed position and also the neutral position are prepared beforehand. When the output shaft r.p.m. is equal to or greater than the value No1, the first-speed side and also the second-speed position are selected and connected as the synchro positions beforehand. The reason therefor is that, on this occasion, the gearshift to subsequently occur may highly possibly be a gearshift to the second speed stage. Likewise, in a case where the gearshift judgement stage is the second speed stage, the first-speed position and the second-speed position are selected as the "synchro position judgement" when the output shaft r.p.m. at that time is less than a value No2. Further, the second-speed position and the third-speed position are determined as the "synchro position judgement" when the output shaft r.p.m. is equal to or greater than the value No2.

Referring back to FIG. 6, steps 204~209 correspond to processing which is executed when it has been confirmed that the operation of switching over the synchro position from the fourth-speed position to the second-speed position was started at the time t4 and was ended at the time t9.

More specifically, in a case where a synchro-movement proceeding.flag is ON (step 204), or in a case where a synchro-movement inhibit flag is OFF (step 205) and where the synchro-movement request flag is ON (step 206), the synchro movement is performed (step 207). At a step 208, the completion of the synchro movement is decided. Subject to the completion of the movement, the step 209 functions to turn ON the synchro-movement completion flag and OFF the synchro-movement proceeding flag and to substitute the synchro position judgement into the synchro position output.

Figure 7:
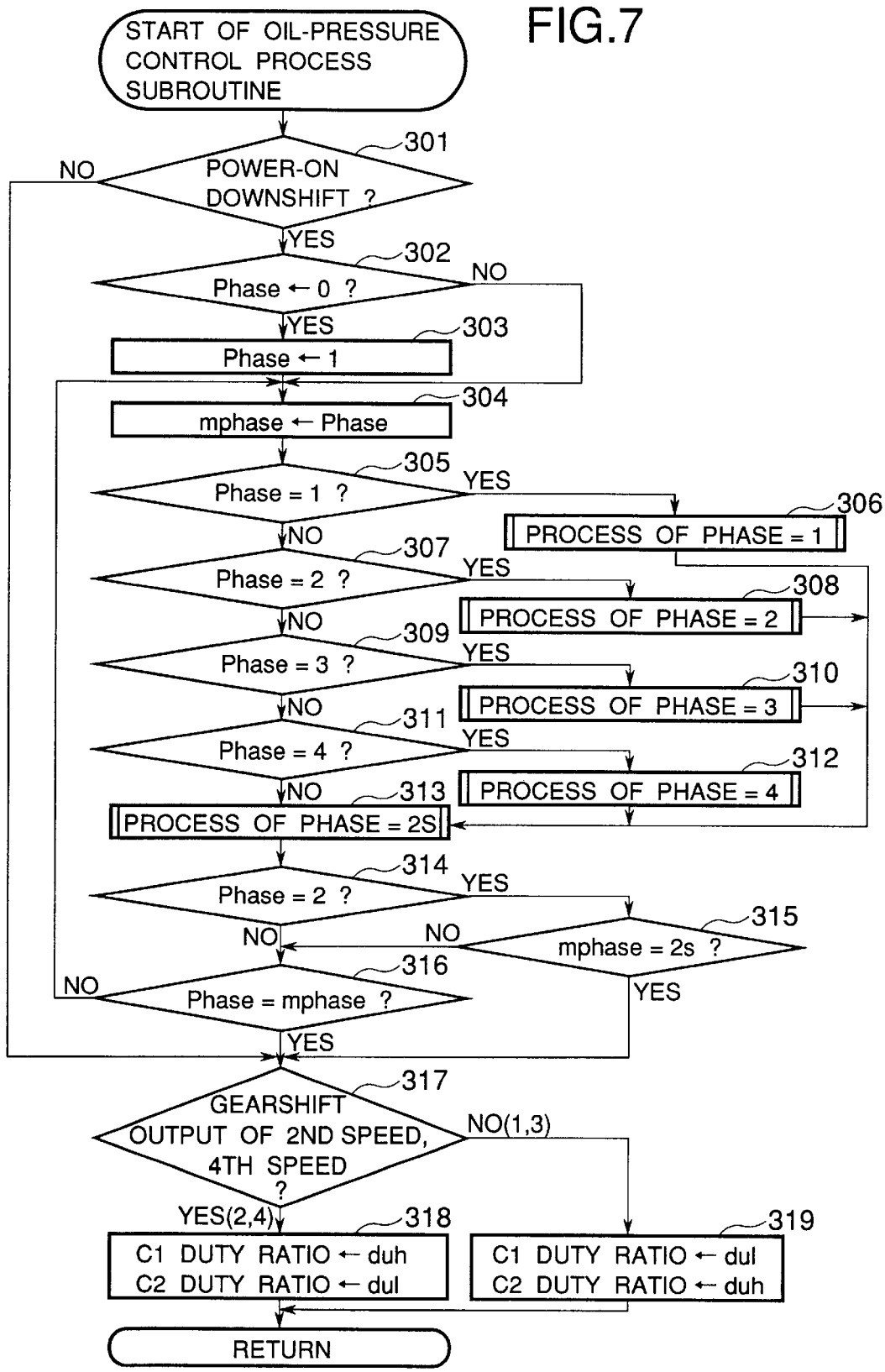
FIG. 7 is a flow chart showing an oil-pressure control process subroutine in FIG. 4.

Next, FIG. 7 illustrates the schematic flow of the subroutine of the oil-pressure control process which is executed at the major step 003 (FIG. 4).

Here, the respective stages of the control shall be named as phases 1, 2, 2S, 2, 3 and 4 as indicated at the uppermost part of FIG. 1. As will be explained later, when the process of the phase 2S has ended, the phase 2 is executed once more before the phase 3.

FIG. 7 shows the whole oil-pressure control process, which mainly controls switchover processing for the respective phases. Here, symbol "phase" in the flow sometimes denotes a "phase flag".

In the flow of FIG. 7, whether or not the power-ON skip downshift is requested is judged at the first step 301. The judgement is made by checking whether or not the skip gearshift flag 1 set at the step 112 (FIG. 5) is ON. When the power-ON skip downshift is judged at the step 301, the control flow advances to a step 302, which serves to decide whether or not the oil-pressure control process is in a phase=0 (not under gearshifting). Initially, the phase=0 holds owing to the process of the last cycle. Therefore, the control flow advances to a step 303, at which the phase=1 is set. In a case where the decision of the step 302 is "NO", i.e., where the phase is not "0", the step 303 is bypassed. In either case, the control flow advances to a step 304, at which the value of the phase at the current time, i.e., "1" initially is put in "mphase".

Thenceforth, the subroutine processes of the respective phases are executed. More specifically, for the phase=1, the control flow advances from a step 305 to a step 306, at which the subroutine process of the phase 1 is executed. For the phase=2, the control flow advances from a step 307 to a step 308, at which the subroutine process of the phase 2 is executed. The control flow advances from a step 309 to a step 310 for the phase=3 so as to execute the subroutine process of the phase 3, and from a step 311 to a step 312 for the phase=4 so as to execute the subroutine process of the phase 4.

After the execution of each phase process, a step 316 functions to judge whether or not the current phase is equal to the "mphase" into which the phase value was substituted at the step 304, that is, whether or not the value of the phase flag has been switched over. If the judgement is "NO" (the value has been switched over), the control flow returns to the step 304 so as to execute each phase process. In contrast, if the judgement is "YES" (the value has not been switched over), the control flow advances to a step 317 et seq. for deciding a duty ratio state to be adopted.

Here, steps 313, 314 and 315 are provided after the step 311. They are intended to execute the process (step 313) of the phase 2S for the skip gearshift, and to avoid the phase switchover judgement at the step 316 only in case of the switchover of the phase 2S→the phase 2.

At the step 317 and steps 318 and 319, higher-speed-stage and lower-speed-stage oil pressures "duh", "dul" are substituted as the duty ratios of the first and second clutches C1, C2, depending upon the gearshift output stage. These steps actualize a replacement process in which the state of the higher-speed-stage side clutch=the first clutch C1 and the lower-speed-stage side clutch=the second clutch C2 in the first gearshift, is reversed in the second gearshift. Besides, regarding a skip downshift of the third speed stage the first speed stage by way of example, such steps can actualize a replacement process in which the state of the higher-speed-stage side clutch=the second clutch C2 and the lower-speed-stage side clutch=the first clutch C1 in the first gearshift, is reversed in the second gearshift. Moreover, ordinary (single-stage) downshifts can be coped with.

Figure 8:
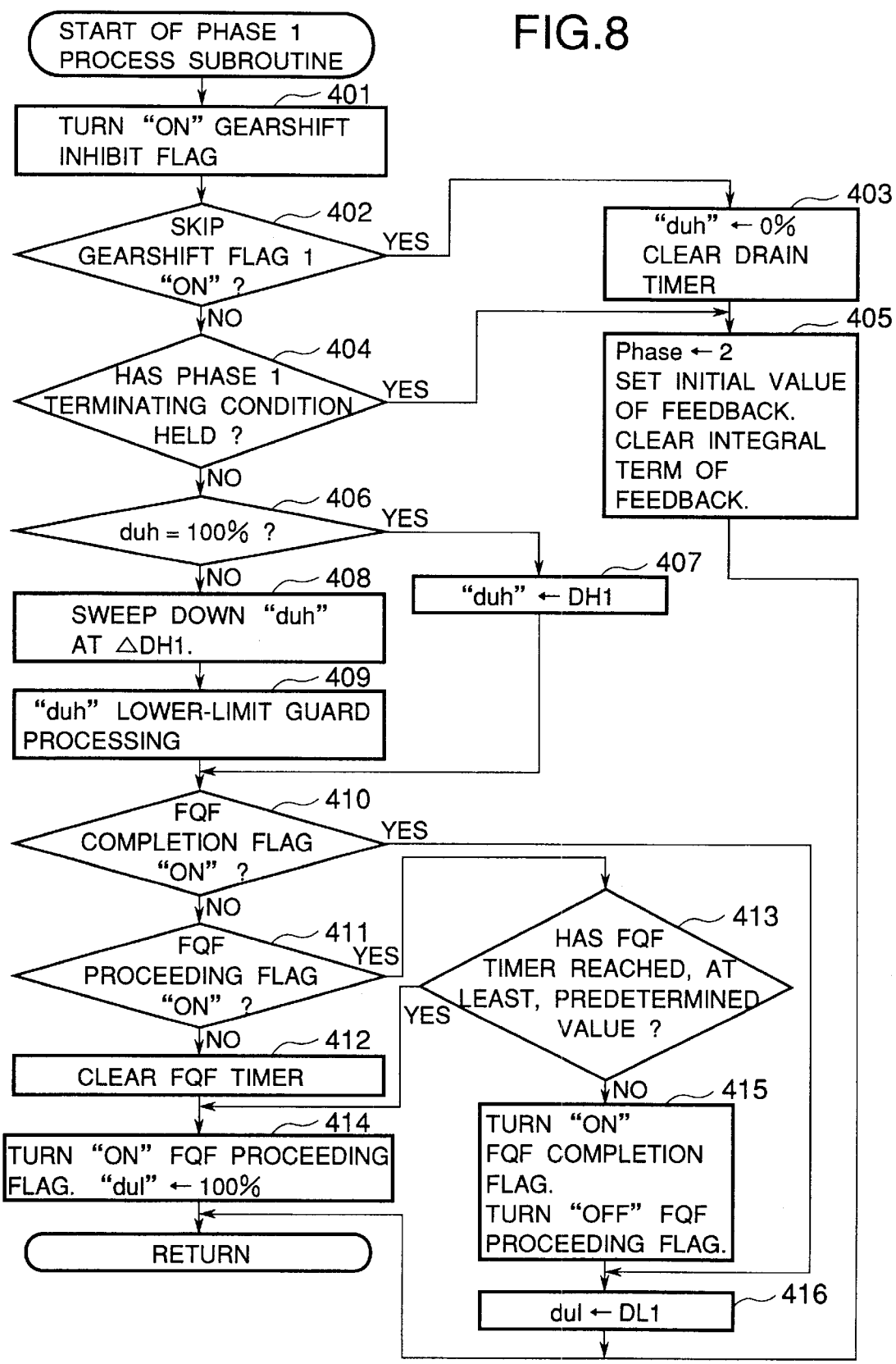
FIG. 8 is a flow chart showing a subroutine process of phase 1 in FIG. 7.

FIG. 8 illustrates the subroutine process of the phase 1.

When the process is started, a step 401 functions to turn ON the gearshift inhibit flag and simultaneously turn ON the synchro-movement inhibit flag. Subsequently, the flow of the process advances to a step 402 for judging whether or not the skip gearshift flag 1 is ON. (Unless the drive conditions of the motor vehicle especially change,) the skip gearshift flag 1 is judged ON. The step 402 is therefore followed by a step 403, at which the duty ratio "duh" of the higher-speed-stage side clutch is set at 0%, and at which the drain timer is cleared and starts counting. Incidentally, the duty ratio "duh" is adopted and settled as the duty ratio of the second clutch C2 (because of the third-speed output) on this occasion by the processing of the steps 317~319 explained before.

Thereafter, at a step 405, the phase is set at "2", the initial value of the feedback control to be performed from the time t6 is set, and the integral term of the feedback control is cleared.

By the way, when it has been judged at the step 402 that the skip gearshift flag 1 is OFF (on account of the changes of the drive conditions), the control flow advances from a step 404 to steps 406 et seq. in order to implement an ordinary (single-stage) downshift. Herein, when a predetermined condition has held (it has been decided that the turbine r.p.m. NT has become higher than the synchronous r.p.m. of the lower speed stage by a predetermined magnitude) at the step 404 ("YES" at the step 404), this step is followed by the step 405. Incidentally, the steps 406 et seq. correspond to a control flow for implementing the ordinary (single-stage) downshift when the skip downshift has been abandoned, so that they shall not be detailed here.

In this embodiment, the second clutch C2 is released fastest in order to shorten the gearshifting time period. However, in a case where the occurrence of a shock ascribable to sudden lowering in the oil pressure of the higher-speed-stage side is unfavorable, the second clutch C2 may well be gradually released and the drain timer is cleared (for starting to count) when the duty ratio of the oil pressure thereof has become zero.

As seen from the illustrated flow, according to this embodiment, in the case where the skip gearshift flag 1 is ON, the process in the phase 1 consists only of the steps 403 and 405, and essentially the phase 1 is immediately shifted to the phase 2.

Figure 9:
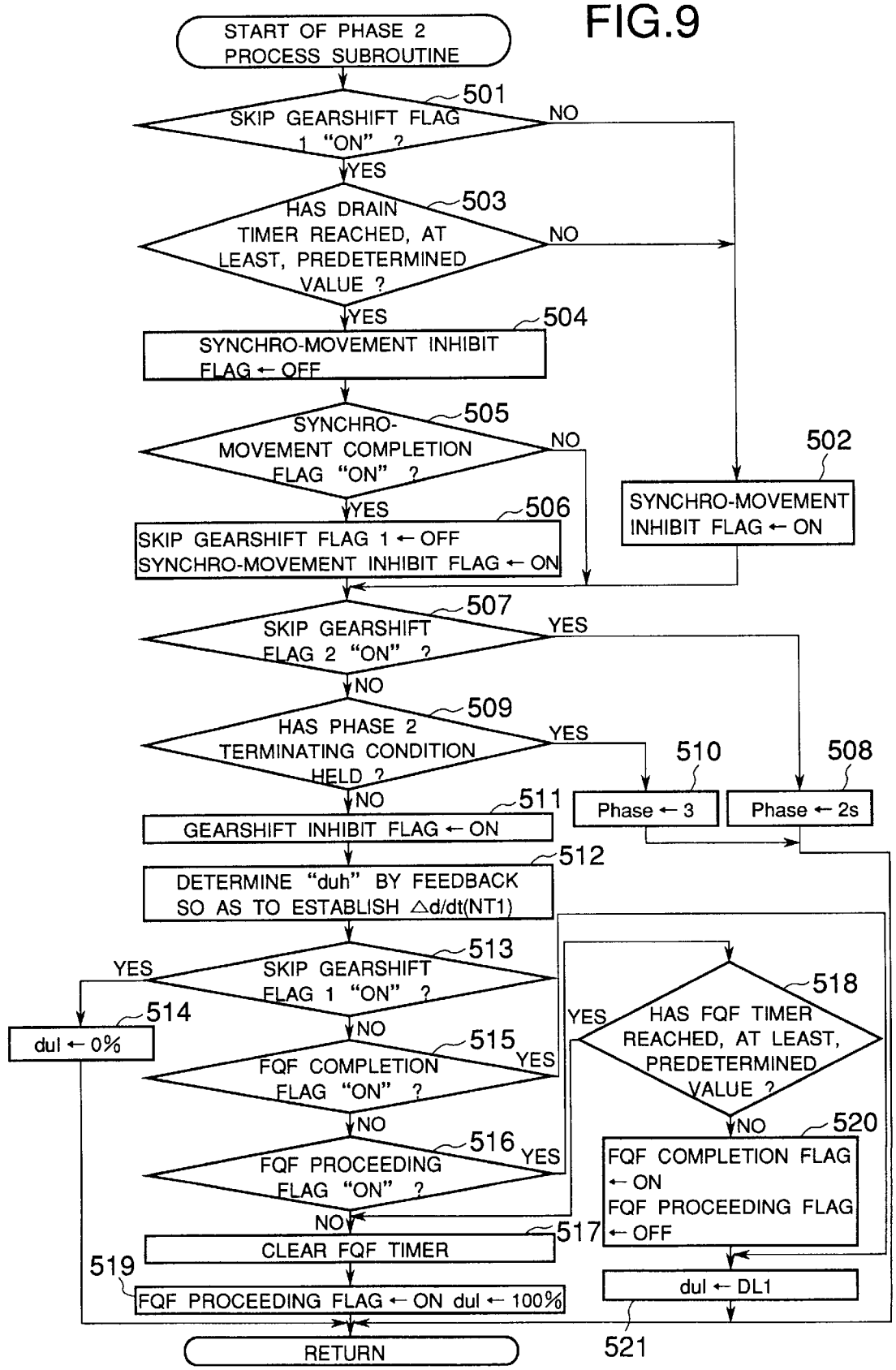
FIG. 9 is a flow chart showing a subroutine process of phase 2 in FIG. 7.

FIG. 9 illustrates the subroutine process of the phase 2.

The control flow of the phase 2 functions mainly for an ordinary (single-stage) downshift. In the case of the 4→2 skip downshift assumed here, the control flow advances along steps 501→503→502→507→508. The phase 2 is shifted to the phase 2S at the step 508, and essentially the subsequent processing is performed in the phase 2S. It is the reason therefor that the phase 2S is immediately started at the time t2 as indicated at the uppermost part of FIG. 1. Incidentally, as will be explained later, when the process of the phase 2S has ended, this phase 2 returns once more before being shifted to the phase 3.

Figure 10:
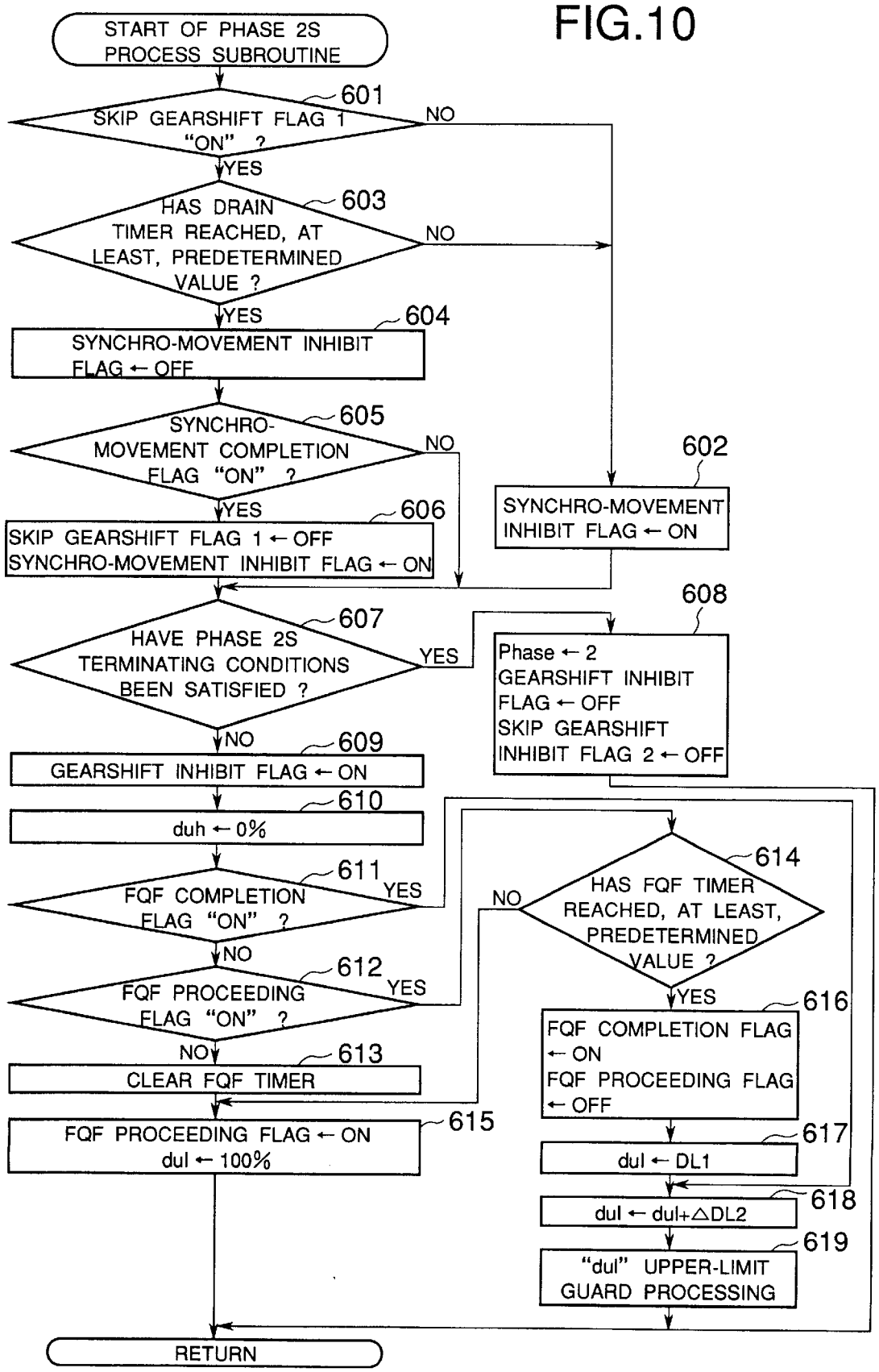
FIG. 10 is a flow chart showing a subroutine process of phase 2S in FIG. 7.

FIG. 10 illustrates the subroutine process of the phase 2S.

Steps 601~606 are prepared for the synchro movement in the skip downshift. More specifically, in a case where the skip gearshift has been judged at the step 601, the step 603 functions to decide whether or not the drain timer is equal to or greater than the predetermined time period T2. Before the drain timer reaches the predetermined time period T2, the step 603 is followed by the step 602, at which the synchro-movement inhibit flag is turned ON so as to inhibit the movement of the synchro (second synchro). On the other hand, when it has been decided that the drain timer has reached the predetermined time period T2, the step 603 is followed by the step 604, at which the synchro-movement inhibit flag is turned OFF so as to begin the movement of the synchro (at the time t4).

Whether or not the movement of the synchro has been completed, is judged at the step 605. Upon the completion of the synchro movement, the skip gearshift flag 1 is turned OFF, and the synchro-movement inhibit flag is turned ON (step 606).

A step 607 serves to judge whether or not conditions for terminating the phase 2S have been satisfied.

The conditions for terminating the phase 2S are:
(1) [Turbine r.p.m. NT—Synchronous r.p.m. NT3 of Lower-speed-stage side (here, the side of the intermediate stage, i. e., the third speed stage)]≧Predetermined magnitude (zero or a value close to zero); and
(2) Rising rate of Turbine r.p.m. NT≦Predetermined value [a value with which it is detectable that the lower-speed-stage side clutch (here, the first clutch C1 being the clutch of the intermediate-stage side) has begun to gain a transmission torque capacity].

In a case where the terminating conditions are not satisfied yet, the gearshift inhibit flag is turned ON at a step 609, and the duty ratio "duh" of the higher-speed-stage side is set at 0% at a step 610. Since the gearshift output is the third-speed output at this point of time, the duty ratio "duh" here becomes that of the second clutch C2 owing to the processing of the steps 317→319 (FIG. 7). In the ensuing description, the clutch which is employed at the corresponding point of time shall be concretely indicated by enclosing it with parentheses.

Steps 611~617 concern the "first quick fill" and standby processing of the lower-speed-stage side clutch (C1) (processing for the time period of the time t2→time t5). When the first quick fill and the standby processing have been completed, the sweep-up and upper-limit guard processing of the lower-speed-stage side duty ratio (C1 duty ratio) "dul" (processing for the time period of the time t5→time t6) are executed at the steps 617 and 618.

In due course, when it is judged at the step 607 that the conditions for terminating the phase 2S have been satisfied, the control flow advances to a step 608, at which the phase 2 is set once more so as to return to subroutine process of the phase 2 shown in FIG. 9.

In shifting the phase 2S to the phase 2, the gearshift inhibit flag is turned OFF at the step 608. Consequently, the judgement of "YES" is made at the step 113 in the gearshift control process subroutine (FIG. 5), and the gearshift output is changed over from the third speed stage to the second speed stage by the step 118. Owing to the changeover, the judgement of "YES" is made at the step 317 of the oil-pressure control process subroutine (FIG. 7). In the ensuing part of the control flow, therefore, the duty ratios "dul" and "duh" are respectively defined and settled as the C2 duty ratio and the C1 duty ratio by the processing of the step 318. Incidentally, the gearshift inhibit flag is turned ON again at the step 511 of the phase 2 in FIG. 9. Therefore, the gearshift inhibit flag is actually turned OFF for only a moment as indicated by the time chart of this flag in FIG. 1.

Referring back to the phase 2 process subroutine in FIG. 9, after the turn-ON of the gearshift inhibit flag at the step 511 (because the skip gearshift flags 1 and 2 are ON and OFF, respectively, unless the operating situation changes), the processing of the feedback control (time t6~time t7) of the higher-speed-stage side duty ratio (C1 duty ratio because of the changeover) "duh" is executed at a step 512. The feedback control is concretely performed so that the rising rate of the turbine r.p.m. NT may become the value Δd/dt (NT1).

By the way, the skip gearshift flag 2 turns ON when the decisions of the steps 110 and 111 (FIG. 5) are "YES", and it functions when a request for a further downshift has been made "during the execution" of a single-stage or two-stage downshift. In a case where the skip gearshift flag 2 is ON, the step 507 is followed by the step 508, at which the process of the phase 2S is started again.

Steps 513~521 concern the oil pressure control of the lower-speed-stage side (the second clutch C2 because the gearshift output is the second-speed output at this control stage). While the movement of the synchro is not completed yet, the skip gearshift flag 1 is decided ON at the step 513, and hence, the lower-speed-stage side duty ratio (C2 duty ratio) "dul" is maintained at 0% (step 514).

On the other hand, if the synchro movement has been completed (in many cases, however, it is not completed at this control stage), the skip gearshift flag 1 is turned OFF at steps 505→506. Therefore, the control flow advances from the step 513 to the side of the step 515, and the "first quick fill" operation of the lower-speed-stage side (C2) duty ratio "dul" is started here. Concretely, the C2 duty ratio is held at dul=100% for the predetermined time period Ti, and it is thereafter lowered down to dul=DL1, which is maintained (steps 515~521).

As the gearshift proceeds, it is decided at a step 509 that a condition for terminating the phase 2 has been satisfied. Then, the step 509 is followed by a step 510, at which the phase 3 is established. The terminating condition for the phase 2 is expressed as [Synchronous r.p.m. NT2 of Lower speed stage (Second speed stage)–Turbine r.p.m. NT]<Predetermined magnitude ΔNT2.

Figure 11:
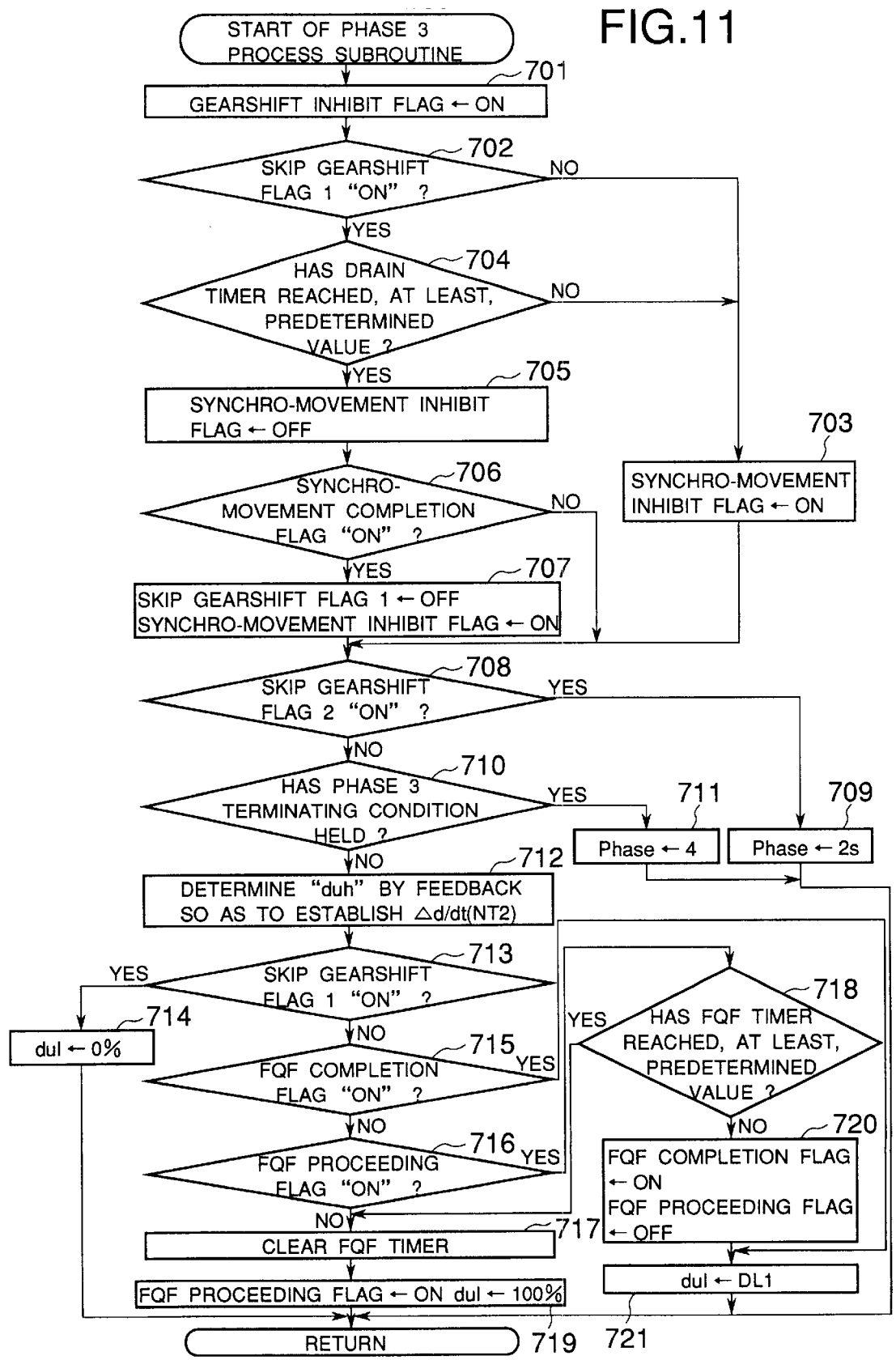
FIG. 11 is a flow chart showing a subroutine process of phase 3 in FIG. 7.

FIG. 11 illustrates the subroutine process of the phase 3.

First, at a step 701, the gearshift inhibit flag is turned ON (or is maintained). The succeeding steps are substantially the same (have the same purport) as in the foregoing subroutine process of the phase 2. Concretely different are a step 712 at which a feedback control determines the duty ratio "duh" of the higher-speed-stage side (C1) so that the rising rate of the turbine r.p.m. NT may become the value Δd/dt(NT2), and a step 710 which functions to judge if a condition for terminating the phase 3 has been satisfied. The terminating condition for the phase 3 is expressed as [Synchronous r.p.m. NT2 of Lower speed stage (Second speed stage)–Turbine r.p.m. NT]<Predetermined magnitude ΔNT3 (zero or a value close to zero).

Owing to the control flow of the phase 3, the feedback control for the time period of the time t7→time t8 in FIG. 1 is performed. When the terminating condition for the phase 3 has been satisfied, the step 710 is followed by a step 711, at which the phase 4 is established.

Figure 12:
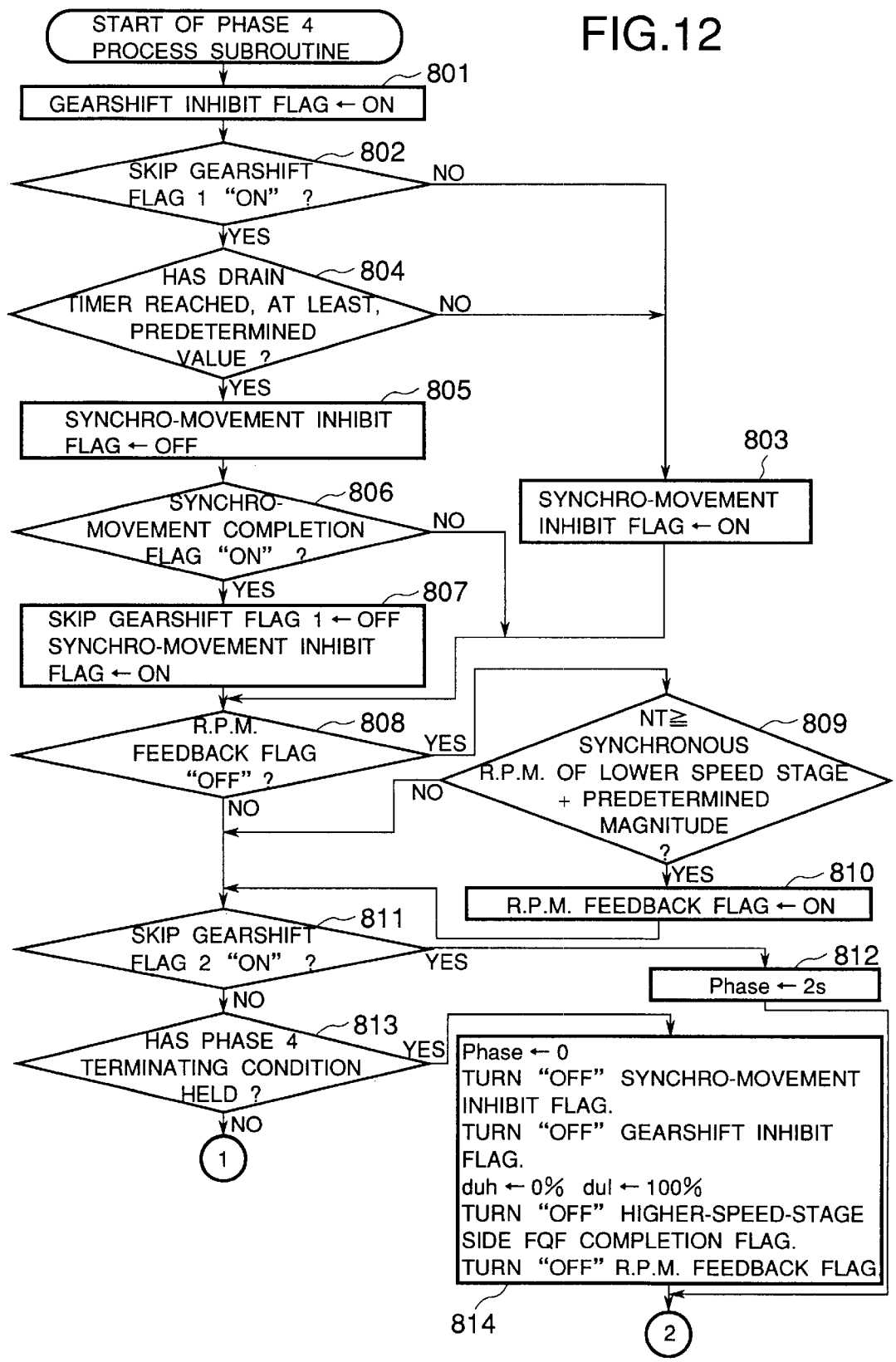
FIG. 12 is a flow chart showing a subroutine process of phase 4 in FIG. 7.
Figure 13:
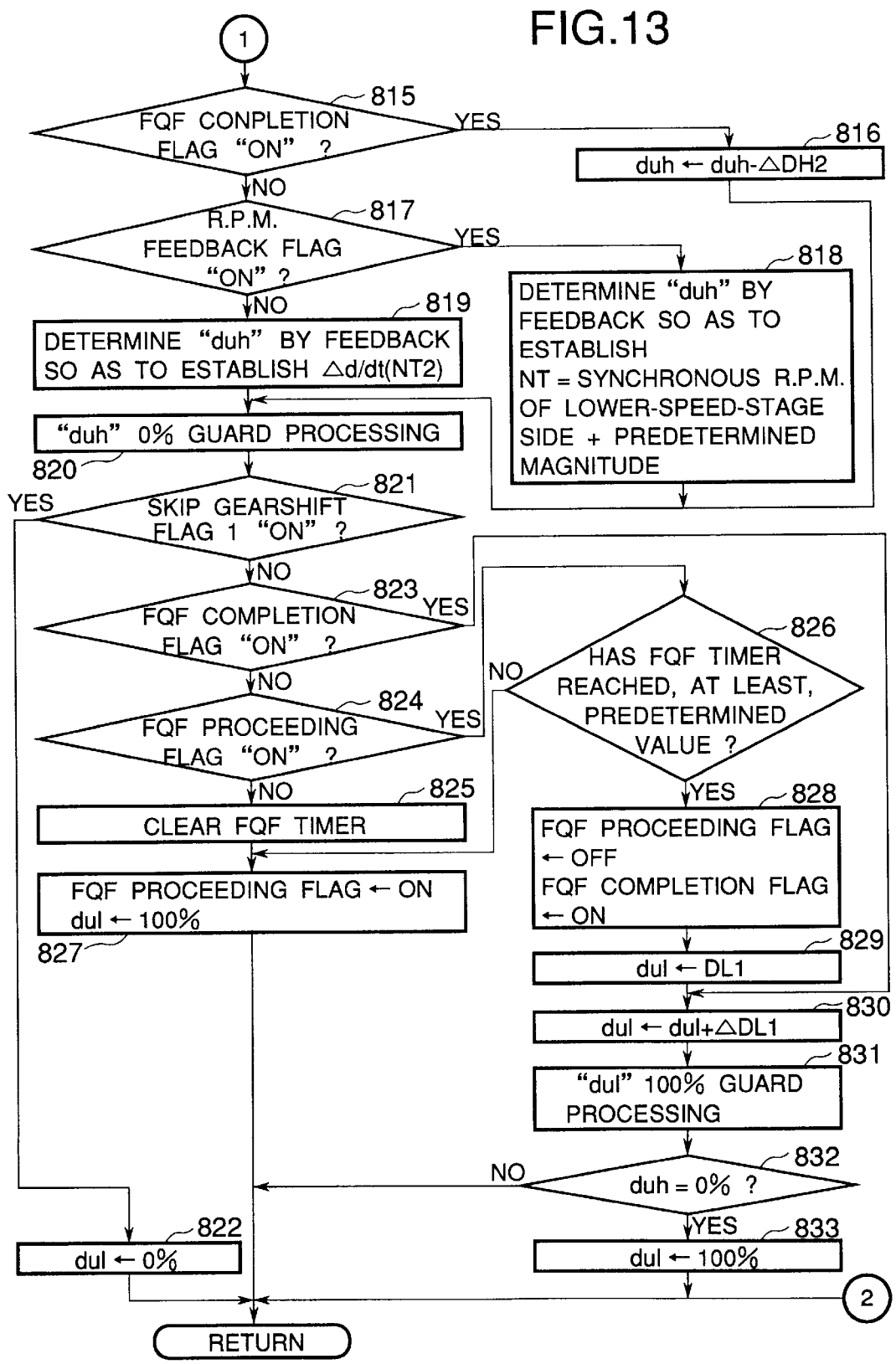
FIG. 13 is a flow chart showing the continuation of the phase 4 in FIG. 12.

FIGS. 12 and 13 illustrate the subroutine process of the phase 4.

Steps 802~807 are the same as the steps 501~506 of the phase 2 or those 702~707 of the phase 3.

Steps 808~810 function to settle whether a subject for the feedback of the duty ratio "duh" of the higher-speed-stage side (C1) is the rising rate Δd/dt(NT2) of the turbine r.p.m. NT or the r.p.m. value (NT2+ΔNT4) itself. When it is judged at the step 808 that the feedback control based on the r.p.m. value is OFF (it is not started yet), the control flow advances to the step 809, which functions to check whether or not the expression of Turbine r.p.m. NT≧(Synchronous r.p.m. NT2 of Lower speed stage+Predetermined magnitude ΔNT4) is satisfied. Before the expression is satisfied, the step 809 is directly followed by a step 811. On the other hand, when the expression has been satisfied, a speed feedback flag is turned ON at the step 810, which is followed by the step 811.

The steps 811, 812 of the phase 4 have the same purport as that of the steps 507, 508 of the phase 2 (FIG. 9) or the steps 708, 709 of the phase 3 (FIG. 11).

At a step 813, a condition for terminating the phase 4 is checked. Since the decision of "NO" is made initially, the step 813 is followed by a step 815. Here at the step 815, whether or not the "first quick fill" processing of the second clutch C2 has been completed is decided (in preparation for the case where the "first quick fill" operation of the second clutch C2 has already been started in the phase 2 or the phase 3). In a case where the FQF processing has been completed (at the time t10), the step 815 is followed by a step 816, at which the duty ratio "duh" of the higher-speed-stage side (C1) is lowered at the rate ΔDH2. On the other hand, when the FQF processing has not been completed, the step 815 is followed by a step 817, which checks if the speed feedback control is ON. When the speed feedback control is not ON yet, the duty ratio "duh" of the higher-speed-stage side (C1) is determined by the feedback control so that the rising rate of the turbine r.p.m. NT may become the value Δd/dt(NT2) (step 819). In contrast, when the speed feedback control is ON, the duty ratio "duh" of the higher-speed-stage side (C1) is determined by the feedback so that the turbine r.p.m. NT may become (Synchronous r.p.m. NT2 of Lower-speed-stage side+Predetermined magnitude ΔNT4) (step 818).

The above feedback control, which is performed so as to make the turbine r.p.m. NT the value that is obtained by adding the predetermined magnitude ΔNT4 to the synchronous r.p.m. NT2 of the lower speed stage, permits the clutch (C1) of the higher-speed-stage side to automatically progress toward its release state when the clutch (C2) of the lower-speed-stage side has gained a transmission torque capacity, while the turbine r.p.m. NT is prevented from rising more than is necessary.

More specifically, when the clutch (C2) of the lower-speed-stage side has gained the capacity, the turbine r.p.m. NT comes to be lowered down to the synchronous r.p.m. NT2 of the lower-speed-stage side. Therefore, the higher-speed-stage side clutch (C1) which is feedback-controlled so as to maintain the value higher than this synchronous r.p.m. NT2 progresses toward its release state inevitably, and the smooth changeover between the clutches can be realized.

Incidentally, at a step 820, the duty ratio "duh" on the higher-speed-stage side (C1) is guarded at 0%.

Steps 821~829 are the same as the steps 513~521 of the phase 2 (FIG. 9) or those 713~721 of the phase 3 (FIG. 11). More specifically, after the completion of the movement of the synchro ("NO" at the step 821), the "first quick fill" processing of the lower-speed-stage side clutch (C2) is executed. In due course, when the predetermined time period T3 has lapsed since the start of the FQF processing, the control flow advances to a step 830, at which the duty ratio DL1 of the lower-speed-stage side (C2) is increased at the rate ΔDL1 (100% guard processing at a step 831). On the other hand, when it is decided at a step 832 that the duty ratio "duh" of the higher-speed-stage side clutch (C1) begun to lower at the rate ΔDH2 at the steps 815 and 816 has arrived at 0%, the lower-speed-stage side (C2) duty ratio "dul" is fixed to 100% at a step 833.

Figure 14:
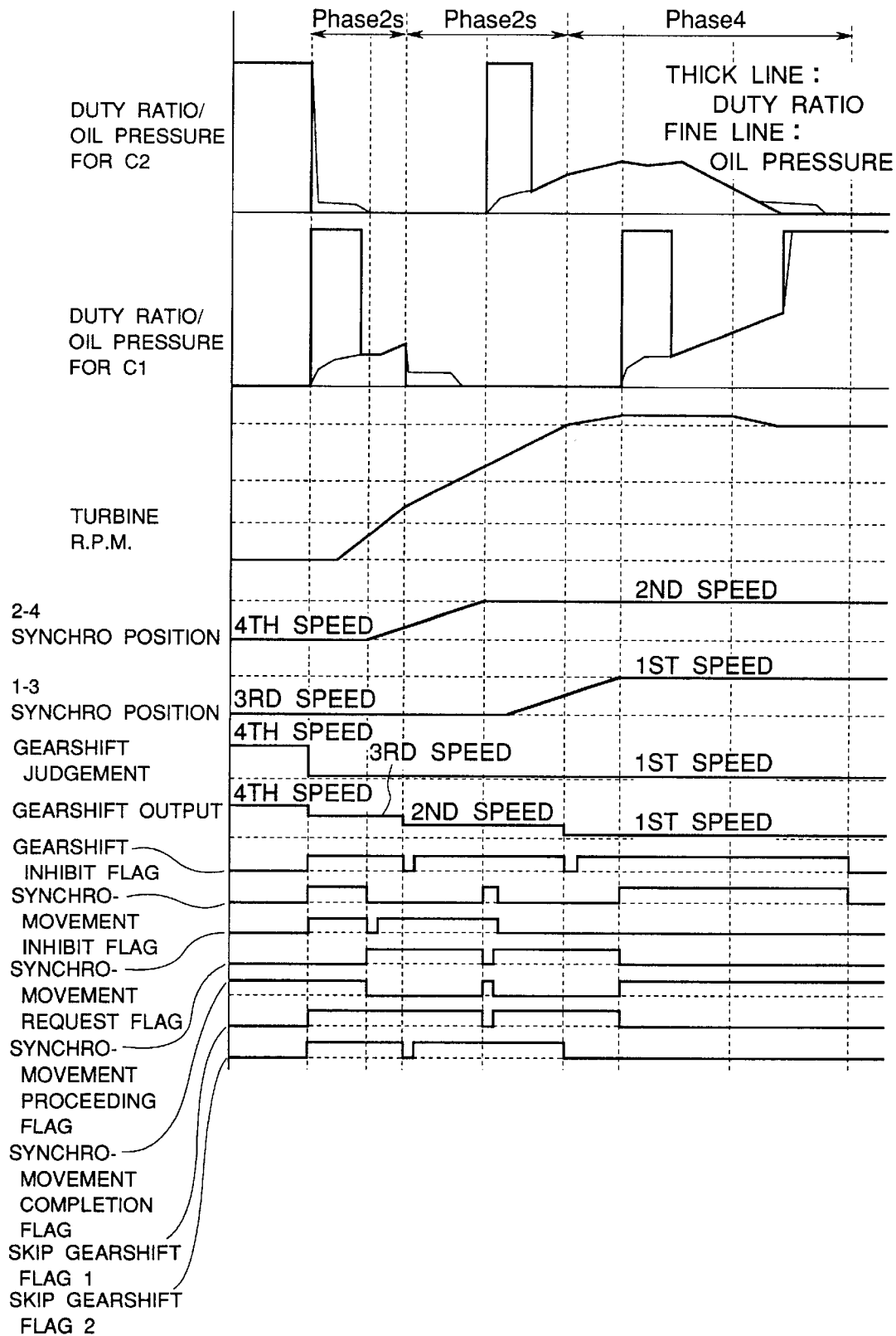
FIG. 14 is a time chart showing control characteristics in the case where the power-ON skip downshift of a fourth speed stage→a first speed stage is executed by the use of the flow chart according to the first embodiment.

As stated before, the series of control flows can cope with the power-ON skip downshifts of, for example, the third speed stage→the first speed stage, and the fourth speed stage→the first speed stage other than the fourth speed stage→the second speed stage. For reference, FIG. 14 illustrates a time chart in the case where the three-stage power-ON skip downshift of the fourth speed stage→the first speed stage is executed by the series of control flows. As seen from the time chart, the phase 2S is repeated twice, whereby the skip downshift of the third speed stage the first speed stage is consecutively implemented midway of the implementation of the skip downshift of the fourth speed stage→the second speed stage. Since the practicable construction for such operations has already been detailed, it shall not be iteratively explained here.

According to the above embodiment, any of all the power-ON skip downshifts, including the power-ON skip downshift of the fourth speed stage→the second speed stage, can be achieved with a light gearshift shock and in a short gearshifting time period.

Next, the second embodiment of the present invention (as defined in claim 2) will be described.

In the first embodiment, the feed of the oil pressure to the lower-speed-stage side clutch in the second gearshift is started when triggered by the completion of the switchover of the synchro. Therefore, in a case where the switchover of the synchro failed of the normal completion amidst the gearshift due to, e.g., the defective operation of the synchro by any possibility, the higher-speed-stage side clutch might continue the slip control forever (concretely, till the judgement that the gearshift itself has become unnecessary on account of the change in the drive environment of the motor vehicle). It is accordingly apprehended that the durability of the clutch will be spoilt.

The second embodiment therefore deals with such an occasion by stopping the implementation of the second gearshift and altering the skip downshift to a downshift which consists only of the first gearshift, so as to keep the durability of the clutch.

Figure 15:
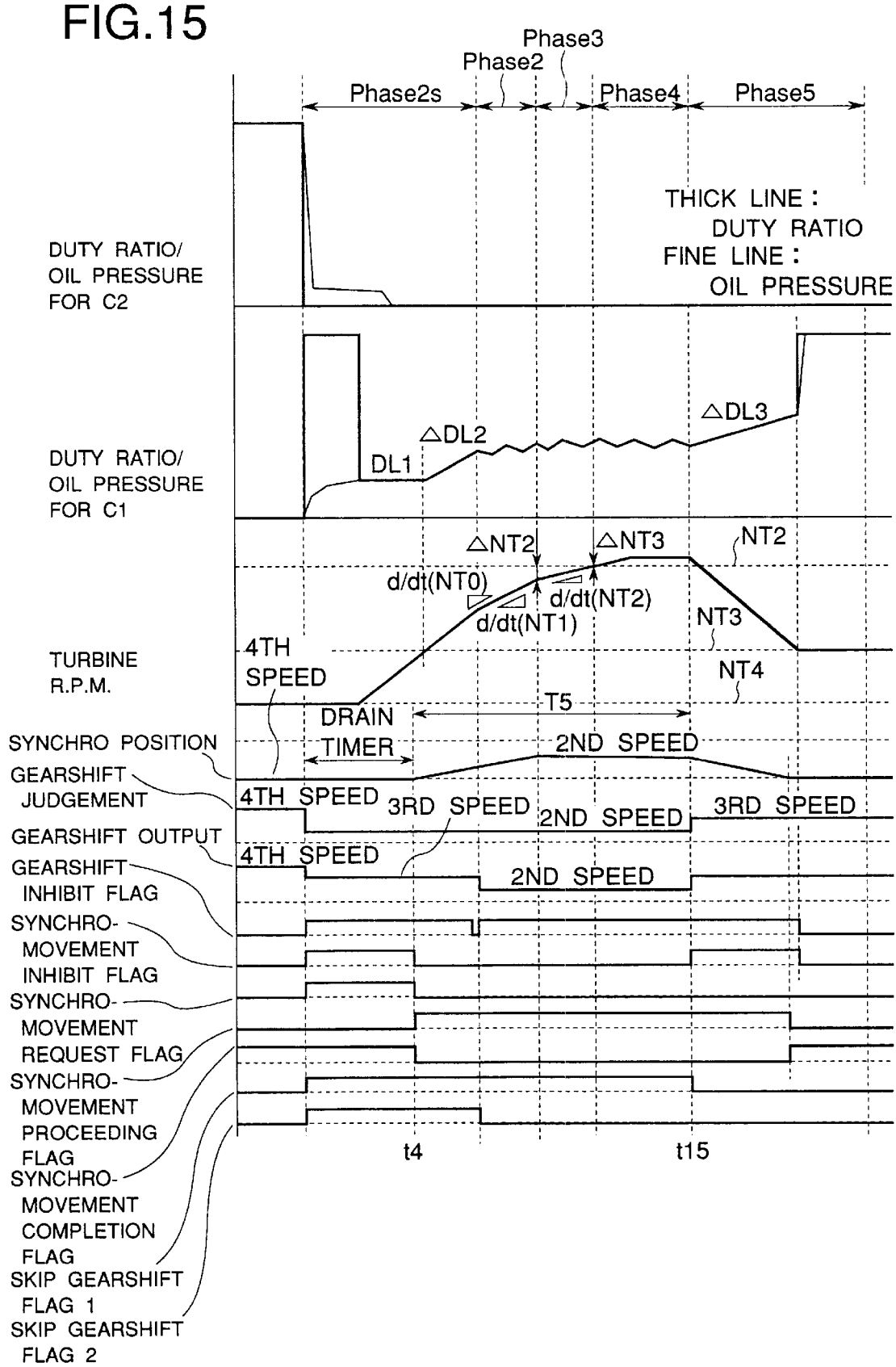
FIG. 15 is a time chart showing control characteristics according to the second embodiment of the present invention.

The time chart of the second embodiment is illustrated in FIG. 15.

The operations of the second embodiment till the phase 3 are the same as in the foregoing first embodiment. Here, let's consider a case where, since the issue of a switchover command to the synchro (D2), a predetermined time period T5 has lapsed without the completion of the switchover of this synchro from the fourth-speed position to the second-speed position thereof. In this case, it is decided that a situation has occurred where the switchover cannot be completed for any reason such as a defective timing. At the time (t15) of the decision, the second gearshift to the second speed stage is interrupted (or canceled). Thenceforth, the control is shifted to the phase 5, in which in order to establish the intermediate stage (third speed stage), the oil pressure of the clutch (C1) on the higher-speed-stage side is raised again, and that of the clutch (C2) on the lower-speed-stage side is held drained. As a result, the turbine r.p.m. NT converges to the synchronous r.p.m. NT3 of the intermediate stage.

This control is actualized by control flows to be explained below. The same steps as in the foregoing embodiment shall be endowed with the same step Nos. on the drawings, and the points of difference shall be chiefly explained.

Figure 16:
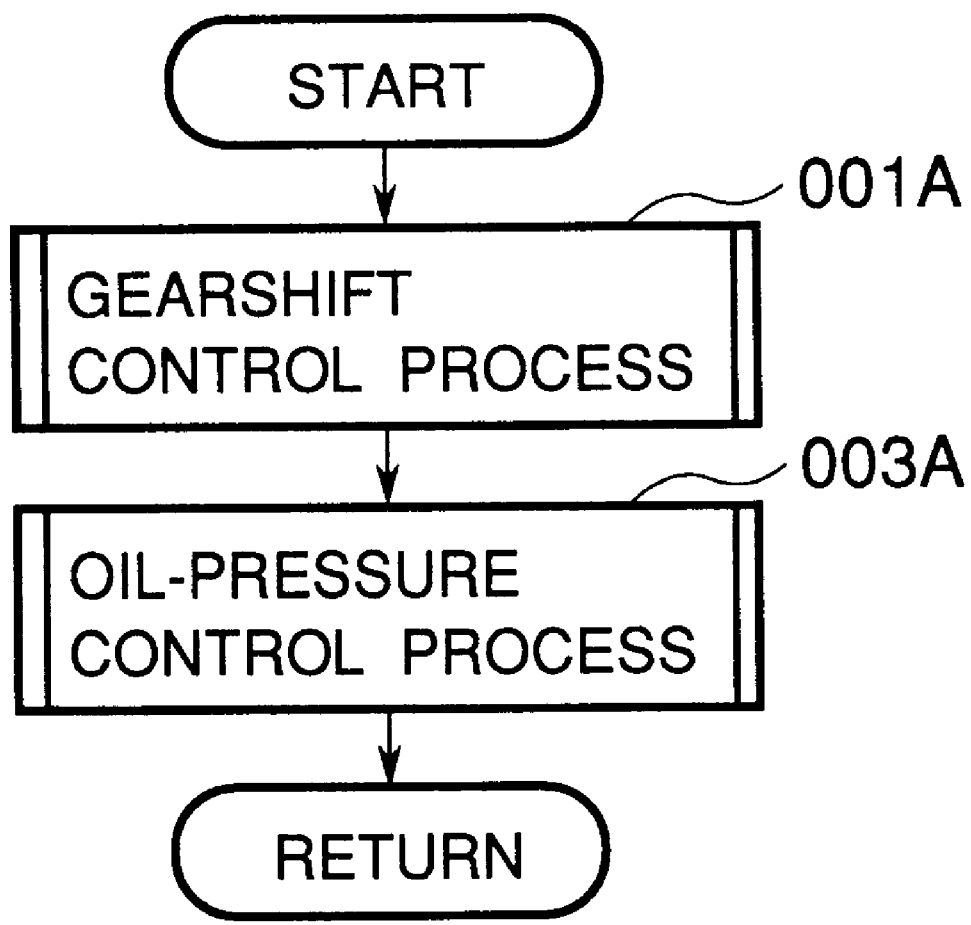
FIG. 16 is a flow chart showing a control flow which is processed by a computer in order to execute the second embodiment.
Figure 17:
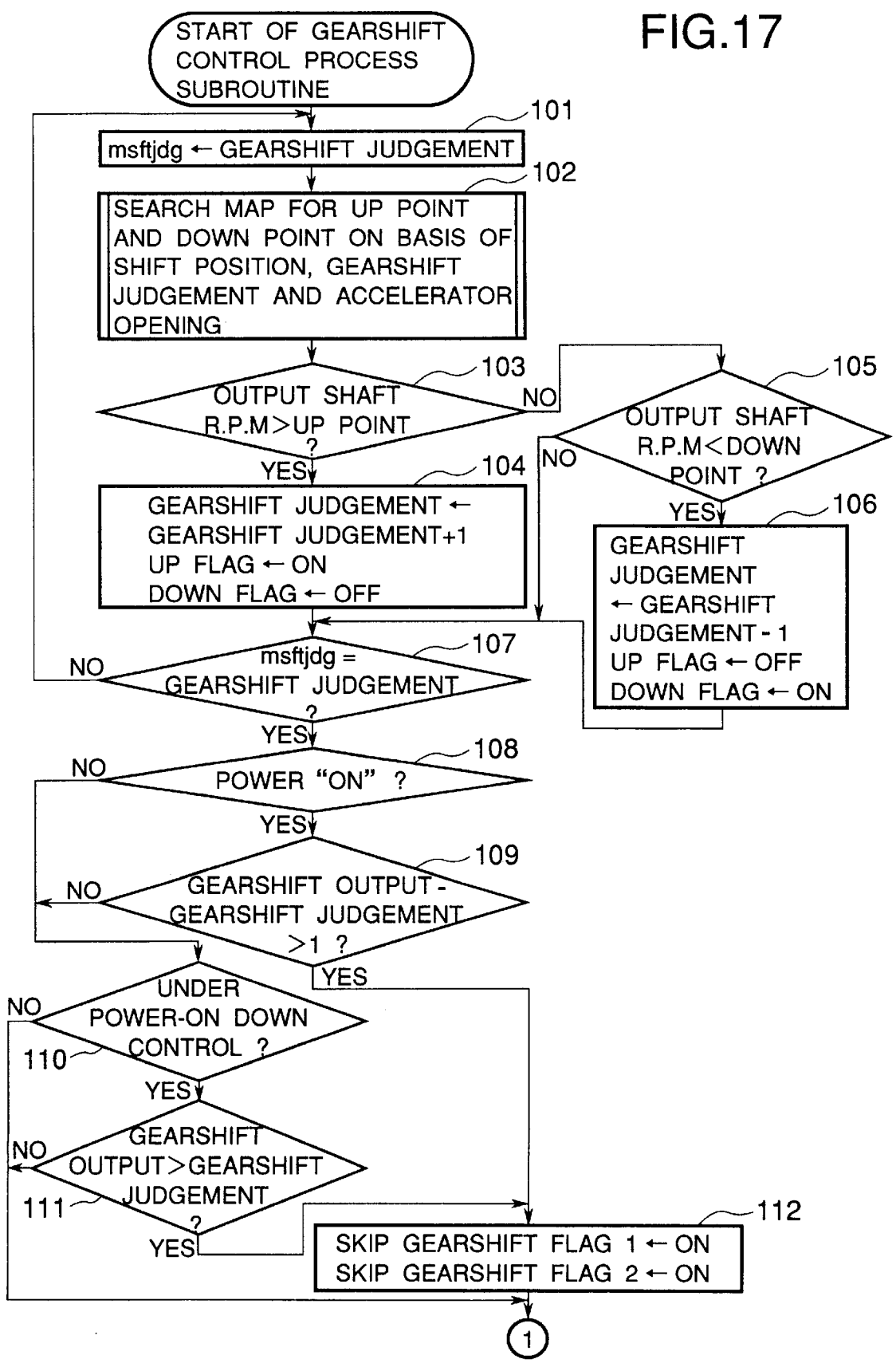
FIG. 17 is a flow chart showing a gearshift control process subroutine in FIG. 16.
Figure 18:
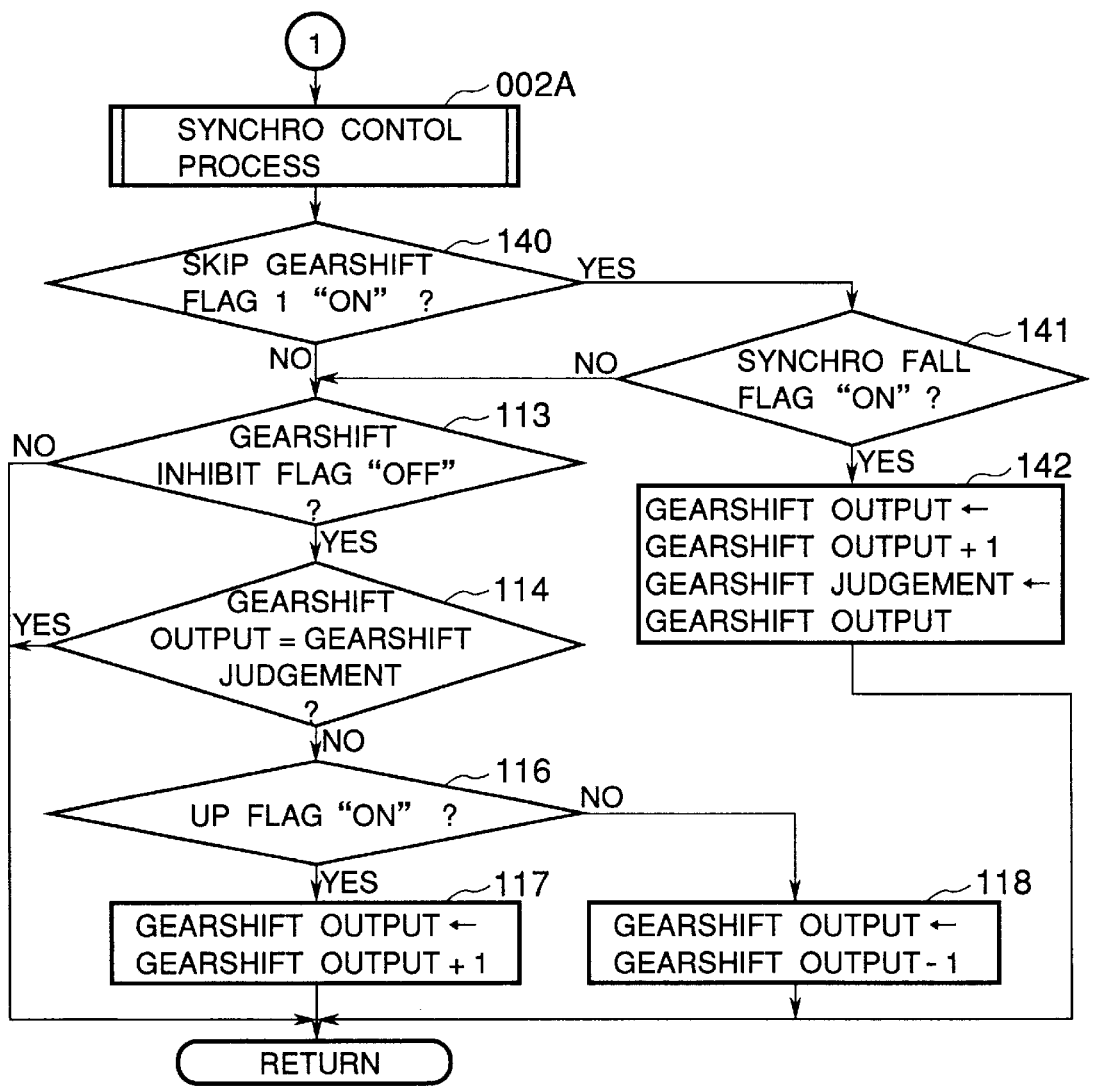
FIG. 18 is a flow chart showing the continuation of FIG. 17.

The synchro control process routine (002) is omitted from the whole flow chart as seen from FIG. 16, and it is incorporated as a step 002A into the gearshift control process routine 001A as seen from FIGS. 17 and 18. Here, the step 113 is preceded by a step 140 for judging whether or not the skip gearshift flag 1 is ON. Upon the judgments at the step 140 that the skip gearshift flag 1 is ON, and at a step 141 that a synchro fail flag to be explained later is ON, the control flow advances to a step 142, at which the gearshift output stage is incremented by 1 (one), and the gearshift output stage is substituted into the gearshift judgement stage.

Owing to such additional steps, when the synchro switchover is defective during the skip gearshift, the gearshift output stage can be raised by one stage, and the second gearshift can be canceled.

Figure 19:
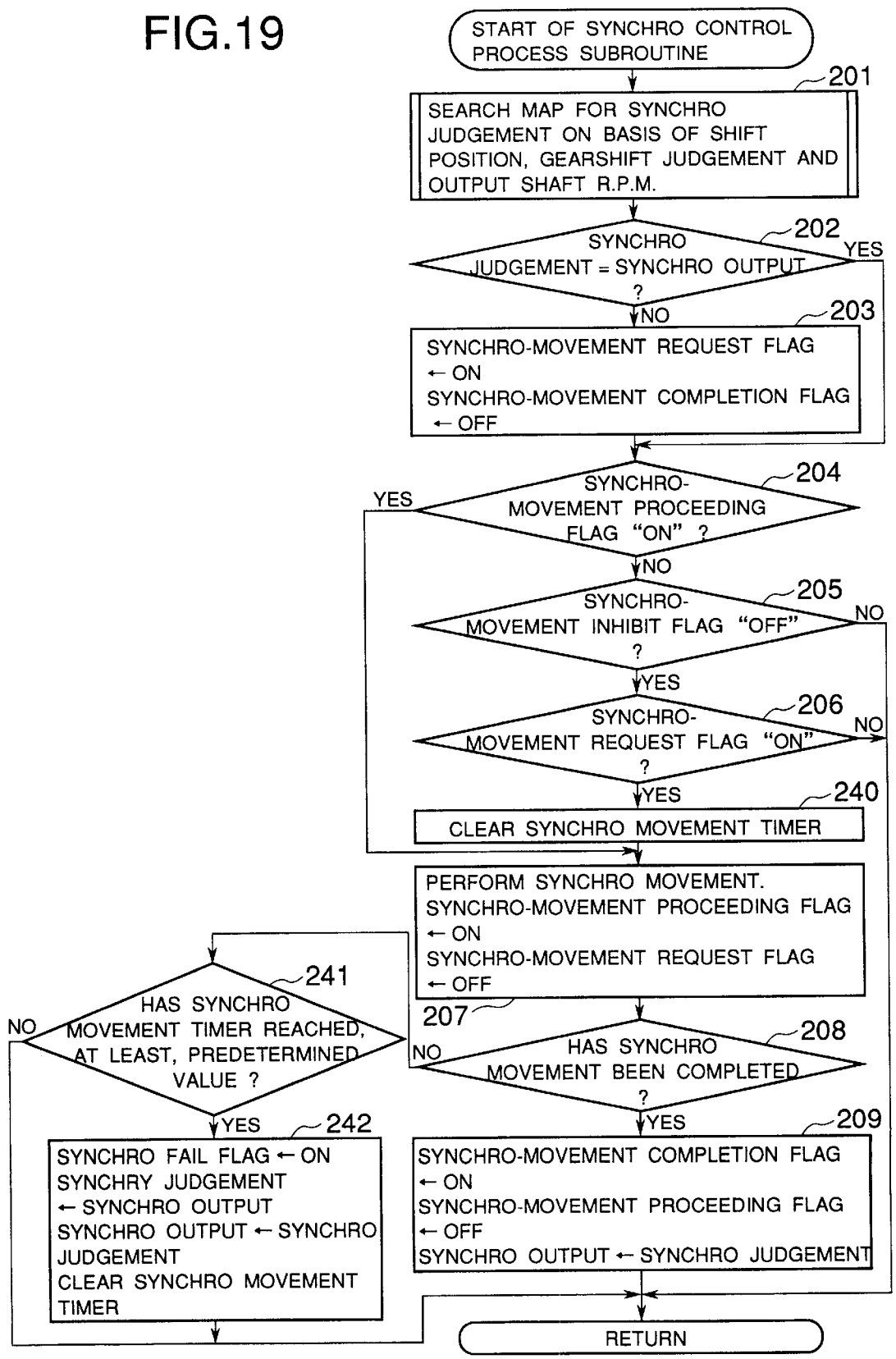
FIG. 19 is a flow chart showing a synchro control process subroutine in FIG. 18.

FIG. 19 illustrates the contents of the subroutine 002A of the synchro control process (incorporated in the gearshift control process routine 001A). A step 240 for clearing and starting a synchro movement timer is added to the subroutine 002 (FIG. 6) of the foregoing first embodiment. Besides, in the case where the synchro movement is not completed ("NO" at the step 208), the control flow advances to a step 241, which checks whether or not the synchro movement timer is equal or more than the predetermined value T5. In a case where the predetermined value T5 has been reached, the processing of "turning ON the synchro fail flag, substituting the synchro output stage into the synchro judgement stage and also substituting the synchro judgement stage into the synchro output stage, and clearing the synchro movement timer" is executed at a step 242.

Thus, in the case where the movement of the synchro is not completed within the predetermined time period T5 since the issue of the movement starting command to the synchro, the synchro fail flag is turned ON by deciding the occurrence of the defective switchover of the synchro, and the synchro can be returned to the original position (before the movement).

Figure 20:
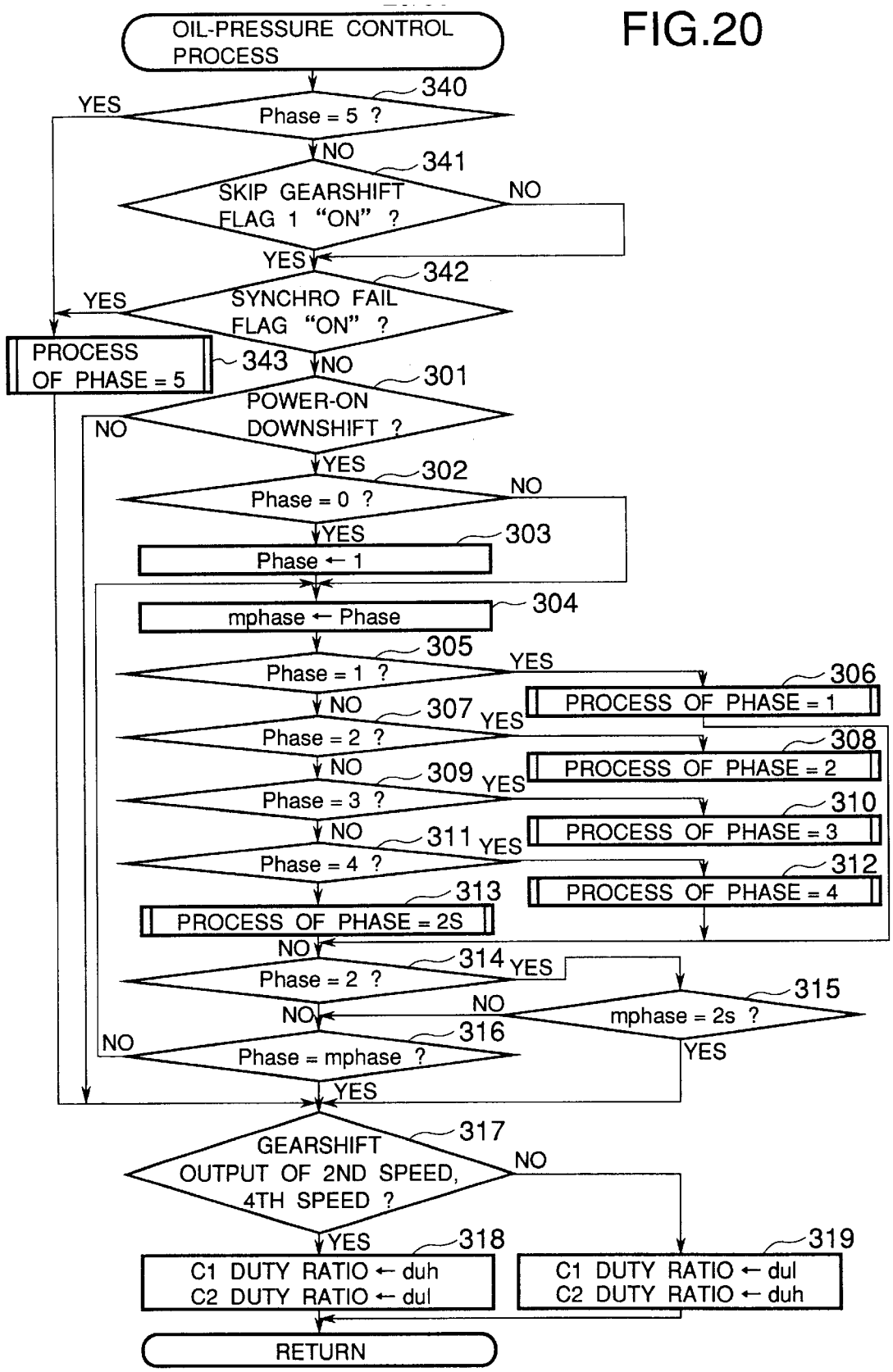
FIG. 20 is a flow chart showing an oil-pressure control process subroutine in FIG. 16.

Meanwhile, the subroutine 003A of the oil-pressure control process becomes as illustrated in FIG. 20. The point of difference from the foregoing first embodiment is that steps 340–343 are added before judging whether or not the gearshift is the power-ON downshift at the step 310.

First, the step 340 checks whether or not the current phase is the phase 5 (for fail processing). Subject to the phase 5, the processing of this phase is executed (step 343). In contrast, when the phase is not the phase 5, the control flow advances to the step 341, which checks whether or not the skip gearshift flag 1 is ON. When the skip gearshift flag 1 is ON, whether or not the synchro fail flag is ON is judged at the step 342. When the synchro fail flag is ON, the operation is shifted to the phase 5 for the fail processing.

Incidentally, when the skip gearshift flag 1 is not ON at the step 341, the problem of the failure of the synchro is not posed, and hence, the step 342 is bypassed.

The succeeding steps are the same as in the first embodiment described before.

Figure 21:
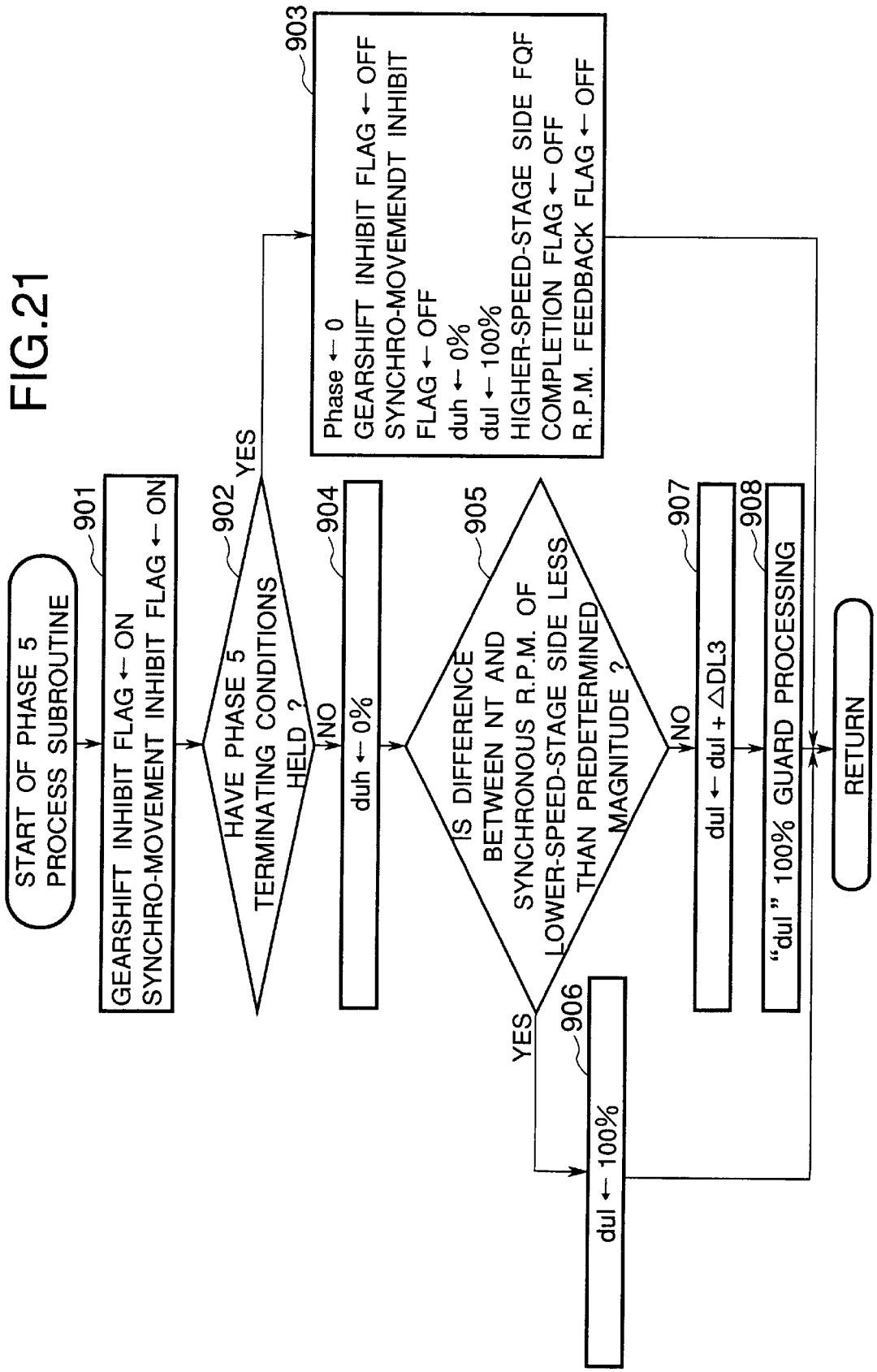
FIG. 21 is a flow chart showing a subroutine process of phase 5 in FIG. 20.

Next, the subroutine of the phase 5 for the fail processing will be explained with reference to FIG. 21.

The gearshift inhibit flag and the synchro-movement inhibit flag are turned ON at a step 901. Subsequently, whether or not conditions for terminating the phase 5 hold is decided at a step 902. Here, the terminating conditions for the phase 5 consist of all of the following four:

a) The difference between the turbine r.p.m. NT and the synchronous r.p.m. (NT3) of the lower-speed-stage side is less than a predetermined magnitude (zero or a predetermined value close to zero).

b) Duty ratio of Higher-speed-stage side (C2 duty ratio)= 0% c) Duty ratio of Lower-speed-stage side (C1 duty ratio)= 100% d) The drain timer (of C2) is equal to or more than a predetermined value T2.

In a case where the terminating conditions for the phase 5 have held, the control flow advances to a step 903, which functions to reset the phase to zero, to turn OFF the gearshift inhibit flag, to turn OFF the synchro-movement inhibit flag, to set the duty ratio "duh" of the higher-speed-stage side (C2) to 0%, to set the duty ratio "dul" of the lower-speed-stage side (C1) at 100%, to turn OFF the "first quick fill" completion flag of the higher-speed-stage side (C2), and to turn OFF the r.p.m. feedback flag.

On the other hand, in a case where the terminating conditions for the phase 5 do not hold, the duty ratio of the higher-speed-stage side (C2) is set at 0% at a step 904, and whether or not the difference between the turbine r.p.m. NT and the synchronous r.p.m. (NT3) of the lower-speed-stage side is less than the predetermined magnitude (zero or the predetermined value close to zero) is decided at a step 905. In a case where the difference is less than the predetermined magnitude, the duty ratio "dul" of the lower-speed-stage side (C1) is set at 100% at a step 906. In a case where the difference is equal to or greater than the predetermined magnitude, the duty ratio "dul" of the lower-speed-stage side (C1) is swept up at a rate ΔADL3 at a step 907, and guarded at 100% at a step 908.

Owing to the above control, in the case where the synchro switchover during the skip gearshift is not completed within the predetermined time period T5, the gearshift (back) to the intermediate stage (third speed stage) is actualized by the process of the phase 5.

Incidentally, although the second gearshift is stopped by the addition of the process of the phase 5 in the second embodiment, the gearshift to the intermediate stage may well be implemented by the feedback of the lowering rate of the turbine r.p.m. NT as based on upshift logic, in such a way that the up flag is permitted to turn ON at the step 104 of the subroutine of the gearshift control process and that a pseudo upshift is generated.

Next, the third embodiment of the present invention (as defined in claim 3) will be described. This third embodiment concerns a power-OFF skip downshift.

The power-OFF skip downshift is generated when the driver of a motor vehicle manipulates the shift lever thereof in want of engine braking. Heretofore, the power-OFF skip downshift has been executed in the two stages of the first gearshift and the second gearshift likewise to the power-ON downshift. Therefore, the problems have sometimes been posed that the whole gearshifting time period becomes long and that the engine braking cannot be attained at an expected timing.

Moreover, gearshift shocks have arisen twice to give an unpleasant feeling to the driver.

Figure 22:
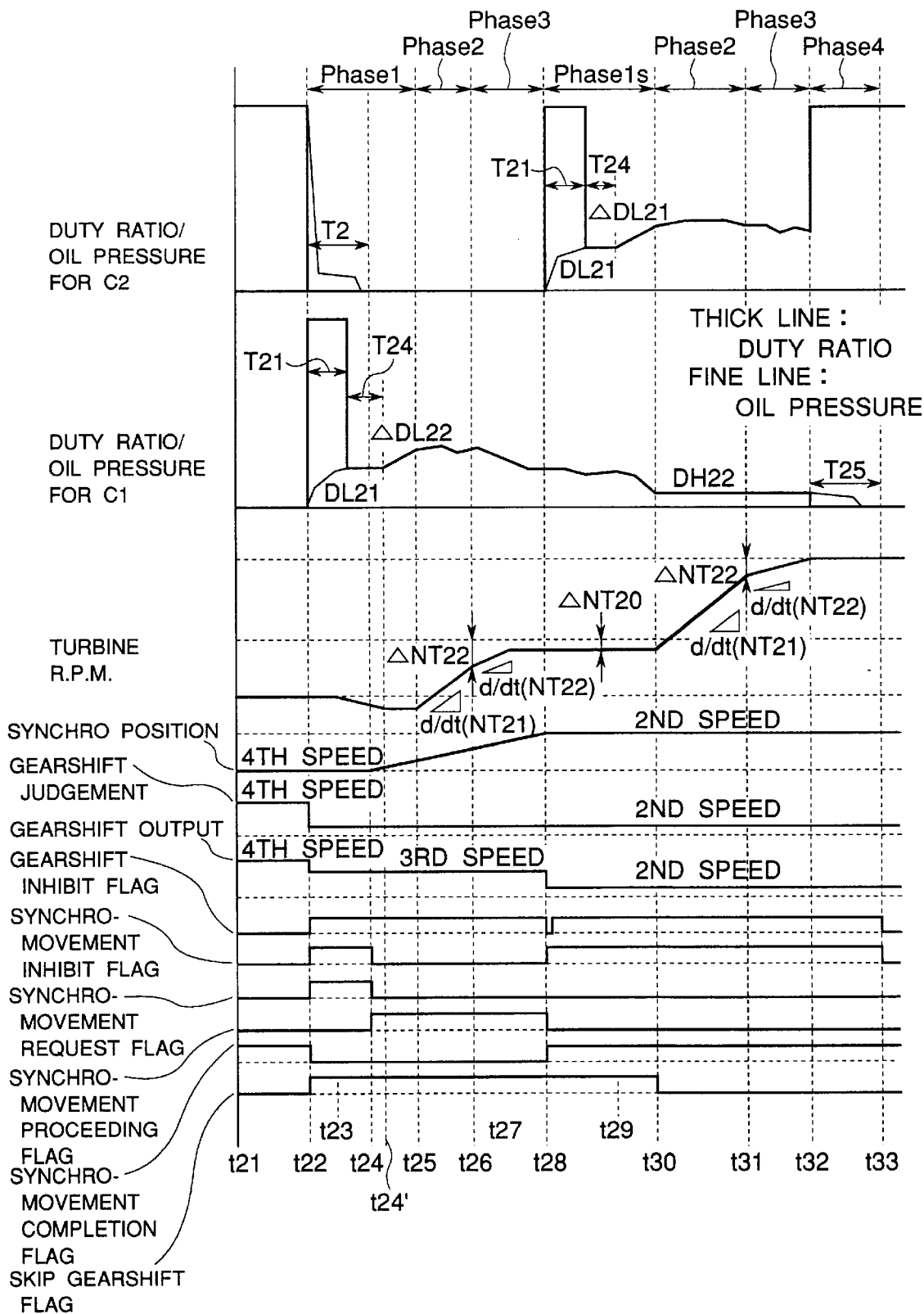
FIG. 22 is a time chart showing control characteristics (a third embodiment) in the case where the present invention is applied to a power-OFF skip downshift.

The present invention is also applicable to a power-OFF skip downshift. FIG. 22 is a time chart of the power-OFF skip downshift of the fourth speed stage→the second speed stage according to the third embodiment of the present invention.

The time chart illustrates the correlations among a duty ratio for the second clutch C2 which serves for both the fourth speed stage (higher speed stage) and the second speed stage (lower speed stage), a duty ratio for the first clutch C1 which serves for the third speed stage (intermediate stage), turbine r.p.m. (=r.p.m. of the transmission input shaft 30) NT, the switchover state of the second synchro D2, a gearshift judgement, a gearshift output, and the statuses of flags. In the figure, a thick line indicates the duty ratio, while a fine line indicates an oil pressure. Herein, a line pressure of 100% is fed to the corresponding clutch for the duty ratio of 100%, whereas the oil pressure of the corresponding clutch is completely drained for the duty ratio of 0%.

A part indicated by a time t21 at the left end of FIG. 22 illustrates the state before the gearshift operation in which the second clutch C2 is fully or completely engaged, and in which the first clutch C1 is fully released (the state in which the fourth speed stage is established).

Upon the judgement of the gearshift of the power-OFF skip downshift from the illustrated state of the fourth speed stage to the second speed stage, the duty ratio of the second clutch C2 is brought down to 0% at a time t22 so as to release the second clutch C2. Simultaneously, the duty ratio of 100% is outputted for a term T21 in order to engage the first clutch C1 (as the operation of so-called "first quick fill"). Thereafter, the duty ratio is lowered down to a level DL21, and the first clutch C1 is held on standby in this state until a first-quick-fill completion timer T24 times out(till a time t24'). The duty ratio DL21 is the very limit value with which the first clutch C1 has no transmission torque capacity.

Owing to the release of the second clutch C2, the turbine r.p.m. NT begins to lower at about a time t23 (because of the power-OFF state).

On the other hand, when it is detected at a time t24 that a drain timer T22 started counting at the time t22 has timed out (assuming that the second clutch C2 has been fully released), a command for switching over the second synchro D2 from the fourth speed position to the second speed position is issued. The reasons why the switchover command for the second synchro D2 is issued upon the time-out of the drain timer T22, are that, when the second clutch C2 has a transmission torque capacity even if slightly, the switchover of the second synchro D2 might be hindered, and that the switchover should preferably be initiated as early as possible without hindrance.

In due course, when the completion timer T24 for the "first quick fill" has timed out at the time t24', the duty ratio of the first clutch C1 is gradually increased at a rate $\Delta$DL22 since the time t24'. As a result, the lowering of the turbine r.p.m. stops at a time t25. Thereafter, the duty ratio of the first clutch C1 is feedback-controlled so as to raise the turbine r.p.m. NT at a predetermined rising rate $d/dt(NT21)$.

In consequence of such a feedback control of the duty ratio of the first clutch C1, the turbine r.p.m. NT rises up to a value which is lower than the synchronous r.p.m. NT3 of the third speed stage (intermediate stage) by a magnitude $\Delta$NT22 (at a time t26). The duty ratio of the first clutch C1 is further feedback-controlled in order that the turbine r.p.m. NT may rise at a predetermined rising rate $d/dt(NT22)$, from the time t26 until the turbine r.p.m. NT becomes a value which is smaller than the synchronous r.p.m. NT3 of the third speed stage (intermediate stage) by a magnitude $\Delta$NT20 (at a time t27).

When it is confirmed at a time t28 that the switchover of the second synchro D2 has been completed, the duty ratio of 100% is outputted here (as the "first quick fill") for a predetermined time period T21 in order to engage again the second clutch C2 which serves as the clutch on the side of the lower speed stage (of the second gearshift). Thereafter, the duty ratio is maintained at the value DL21 till the time-out of the completion timer T24 for the "first quick fill". After the time-out, the duty ratio is increased at the rate $\Delta$DL21 since a time t29 so as to gradually engage the second clutch C2.

Meantime, the first clutch C1 is kept operating so as to feedback-control the duty ratio in order that the turbine r.p.m. NT may maintain the value which is smaller than the synchronous r.p.m. NT3 of the third speed stage by the predetermined magnitude $\Delta$NT20. However, when the second clutch C2 begins to gain a transmission torque capacity, the turbine r.p.m. NT begins to converge toward the synchronous r.p.m. NT2 of the second speed stage, and it comes to exceed the synchronous r.p.m. NT3 of the third speed stage. Therefore, the duty ratio of the first clutch C1 automatically changes toward 0% (owing to the feedback control) and lowers down to a value DH22 at a time t30. Thenceforth, the duty ratio of the first clutch C1 keeps the value DH22 for a while.

On the other hand, the duty ratio of the second clutch C2 is feedback-controlled since the time t30 in order that the rising rate of the turbine r.p.m. NT may become the value $d/dt(NT21)$. When the turbine r.p.m. NT has consequently risen up to the value being lower than the synchronous r.p.m. NT2 of the second speed stage by the magnitude $\Delta$NT22 (at a time t31), the duty ratio is feedback-controlled thenceforth in order that the rising rate of the turbine r.p.m. NT may become the rated/dt(NT22). As a result, the turbine r.p.m. NT arrives at (or near) the synchronous r.p.m. NT2 of the second speed stage at a time t32. At this point of time, therefore, the duty ratio of the first clutch C1 is set at 0%, and that of the second clutch C2 is fixed to 100%. Incidentally, a drain timer T25 is subsequently started, and the complete end of the gearshift is decided at the time-out of the drain timer T25 (at a time t33).

Next, flow charts for actually performing the gearshift control illustrated in FIG. 22 are shown in FIGS. 23~34. The flow charts can cope with, not only the power-OFF skip downshift from the fourth speed stage to the second speed stage as described with reference to FIG. 22, but also an ordinary (single-stage) downshift and the power-OFF skip downshift of the third speed stage→the first speed stage, or the fourth speed stage→the first speed stage. Herein, however, the execution of the power-OFF skip downshift of the fourth speed stage→the second speed stage shall be assumed on occasion and will be described concretely in order to facilitate understanding.

The principal substantial contents of the control to be performed in accordance with the flow charts have already been described by reference to FIG. 22, and they considerably overlap with those of the power-ON skip downshift stated before. Therefore, the steps of the processes of the control shall be schematically explained with importance attached to different contents.

Figure 23:
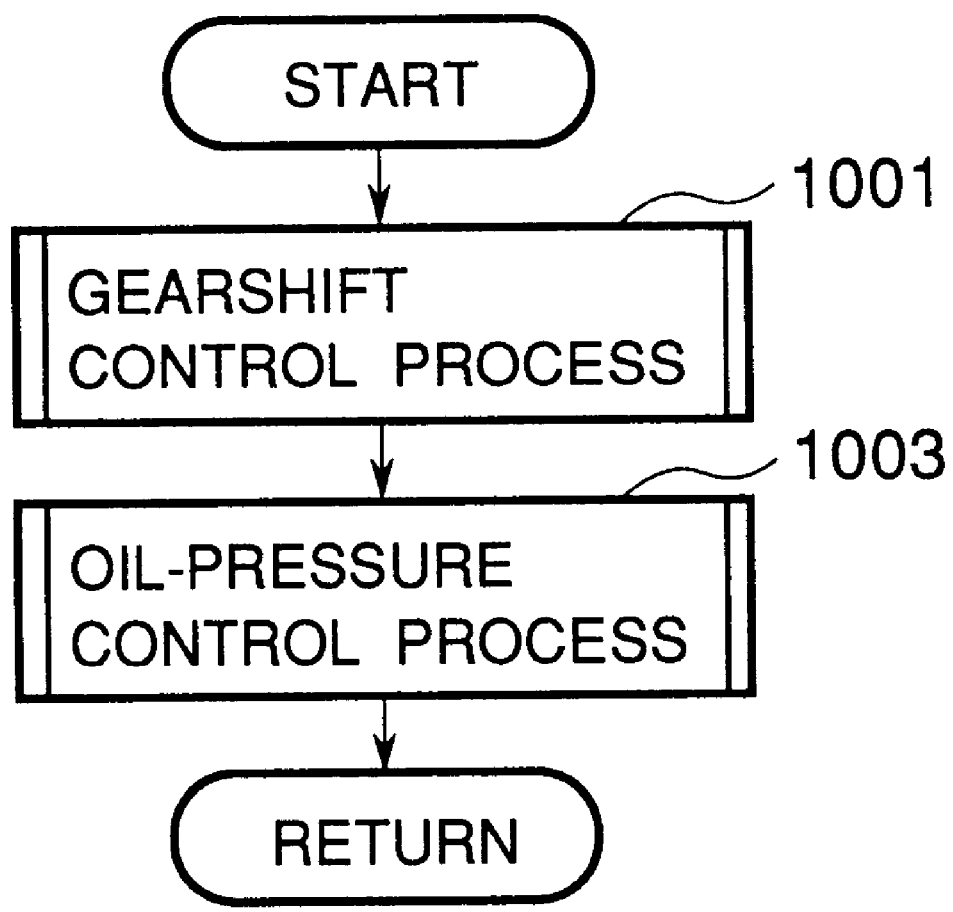
FIG. 23 is a flow chart showing a control flow which is processed by a computer in order to execute the third embodiment.

As illustrated in FIG. 23, the series of control flows are chiefly composed of a gearshift control process routine (step 1001) and an oil-pressure control process routine (step 1003). By the way, a synchro control process routine 1002 is incorporated in the gearshift control process routine 1001 likewise to that of the foregoing-second embodiment. Of these routines, the gearshift control process routine (step 1001) will be first explained with reference to FIGS. 24 and 25.

Figure 24:
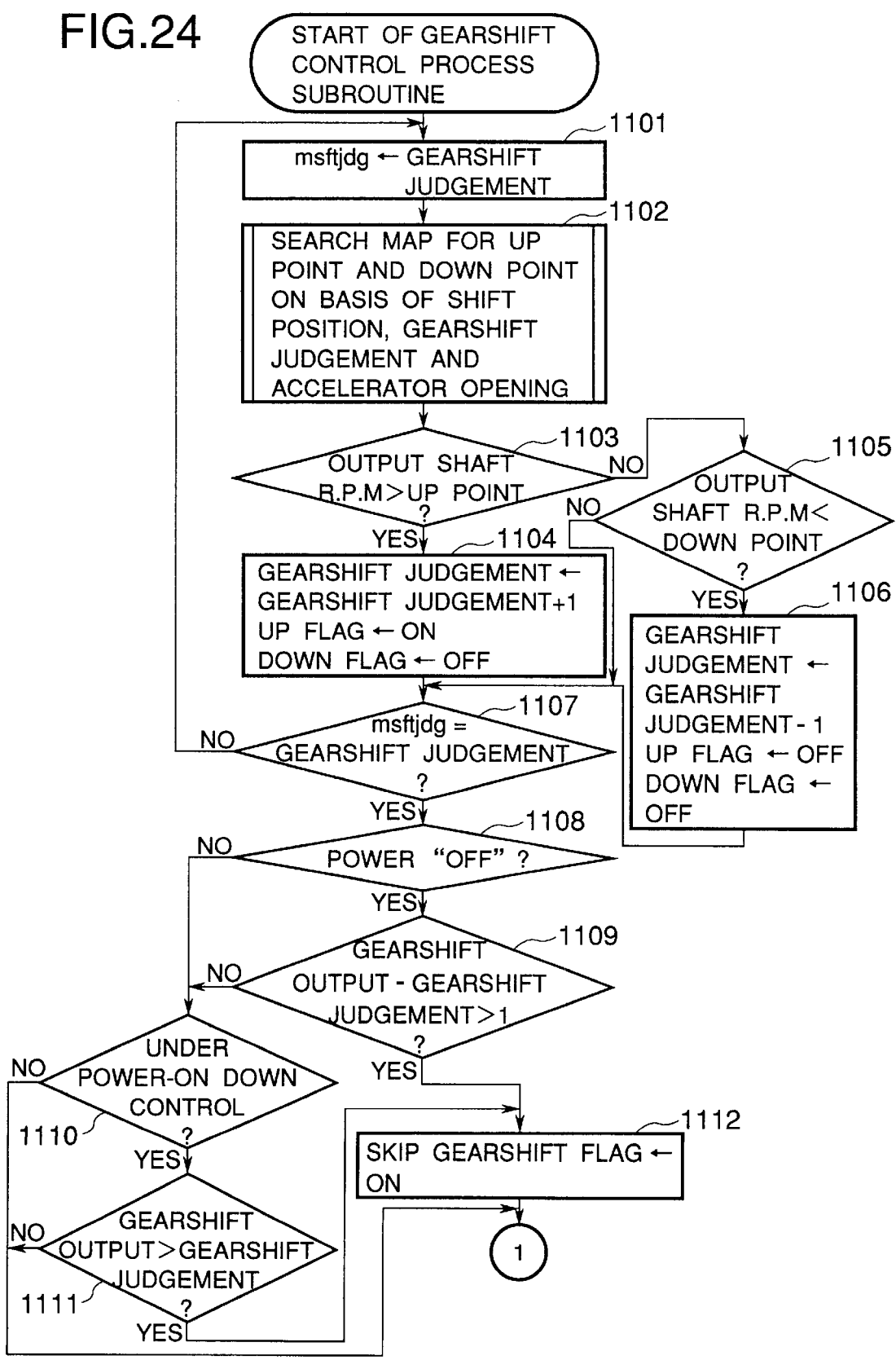
FIG. 24 is a flow chart showing a gearshift control process subroutine in FIG. 23.
Figure 25:
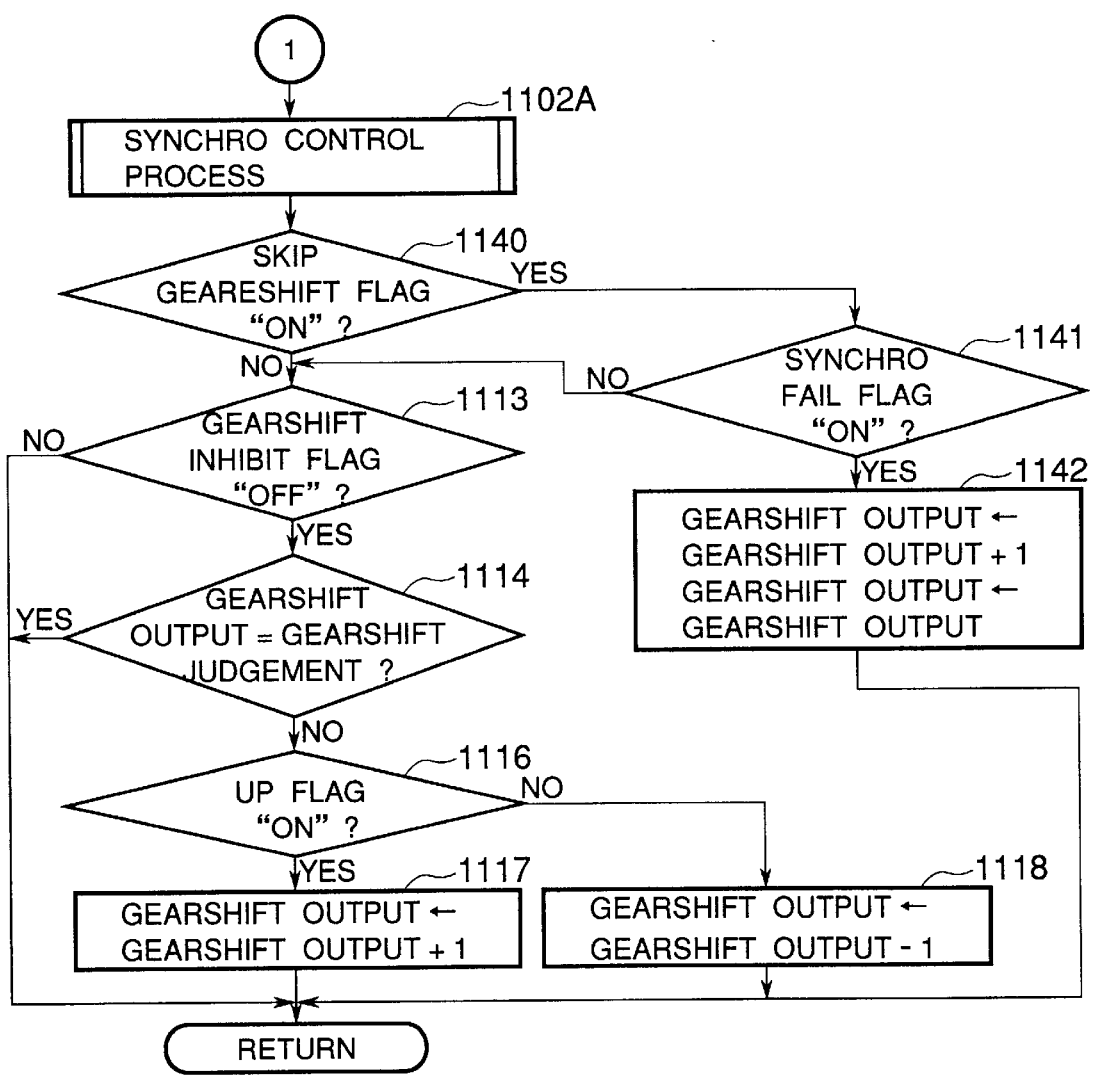
FIG. 25 is a flow chart showing the continuation of FIG. 24.

The gearshift control process routine illustrated in FIGS. 24 and 25 is basically the same as in FIGS. 17 and 18 showing the second embodiment. Different are three points; the first point that a step 1108 judges if the gearshift is of power-OFF, the second point that whether or not the control of the power-OFF downshift is proceeding is judged at a step 1110, and the third point that only the skip gearshift flag (corresponding to the skip gearshift flag 1) is turned ON at a step 1112, no reference being made to the skip gearshift flag 2. Accordingly, merely numerals having the same three lower digits shall be respectively assigned to the identical steps (or steps of identical purports) in the drawings, and these steps shall not be iteratively explained.

Figure 26:
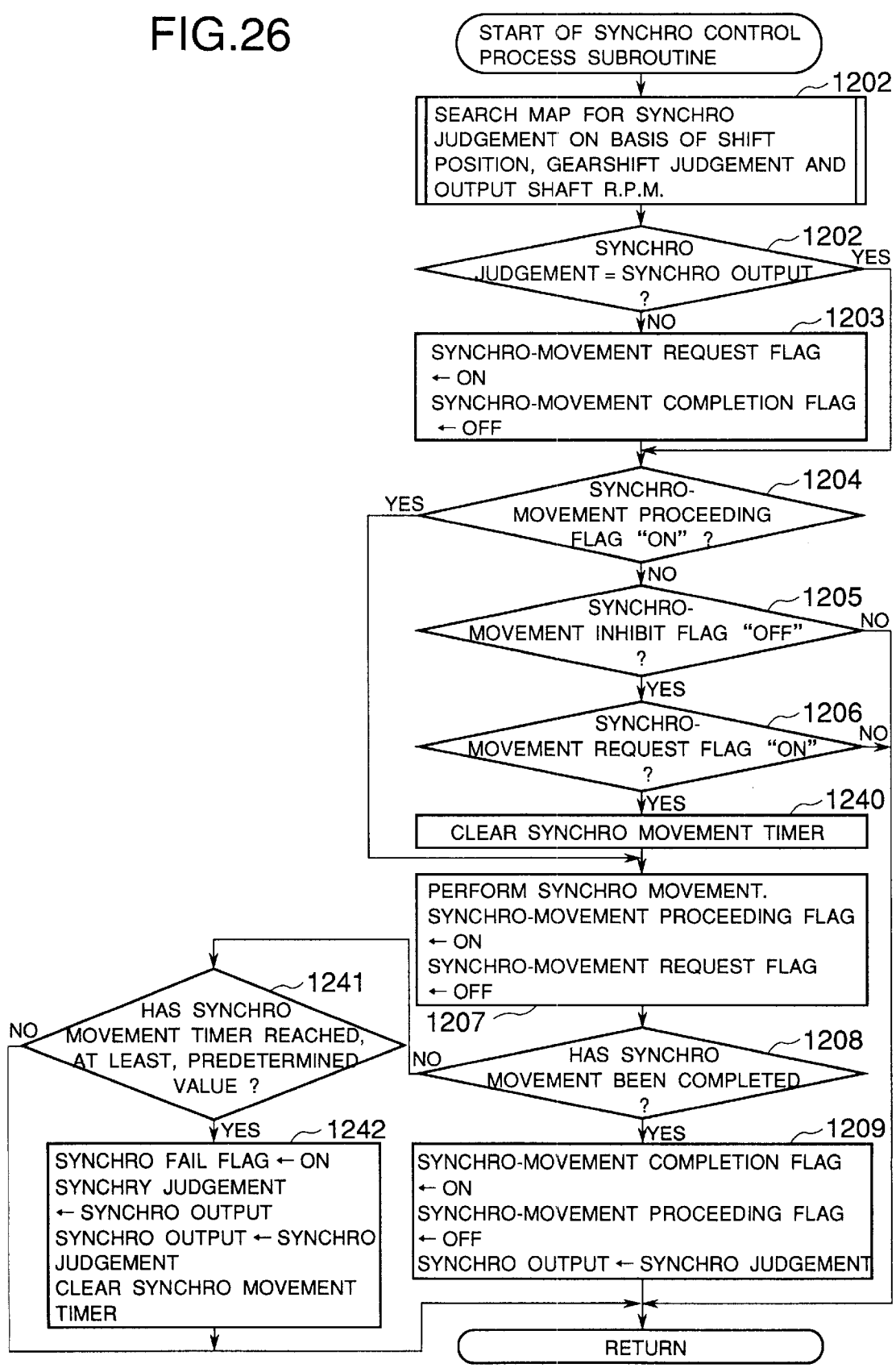
FIG. 26 is a flow chart showing a synchro control process subroutine in FIG. 23.

FIG. 26 illustrates the subroutine of the synchro control process (step 1002) which is incorporated in the gearshift control process routine. This subroutine is basically the same as the synchro control process subroutine (FIG. 19) according to the second embodiment described before. Also here, accordingly, numeral having the same three lower digits shall be respectively assigned to the identical steps or the steps of identical purports, and these steps shall not be iteratively explained.

Figure 27:
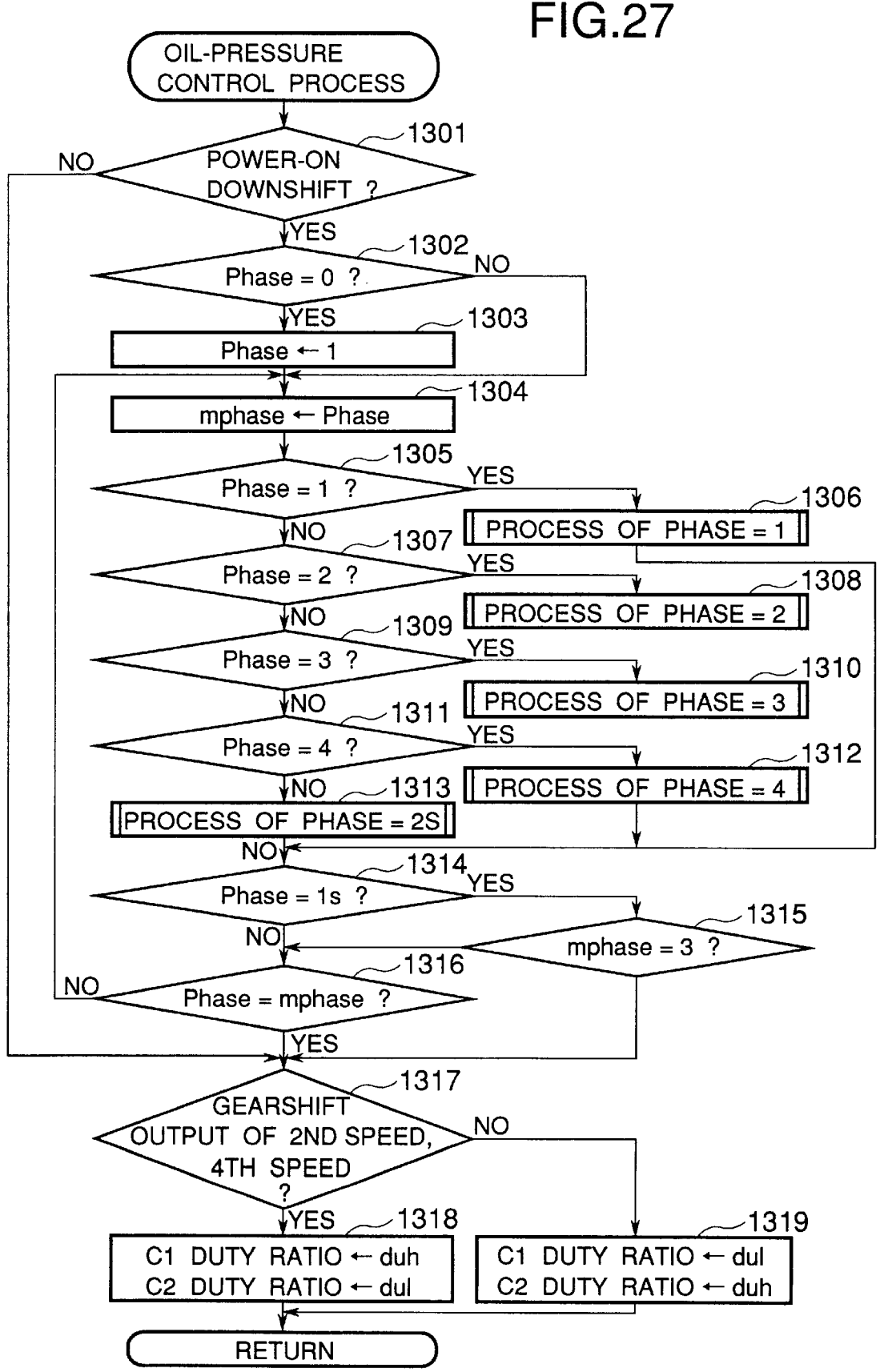
FIG. 27 is a flow chart showing an oil-pressure control process subroutine in FIG. 23.

FIG. 27 illustrates the subroutine of the oil-pressure control process (step 1003 in FIG. 23).

This subroutine is substantially the same as in the oil-pressure control process (FIG. 7) of the foregoing first embodiment (not of the second embodiment). Different are only the point that a step 1314 decides if the current phase is the phase 1S, unlike the phase 2, and the point that a step 1315 decides if the parameter "mphase" is "3", unlike "2S". Accordingly, merely numerals having the same three lower digits shall be respectively assigned to the identical steps or the steps of identical purports to the steps in FIG. 7, and these steps shall not be iteratively explained.

By the way, the concrete definitions or extents of the respective phases are somewhat different from those in the foregoing first embodiment (or second embodiment). The Nos. of the phases which are executed with the progress of the gearshift, are indicated at the uppermost part of FIG. 22.

The practicable control flows of the respective phases will be explained below.

Figure 28:
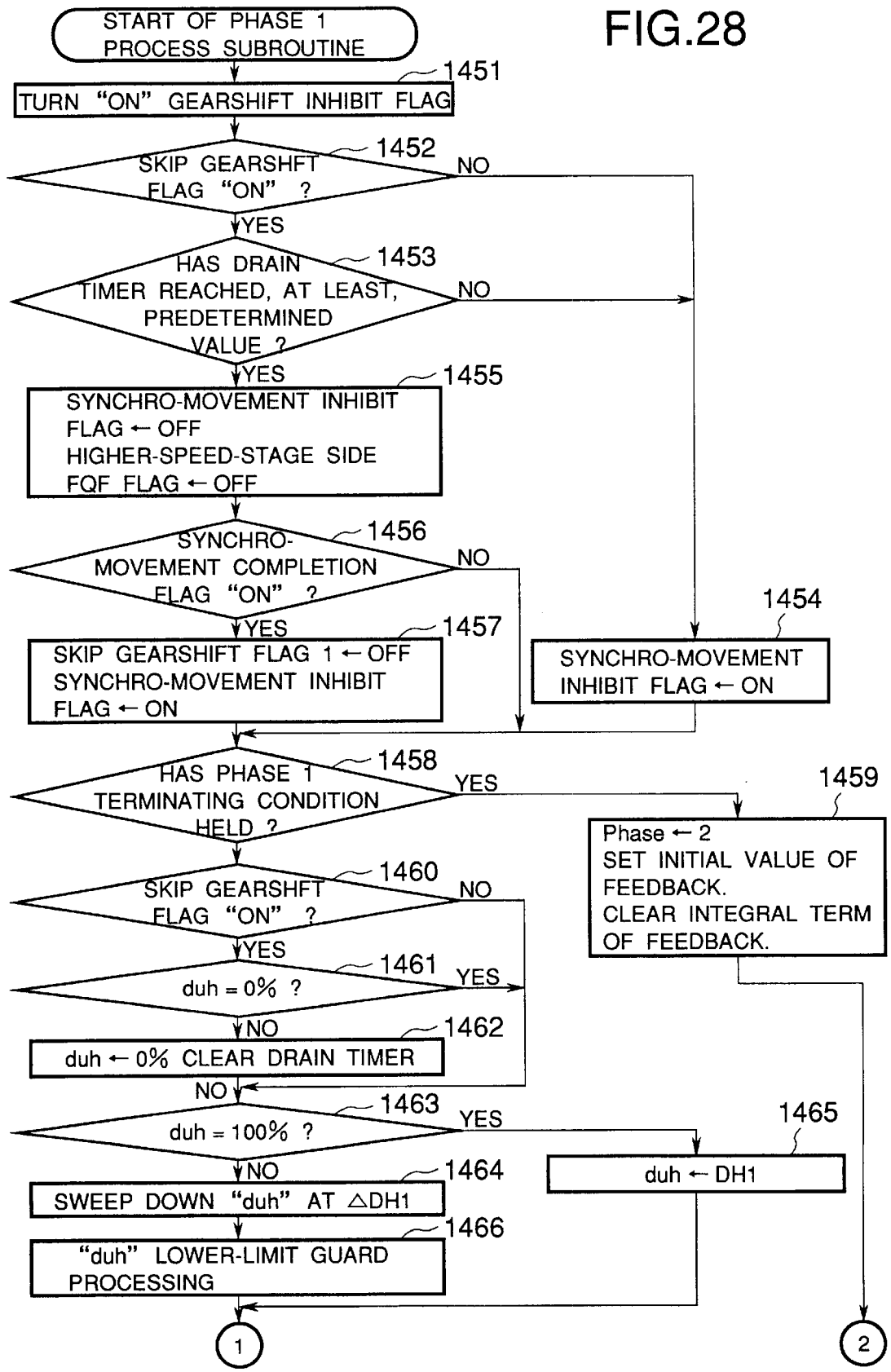
FIG. 28 is a flow chart showing a subroutine process of phase 1 in FIG. 27.

FIG. 28 illustrates a subroutine pertaining to the process of the phase 1.

When the process has been started, the gearshift inhibit flag is first turned ON at a step 1451. Steps 1452~1457 are ones concerning the movement of the synchro for the skip downshift. More specifically, in a case where the skip gearshift has been judged at the step 1452, the step 1453 functions to judge whether or not a drain timer is equal to or more than a predetermined time period T22. Before the drain timer has reached the predetermined time period T22, the control flow advances to the step 1454, at which the synchro-movement inhibit flag is turned ON to inhibit the movement of the synchro (second synchro D2). In contrast, subject to the judgement that the drain timer has reached the predetermined time period T22, the control flow advances to the step 1455, at which the synchro-movement inhibit flag is turned OFF, and the "first quick fill" (FQF) flag of the higher-speed-stage side (C2) is also turned OFF (time t24).

The step 1456 serves to judge whether or not the movement of the synchro has been completed. Upon the completion of the movement, the skip gearshift flag is turned OFF, and the synchro-movement inhibit flag is turned ON (step 1457).

A step 1458 serves to judge whether or not a condition for terminating the phase 1 has held.

The terminating condition for the phase 1 is that "the turbine r.p.m. NT has diverted to rise (from the lowering state)".

In a case where the terminating condition has not held yet, if the skip gearshift flag is ON is checked again at a step 1460. Subject to the ON status, unless the duty ratio "duh" of the higher-speed-stage side (C2) is 0% (step 1461), it is set at 0% (step 1462), and the drain timer is cleared and started counting (the same step 1462). Since the gearshift output is the third-speed output at this point of time, the duty ratio "duh" here becomes that of the second clutch C2 owing to the processing of the steps 1317→1319 (FIG. 27). In the ensuing description, the clutch which is employed at the corresponding point of time shall be concretely indicated by enclosing it with parentheses.

By the way, when it is judged at the step 1460 that the skip gearshift flag is OFF, steps 1463~1466 serve in order to implement an ordinary (single-stage) downshift. More specifically, the duty ratio "duh" of the higher-speed-stage side (C2) is lowered down to a level DH1, and it is thereafter swept down slowly at a rate ΔDH1 (step 1464). The step 1466 executes lower-limit guard processing which functions to prevent the duty ratio "duh" from excessively lowering on this occasion.

Steps 1467~1475 concern the control of the duty ratio "dul" of the lower-speed-stage side (C1). It is decided at the step 1467 if the "first quick fill" (FQF) completion flag of the duty ratio "dul" is ON, and at the step 1468 if the FQF proceeding flag is ON. Since the FQF operation is not performed initially, the control flow progresses along the steps 1467→1468→1469, and the FQF timer of the lower-speed-stage side (C1) is cleared and started at the step 1469. At the subsequent step 1471, the FQF proceeding flag is turned ON, and the duty ratio "dul" set at 100%, thereby to begin the FQF operation.

In the next processing cycle, the judgement of the step 1468 becomes "YES", and hence, this step is followed by the step 1470. Here, it is judged whether or not the FQF timer is equal to or more than a predetermined value T21. Before the value of the FQF timer reaches the predetermined value T21, the step 1470 is followed by the step 1471, at which the FQF operation is continued. When the predetermined value T21 has been reached, the step 1470 is followed by the step 1472, at which the FQF proceeding flag of the duty ratio "dul" is turned OFF, and an FQF completion timer is cleared and started. Before the FQF completion timer reaches a predetermined value T24, the step 1473 is followed by a step 1476, at which the duty ratio "dul" is fixed to a value DL21 (time t24'). The value DL21 in this case is the very limit level with which the clutch of the lower-speed-stage side (C1) has a transmission torque capacity.

In due course, when the FQF completion timer is equal to or more than the predetermined value T24, the step 1473 is followed by the step 1474, at which the FQF completion flag is turned ON, and the duty ratio "dul" of the lower-speed-stage side (C1) is increased at a rate ΔDL22. Since the FQF completion flag is turned ON at the step 1472, the step 1467 is directly followed by the step 1473 in the succeeding cycles. At the step 1475, upper-limit guard processing is executed in relation to the increase of the duty ratio "dul".

The increase at the step 1474 is repeated. As a result, the clutch of the lower-speed-stage side (C1) begins to gain a transmission torque capacity, and the turbine r.p.m. NT diverts into the rising state from the lowering state (time t25). Then, it is decided at the step 1458 that the terminating condition for the phase 1 has held, and this step is followed by a step 1459. Here at the step 1459, the phase 1 is switched over to the phase 2, and the processing of setting the initial value of feedback and clearing the integral term thereof is executed in order to perform the feedback control of the lower-speed-stage side (C1).

Figure 30:
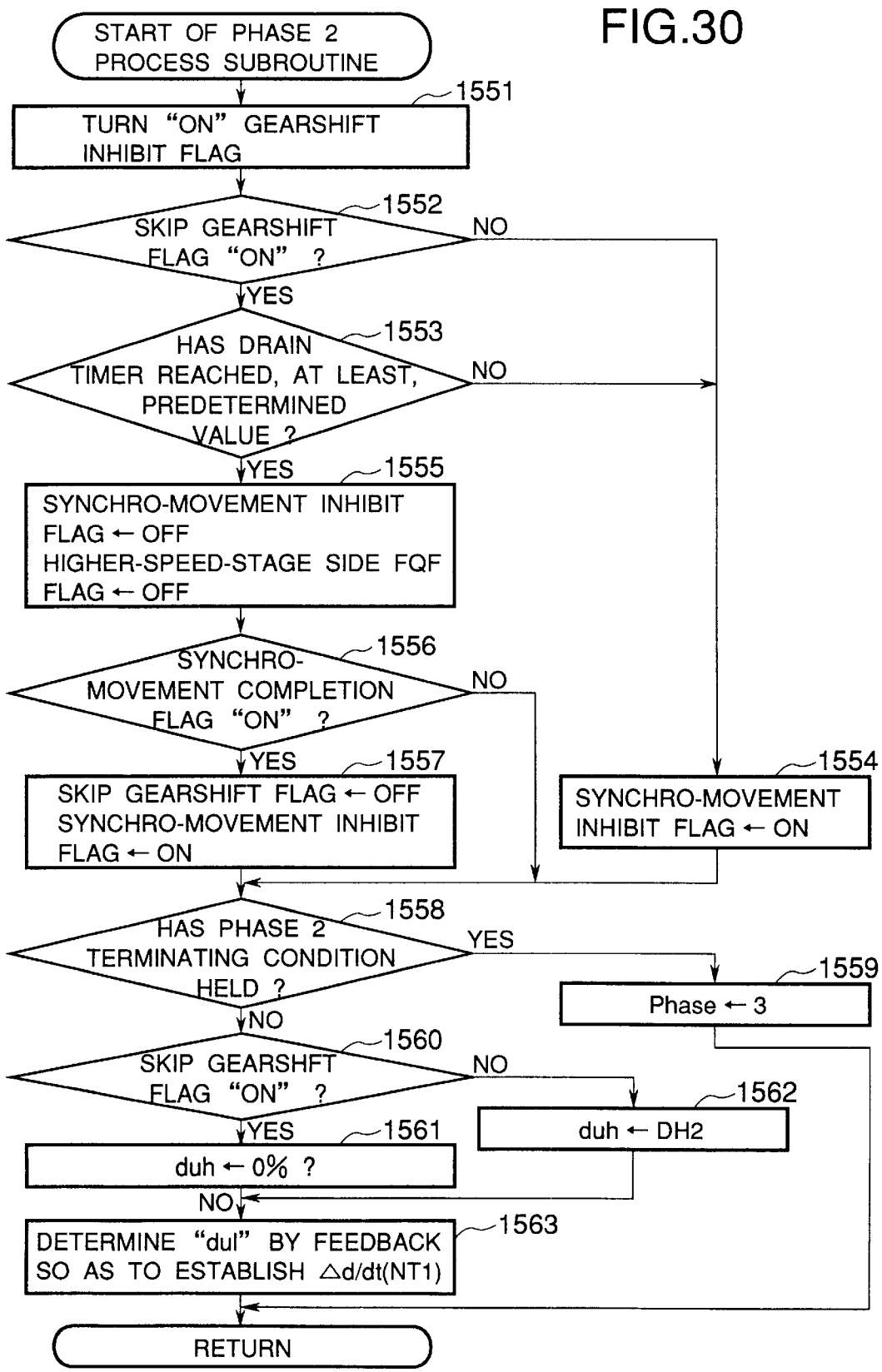
FIG. 30 is a flow chart showing a subroutine process of phase 2 in FIG. 27.

FIG. 30 illustrates the flow chart of the subroutine process of the phase 2.

The processing of steps 1551~1557 is the same as in the process of the phase 1 (FIG. 28) explained before.

A step 1558 functions to judge whether or not a condition for terminating the phase 2 has held. The terminating condition for the phase 2 is "Turbine r.p.m. NT≧Synchronous r.p.m. NT3 of Lower speed stage (Intermediate stage: Third speed stage)—Predetermined magnitude ΔNT22."

Before the terminating condition holds, subject to the skip gearshift flag being ON (step 1560), the duty ratio "duh" of the higher-speed-stage side (C2) is maintained at 0% at a step 1561, and the duty ratio adult of the lower-speed-stage side (C1) is determined by the feedback control at a step 1563 in order that the rising rate of the turbine r.p.m. NT may become Δd/dt(NT21). When it is judged at the step 1560 that the skip gearshift flag has turned OFF (due to change in the operating situation), this step is followed by a step 1562, at which the duty ratio "duh" of the higher-speed-stage side (C2) is set at DH2.

In due course, when it is judged at the step 1558 that the terminating condition for the phase 2 has held, this step is followed by a step 1559, at which the phase 2 is switched over to the phase 3.

Figure 31:
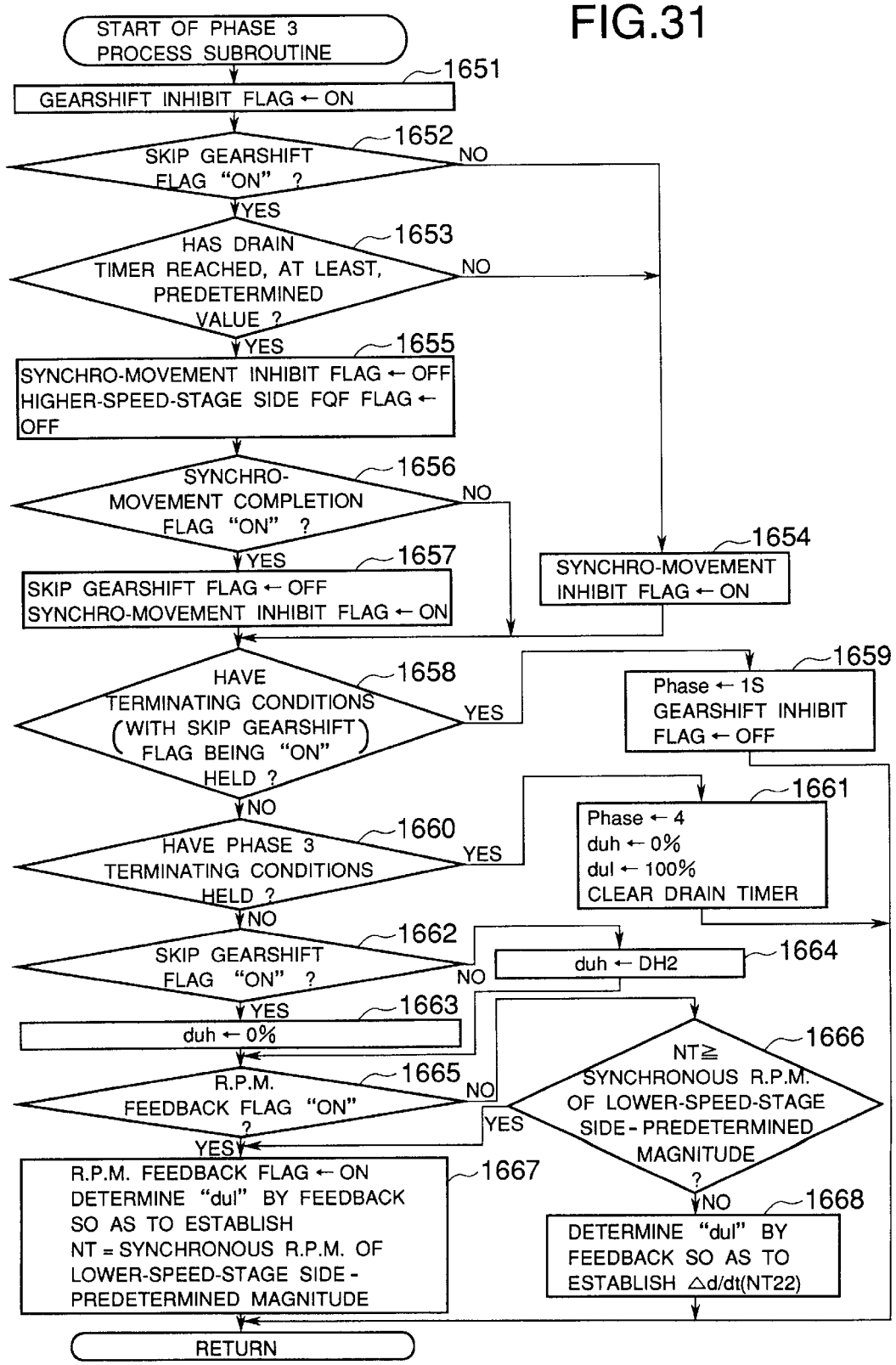
FIG. 31 is a flow chart showing a subroutine process of phase 3 in FIG. 27.

FIG. 31 illustrates the flow chart of the subroutine process of the phase 3.

Steps 1651~1657 are the same as those 1451~1457 of the phase 1 (FIG. 28) or those 1551~1557 of the phase 2 (FIG. 30).

A step 1658 functions to decide whether or not terminating conditions with the skip gearshift flag being ON have held. Here, the terminating conditions with this flag being ON are as follows:

(1) Skip gearshift flag being ON (2) Synchro-movement proceeding flag being OFF (3) Synchro-movement completion flag being ON (4) Synchro-movement inhibit flag being ON When the terminating conditions with the skip gearshift flag being ON do not hold at the step 1658, this step is followed by a step 1660, which decides if conditions for terminating the phase 3 have held. The terminating conditions for the phase 3 are:

(1) Turbine r.p.m. NT≧Synchronous r.p.m. NT3 of Lower speed stage (Intermediate stage: Third speed stage)–Predetermined magnitude ΔNT20

(2) Skip gearshift flag being OFF The condition (2) that the skip gearshift flag is OFF, holds when the movement of the synchro (second synchro D2) has been completed. After all, therefore, the completion of the switchover of the synchro is an indispensable requisite for terminating the phase 3 (time t28.).

Before the terminating conditions for the phase 3. hold, the control flow advances to a step 1662. When the skip gearshift flag is ON at the step 1662, the duty ratio "duh" of the higher-speed-stage side (C2) is set at 0% at a step 1663, and when OFF, the duty ratio "duh" is maintained at the level DH2 at a step 1664.

Besides, whether or not the speed feedback flag is ON is decided at a step 1665. Before this flag turns ON, the control flow advances to a step 1666, which functions to check if the turbine r.p.m. NT is equal to or more than [Synchronous r.p.m. NT3 of Lower speed stage (Intermediate stage: Third speed stage)–Predetermined magnitude ΔNT20]. Before this condition is met, the duty ratio "dul" of the lower-speed-stage side (C1) is determined by a feedback control at a step 1668 in order that the turbine NT may become the value Δd/dt(NT22). When the above condition has been met, the speed feedback flag is turned ON, and thenceforth, the duty ratio "dul" is determined by feedback in order that the turbine r.p.m. NT may become [Synchronous r.p.m. NT3 of Lower speed stage–Predetermined magnitude ΔNT20] (step 1667).

At this control stage, the terminating conditions with the skip gearshift flag being ON (step 1658) hold earlier than the terminating conditions for the phase 3 (step 1660). Therefore, when the terminating conditions with the skip gearshift flag being ON have held, the control flow advances to a step 1659, which functions to switch over the phase 3 to the phase 1S and to turn OFF the gearshift inhibit flag (temporarily).

Figure 32:
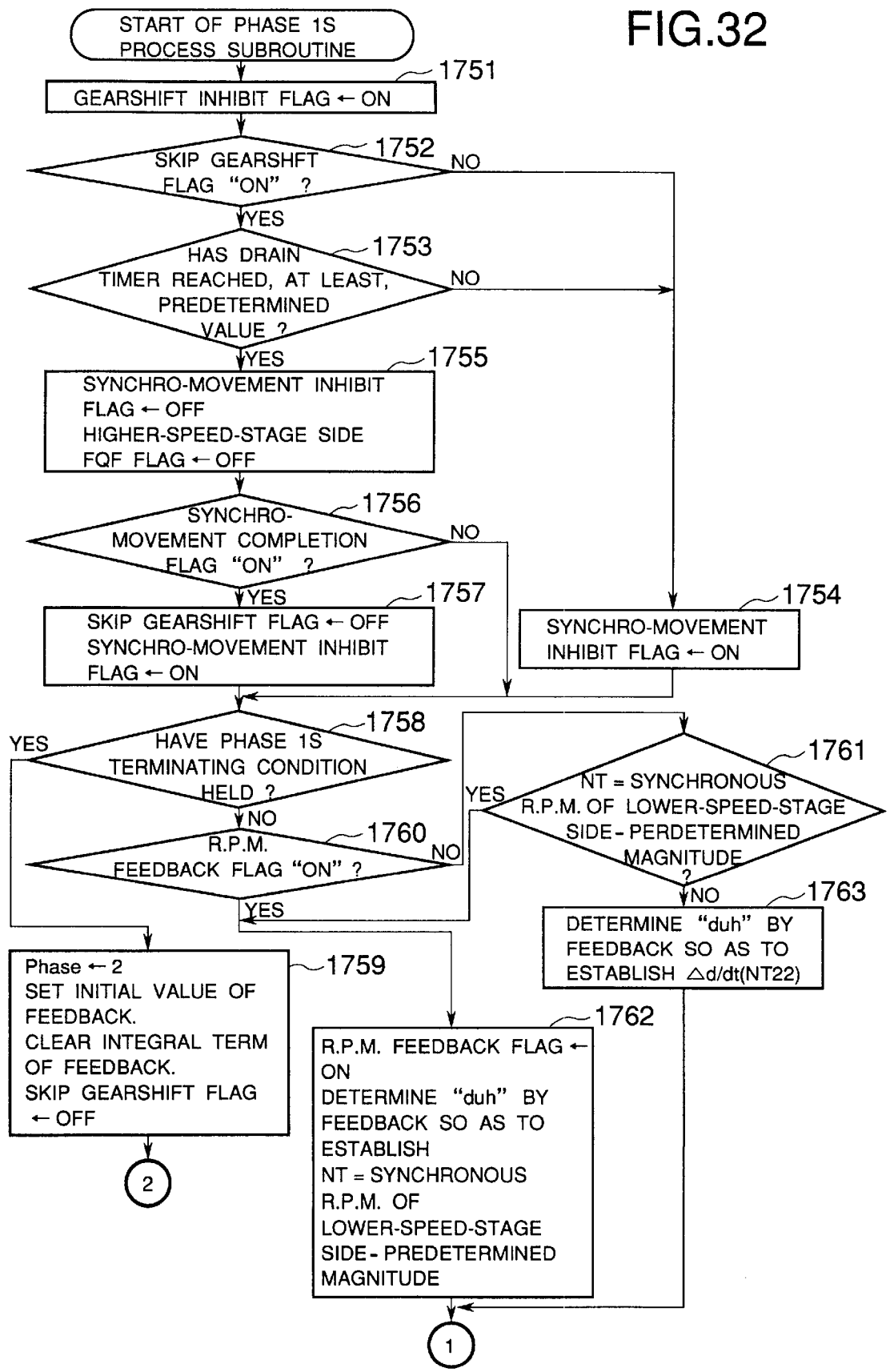
FIG. 32 is a flow chart showing a subroutine process of phase 1S in FIG. 27.
Figure 33:
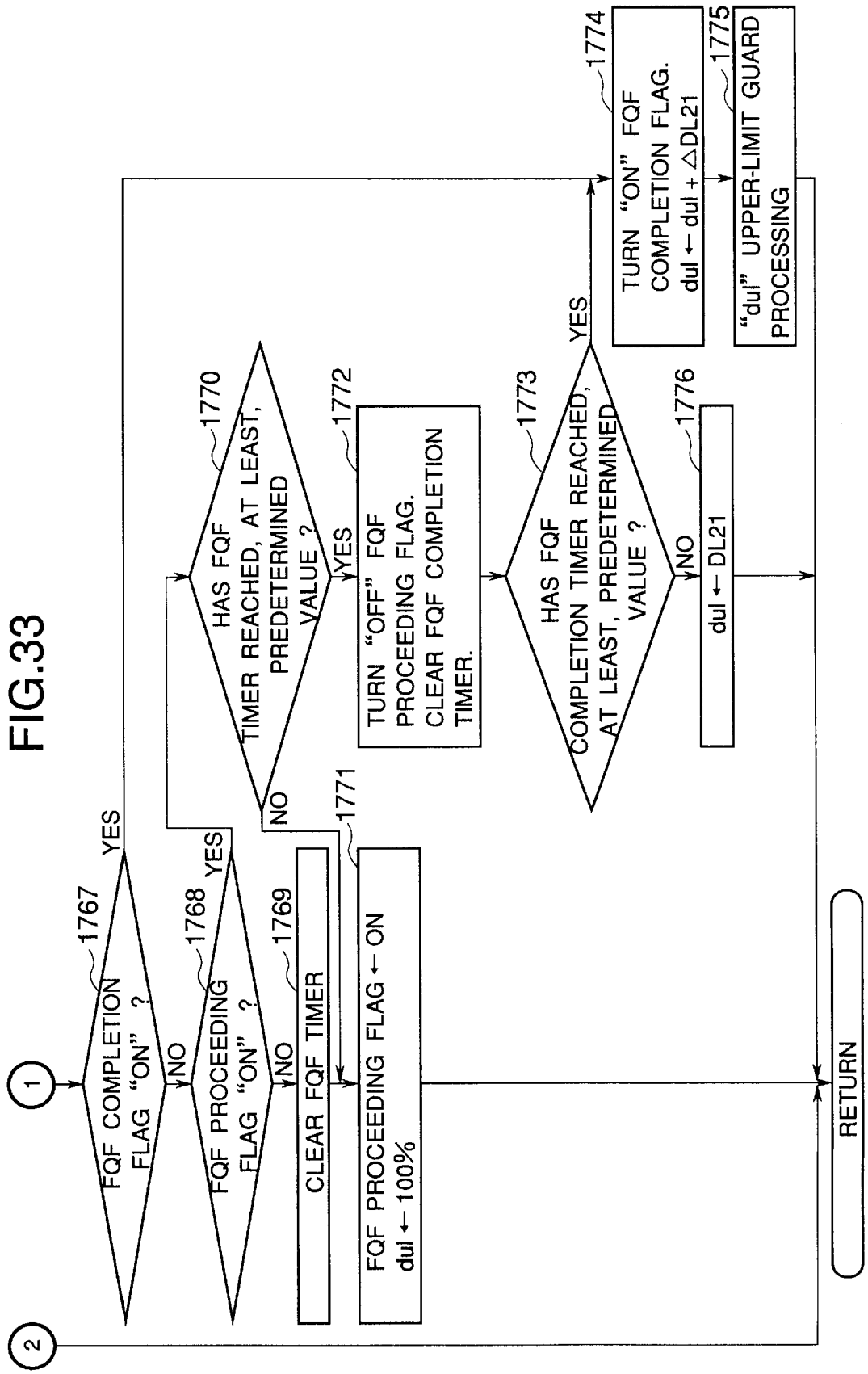
FIG. 33 is a flow chart showing the continuation of FIG. 32.

FIGS. 32 and 33 illustrate the flow chart of the subroutine process of the phase 1S.

Steps 1751~1757 are the same as those 1451~1457 of the phase 1 (FIG. 28). Incidentally, the gearshift inhibit flag is turned ON again at the step 1711. After all, therefore, the gearshift inhibit flag is temporarily turned OFF only when the phase is switched over from the phase 3 to the phase 1S. Owing to the temporary OFF status, the decision of "YES" is rendered at the step 1113 in the gearshift control process subroutine (FIG. 25). As a result, the gearshift output is altered to the second-speed-stage output via the step 1118. Owing to the alteration, the decision of the step 1317 changes to "YES" in the oil-pressure control process routine (FIG. 27). Accordingly, the duty ratio "duh" of the higher-speed-stage side is redefined to be the C1 duty ratio, and the duty ratio "dul" of the lower-speed-stage side is redefined to be the C2 duty ratio anew.

A step 1758 serves to decide whether or not conditions for terminating the phase IS have held. The terminating conditions for the phase IS are:

(1) the completion of the "first quick fill" of the lower-speed-stage side (since the gearshift output has changed, the lower-speed-stage side is the second clutch C2 thenceforth), and (2) the detection of the fact that the lower-speed-stage side (C2) has begun to gain a transmission torque capacity (as based on, for example, the fact that the rising rate of the turbine r.p.m. NT is equal to or more than a predetermined value).

Before the terminating conditions for the phase 1S are not held, the processing of steps 1760~1763 is continued. This processing is the same as the processing of the steps 1665 - 1668 of the foregoing phase 3.

Since, however, the definitions of the duty ratios have changed, the duty ratio "dul" at the steps 1667, 1668 (FIG. 31) is rewritten into "duh" at the steps 1762, 1763 (FIG. 32).

Figure 29:
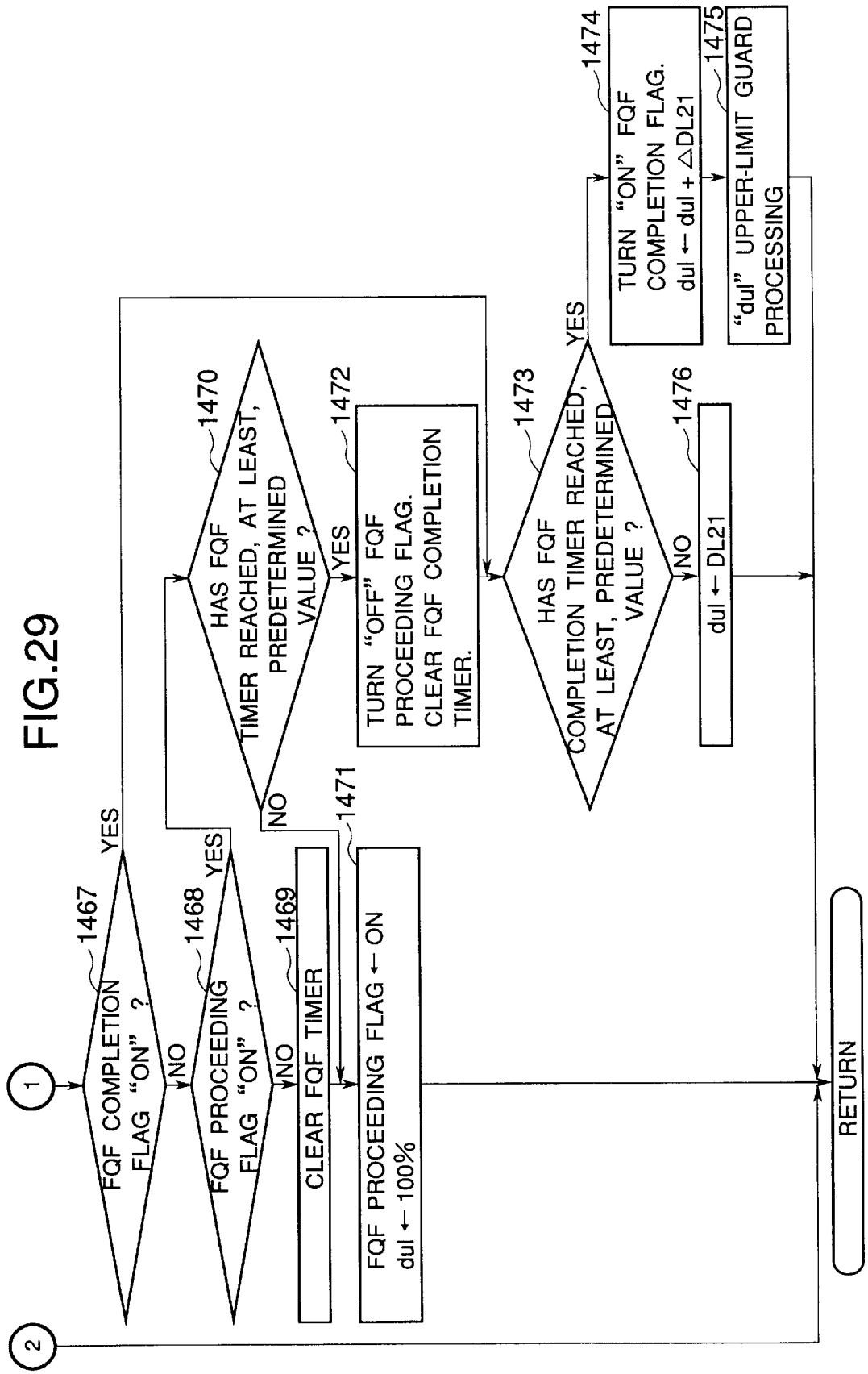
FIG. 29 is a flow chart showing the continuation of FIG. 28.

Steps 1767~1776 constitute a control flow which is similar to that of the steps 1467~1476 in the phase 1 (FIG. 29). In the phase 1, the duty ratio "dul" has signified the C1 duty ratio. However, since the gearshift outputs have changed, although the control flow itself is similar, the duty ratio "dul" signifies the C2 duty ratio in the phase 1S (FIG. 33).

In due course, when it is judged at the step 1758 that the terminating conditions for the phase 1S have held, this step is followed by a step 1759. Here at the step 1759, the control phase is set to the phase 2 again. Besides, in order to feedback-control the duty ratio "dul" of the lower-speed-stage side (C2), the initial value of the feedback is set, and the integral term thereof is cleared. Further, the skip gearshift flag is reset to the OFF status.

The processing of the phase 2 which is executed again (FIG. 30 is referred to again), is concretely different from the foregoing phase 2 as explained below. As the first point of difference, the clutches corresponding to the duty ratios "duh" and "dul" in the current phase 2 are reverse to those in the foregoing phase 2. Second, in the foregoing phase 2, the skip gearshift flag is (usually) judged "ON" the step 1560, and hence, the duty ratio "duh" of the higher-speed-stage side (C2) is set at 0% at the subsequent step 1561. On the other hand, in the processing of the current phase 2, the skip gearshift flag is reset to "OFF" at the step 1759 (FIG. 32) when shifting from the phase 1S as stated before. As the second point of difference, therefore, the step 1560 is followed by the step 1562, at which the duty ratio "duh" of the higher-speed-stage side (C1 after the change) is set at the predetermined value DH22.

The holding itself of the terminating condition at the step 1558 in the current phase 2 is also the same as in the foregoing phase 2 with respect to the flow. Concretely, however, the synchronous r.p.m. of the lower-speed-stage side, which is that of the third speed stage (intermediate stage) in the foregoing phase 2, signifies that of the second speed stage in the current phase 2.

When the terminating condition for the phase 2 has held, the phase 3 is executed again via the step 1559. The phase 3 here is the same as the control flow already explained with reference to FIG. 31. As concrete processing, however, it is judged at the step 1658 in the current phase 3 that the terminating conditions with the skip gearshift flag being ON do not hold (because the skip gearshift flag is OFF), and the control flow advances to a step 1661 via the step 1660 at which the phase 3terminating conditions have held. Here at the step 1661, the phase 3 is switched over to the phase 4, the duty ratio "duh" of the higher-speed-stage side (C1 after the change) is fixed to 0%, and the duty ratio "dul1" of the lower-speed-stage side (C2 after the change)is fixed to 100%, and the drain timer is cleared and started.

Figure 34:
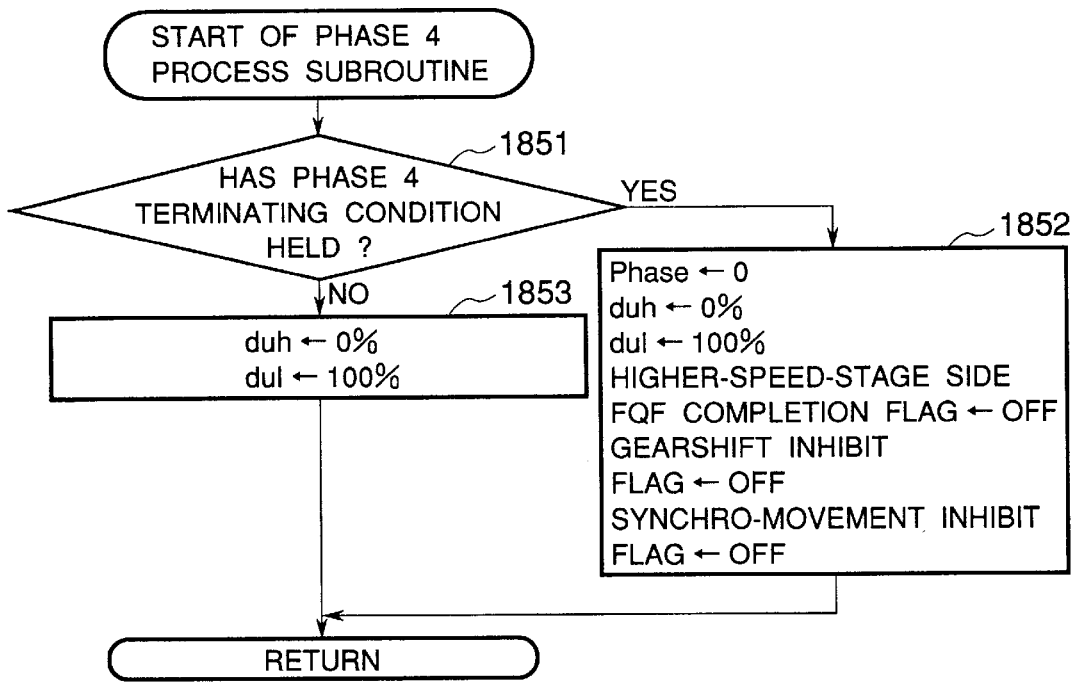
FIG. 34 is a flow chart showing a subroutine process of phase 4 in FIG. 27.

FIG. 34 illustrates the subroutine process of the phase 4.

In the phase 4, whether or not a condition for terminating this phase 4 has held is judged at a step 1851. The terminating condition is that a drain timer is equal to or more than a predetermined value T25. To be set as the predetermined value T25 here is a time period in which the oil pressure of the higher-speed-stage side (C1) is completely drained after the delivery of 0% as the duty ratio "duh" of this side (C1).

Before the time period T25 lapses, the duty ratio "duh" of the higher-speed-stage side (C1) is maintained at 0% and the duty ratio "dul" of the lower-speed-stage side (C2) is maintained at 100% at a step 1853. When the terminating condition has held, the control flow advances to a step 1852 so as to execute final processing. More specifically, the phase is reset to zero, the duty ratio "duh" of the higher-speed-stage side (C1) is fixed to 0%, the duty ratio "dul" of the lower-speed-stage side (C2) is fixed to 100%, the higher-speed-stage side (C1) FQF completion flag is turned OFF, the gearshift inhibit flag is turned OFF, and the synchro-movement inhibit flag is turned OFF.

Owing to the above processing, the power-OFF skip downshift from the fourth speed stage to the second speed stage, for example, is executed along the course as illustrated in the time chart of FIG. 22.

Figure 35:
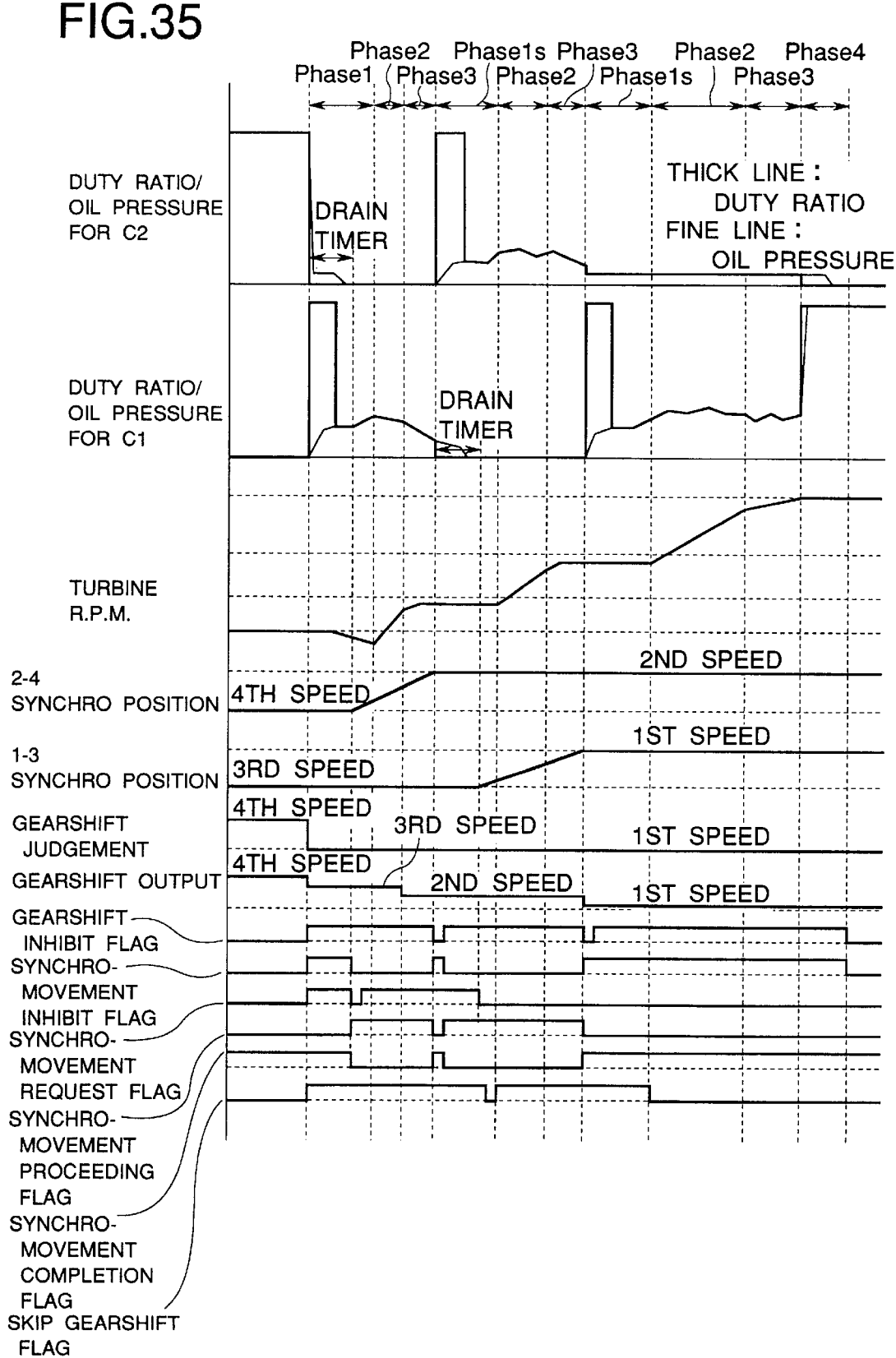
FIG. 35 is a time chart showing control characteristics in the case where the power-OFF skip downshift of a fourth speed stage→a first speed stage is executed in the flow chart according to the third embodiment.

By the way, as stated before, the illustrated control flow is also applicable to, for example, the power-OFF skip downshift from the third speed stage to the first speed stage, or the power-OFF skip downshift from the fourth speed stage to the first speed stage. For reference, FIG. 35 illustrates a time chart in the case where the power-OFF skip downshift from the fourth speed stage to the first speed stage is executed in accordance with the control flow.

Concrete processing aspects in each of the phases, especially the processing in which the higher-speed-stage side duty ratio "duh" and the lower-speed-stage side duty ratio "dul" are switched over depending upon the gearshift output, have already been detailed, and they shall not be iteratively explained here.

In this embodiment, the rise of the turbine r.p.m. is feedback-controlled so that the rising rate may become a predetermined value. Therefore, the turbine r.p.m. can be raised very smoothly.

Besides, the oil pressure of the higher-speed-stage side clutch in the first gearshift is completely drained simultaneously with the gearshift output, and the positions of the synchro are switched over after a predetermined time period, so that a gearshifting time period can be shortened. Moreover, as the predetermined time period, a draining time period for the higher-speed-stage side clutch in the first gearshift is considered, so that while the gearshifting time period is shortened, problems such as the defective switchover of the synchro attributed to an excessively early switchover command are reliably prevented from occurring.

Further, the turbine r.p.m. is feedback-controlled by the oil pressure of the higher-speed-stage side clutch in the first gearshift so as to be maintained at (Synchronous r.p.m. of Lower speed stage in First gearshift−Predetermined value) till the completion of the switchover of the synchro. It is therefore possible to prevent a shock which arises when the lower-speed-stage side clutch (intermediate-stage clutch) of the first gearshift is completely engaged, and to prevent a shock which arises when this clutch is released in the second gearshift.

As described above, according to the present invention, the skip downshifts of an automatic transmission of so-called "twin clutch type" can be executed with light gearshift shocks and in short time periods in both the power-ON and power-OFF states of a motor vehicle.

What is claimed is:

1. A skip downshift control apparatus for an automatic transmission having two clutches which are arranged in parallel with a transmission input shaft, and a plurality of gear trains which are arranged on respective output shafts of said two clutches and which are selectively connected with a transmission output shaft by a synchro mechanism, wherein a skip downshift, in which a first gearshift from a higher speed stage to an intermediate stage and a second gearshift from the intermediate stage to a lower speed stage are successively implemented, is executed in a power-ON state by a combination of the selective connection of said gear trains and clutch-to-clutch changeover of said two clutches, comprising:

means for detecting that a gearshift judgement for the execution of said skip downshift has been made;

means for releasing one of said two clutches on a higher-speed-stage side of said first gearshift, after the detection of said gearshift judgement;

means for issuing a command for switching over said synchro mechanism from the higher-speed-stage side of said first gearshift to a lower-speed-stage side of said second gearshift, after the release of the higher-speed-stage side clutch;

means for detecting that speed of the transmission input shaft has arrived at synchronous speed of the intermediate stage of said first gearshift owing to said release of said higher-speed-stage side clutch;

means for raising an oil pressure of the clutch on the intermediate-stage side of said second gearshift in order that a rising rate of said speed of said transmission input shaft may become a predetermined value, after the detection of the arrival of the speed of said transmission input shaft at the synchronous speed of said intermediate stage until said speed of said transmission input shaft arrives at a value which is obtained by adding a predetermined magnitude to synchronous speed of the lower speed stage of said second gearshift;

means for controlling the oil pressure of said intermediate-stage side clutch of said second gearshift so as to maintain said value which is obtained by adding the predetermined magnitude to the synchronous speed of said lower speed stage of said second gearshift, after the arrival of the speed of said transmission input shaft at said value;

means for confirming that said speed of said transmission input shaft is equal to or greater than said synchronous speed of said lower speed stage of said second gearshift, and that the switchover of said synchro mechanism has been completed; and means for gradually raising an oil pressure of the clutch on the lower-speed-stage side of said second gearshift and for gradually lowering said oil pressure of said intermediate-stage side clutch of said second gearshift, after said confirmation.

2. A skip downshift control apparatus for an automatic transmission as defined in claim 1, further comprising:

means for judging whether or not said switchover of said synchro mechanism has been completed within a predetermined time period since the issue of the command for said switchover;

wherein subject to the judgement that said switchover of said synchro mechanism has not been completed within the predetermined time period since said issue of said command for said switchover, said second gearshift is cancelled at the time of said judgement, thereby to alter said skip downshift to a downshift which includes only said first gearshift.

3. A skip downshift control apparatus for an automatic transmission having two clutches which are arranged in parallel with a transmission input shaft, and a plurality of gear trains which are arranged on respective output shafts of said two clutches and which are selectively connected with a transmission output shaft by a synchro mechanism, wherein a skip downshift, in which a first gearshift from a higher speed stage to an intermediate stage and a second gearshift from the intermediate stage to a lower speed stage are successively implemented, is executed in a power-OFF state by a combination of the selective connection of said gear trains and clutch-to-clutch changeover of said two clutches, comprising:

means for detecting that a gearshift judgement for the execution of said skip downshift has been made;

means for releasing one of said two clutches on a higher-speed-stage side of said first gearshift, after the detection of said gearshift judgement;

means for issuing a command for switching over the synchro mechanism from the higher-speed-stage side of said first gearshift to a lower-speed-stage side of said second gearshift, after the release of the higher-speed-stage side clutch;

means for raising an oil pressure of the clutch on the intermediate-stage side of said second gearshift in order that a rising rate of the speed of said transmission input shaft may become a predetermined value, after the issue of the switchover command until the speed of the transmission input shaft arrives at a value which is lower than synchronous speed of the intermediate stage of said first gearshift by a predetermined magnitude;

means for controlling the oil pressure of the intermediate-stage side clutch so as to maintain said value which is lower than the synchronous speed of said intermediate stage of said first gearshift by said predetermined magnitude, after the arrival of said speed of said transmission input shaft at said value;

means for confirming that the switchover of said synchro mechanism has been completed; and means for gradually raising an oil pressure of said clutch on the lower-speed-stage side of said second gearshift and for gradually lowering said oil pressure of said intermediate-stage side clutch of said second gearshift, in order that the rising rate of said speed of said transmission input shaft may become a predetermined value, after said confirmation.

* * * * *